US011622402B2

(12) United States Patent
Balasubramanian et al.

(10) Patent No.: US 11,622,402 B2
(45) Date of Patent: Apr. 4, 2023

(54) RELAY OF SUPERPOSITIONED SIDELINK AND UPLINK TRANSMISSION

(71) Applicant: QUALCOMM Incorporated, San Diego, CA (US)

(72) Inventors: Anantharaman Balasubramanian, San Diego, CA (US); Sony Akkarakaran, Poway, CA (US); Shuanshuan Wu, San Diego, CA (US); Kapil Gulati, Montgomery, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 197 days.

(21) Appl. No.: 16/951,788

(22) Filed: Nov. 18, 2020

(65) Prior Publication Data

US 2022/0159757 A1 May 19, 2022

(51) Int. Cl.
*H04W 76/15* (2018.01)
*H04L 1/18* (2006.01)
(Continued)

(52) U.S. Cl.
CPC ........... *H04W 76/15* (2018.02); *H04L 1/0003* (2013.01); *H04L 1/189* (2013.01); *H04L 5/0055* (2013.01);
(Continued)

(58) Field of Classification Search
CPC ..... H04L 1/0003; H04L 1/189; H04L 1/1893; H04L 5/0055; H04L 2001/0092;
(Continued)

(56) References Cited

U.S. PATENT DOCUMENTS 9,985,700 B2 * 5/2018 Hwang ............... H04L 27/3488
10,080,246 B2 * 9/2018 Kim ...................... H04W 76/14
(Continued)

FOREIGN PATENT DOCUMENTS

BR 112017024136 A2 * 8/2018 ........... H04B 17/336
CN 107113107 A * 8/2017 ........... H04B 17/336
(Continued)

*Primary Examiner* — Eric Nowlin
(74) *Attorney, Agent, or Firm* — Procopio, Cory, Hargreaves & Savitch LLP

(57) ABSTRACT

Apparatus, methods, and computer-readable media for facilitating relay of superpositioned sidelink and uplink transmission are disclosed herein. An example method for wireless communication at a first communication device includes receiving, from a UE, a MUST transmission including a base layer and an enhancement layer, the base layer comprising a first message for a second communication device and the enhancement layer comprising a second message for the first communication device. The example method also includes decoding the base layer of the MUST transmission to obtain the first message. Additionally, the example method includes receiving a feedback message from the second communication device indicating that the second communication device did not successfully receive the first message. The example method also includes retransmitting the first message to the second communication device in response to the feedback message from the second communication device.

72 Claims, 30 Drawing Sheets

(51) Int. Cl.
*H04W 68/00* (2009.01)
*H04L 1/00* (2006.01)
*H04W 72/04* (2009.01)
*H04W 80/02* (2009.01)
*H04L 5/00* (2006.01)
*H04W 76/27* (2018.01)
*H04L 1/1867* (2023.01)
*H04W 72/0446* (2023.01)

(52) U.S. Cl.
CPC ....... *H04W 68/005* (2013.01); *H04W 72/042* (2013.01); *H04W 72/0413* (2013.01); *H04W 72/0446* (2013.01); *H04W 76/27* (2018.02); *H04W 80/02* (2013.01)

(58) Field of Classification Search
CPC ........... H04W 68/005; H04W 72/0413; H04W 72/042; H04W 72/0446; H04W 76/15; H04W 76/27; H04W 80/02
See application file for complete search history.

(56) References Cited

U.S. PATENT DOCUMENTS

| | | | | |
|---|---|---|---|---|
| 10,491,289 | B2 * | 11/2019 | Han | H04B 7/14 |
| 11,323,301 | B2 * | 5/2022 | Han | H04L 5/0048 |
| 11,341,679 | B2 * | 5/2022 | Naim | H04L 27/2602 |
| 11,503,573 | B2 * | 11/2022 | Balasubramanian | H04L 1/1861 |
| 2016/0192420 | A1 * | 6/2016 | Kim | H04W 4/06 370/329 |
| 2016/0337879 | A1 * | 11/2016 | Hwang | H04L 5/0026 |
| 2018/0248594 | A1 * | 8/2018 | Hwang | H04L 5/0028 |
| 2019/0068247 | A1 * | 2/2019 | Hueber | G06F 1/3234 |
| 2019/0068274 | A1 * | 2/2019 | Han | H04B 7/15528 |
| 2020/0154511 | A1 * | 5/2020 | Pan | H04W 76/40 |
| 2020/0296735 | A1 * | 9/2020 | Makki | H04W 72/12 |
| 2021/0144691 | A1 * | 5/2021 | Balasubramanian | H04L 1/1812 |
| 2021/0184909 | A1 * | 6/2021 | Han | H04L 27/3488 |
| 2021/0235461 | A1 * | 7/2021 | Balasubramanian | H04W 72/082 |
| 2021/0282116 | A1 * | 9/2021 | Balasubramanian | H04L 5/0007 |
| 2021/0400692 | A1 * | 12/2021 | Balasubramanian | H04L 1/0004 |
| 2022/0061030 | A1 * | 2/2022 | Wu | H04W 72/042 |
| 2022/0159757 | A1 * | 5/2022 | Balasubramanian | H04W 68/005 |

FOREIGN PATENT DOCUMENTS

| | | | | |
|---|---|---|---|---|
| CN | 109743768 | A * | 5/2019 | |
| CN | 109743768 | B * | 4/2022 | |
| EP | 3286862 | A1 * | 2/2018 | ........... H04B 17/336 |
| EP | 3286862 | A4 * | 7/2018 | ........... H04B 17/336 |
| EP | 3286862 | B1 * | 9/2019 | ........... H04B 17/336 |
| EP | 3794757 | A1 * | 3/2021 | ........... H04L 1/1812 |
| WO | WO-2016180346 | A1 * | 11/2016 | ........... H04B 17/336 |
| WO | WO-2018039212 | A1 * | 3/2018 | ........... H04L 5/0053 |
| WO | WO-2019219164 | A1 * | 11/2019 | ........... H04L 1/1812 |
| WO | WO-2021096582 | A1 * | 5/2021 | ........... H04L 1/1812 |
| WO | WO-2021150339 | A1 * | 7/2021 | ........... H04W 52/06 |

* cited by examiner

RELAY OF SUPERPOSITIONED SIDELINK AND UPLINK TRANSMISSION

BACKGROUND

Technical Field

The present disclosure relates generally to communication systems, and more particularly, to multiple-user transmissions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a first communication device. An example apparatus receives, from a user equipment (UE), a multi-user simultaneous transmission (MUST) transmission including a base layer and an enhancement layer, the base layer comprising a first message for a second communication device and the enhancement layer comprising a second message for the first communication device. The example apparatus also decodes the base layer of the MUST transmission to obtain the first message. Additionally, the example apparatus receives a feedback message from the second communication device indicating that the second communication device did not successfully receive the first message. The example apparatus also retransmits the first message to the second communication device in response to the feedback message from the second communication device.

In another aspect of the disclosure, a method, a computer-readable medium, and an apparatus are provided for wireless communication of a first communication device. An example apparatus receives, from a UE, a MUST transmission including a base layer and an enhancement layer, the base layer comprising a first message for the first communication device and the enhancement layer comprising a second message for a second communication device. The example apparatus also attempts to decode the base layer of the MUST transmission to obtain the first message. Additionally, the example apparatus transmits feedback indicating that the first communication device did not successfully receive the first message. The example apparatus also receives a transmission of the first message from the second communication device in response to the feedback.

In another aspect of the disclosure, a method, a computer-readable medium, and an apparatus are provided for wireless communication of a UE. An example apparatus encodes a first message for a first communication device as a base layer of a MUST transmission. The example apparatus also encodes a second message for a second communication device as an enhancement layer of the MUST transmission. Additionally, the example apparatus transmits the MUST transmission to the first communication device and the second communication device.

In another aspect of the disclosure, a method, a computer-readable medium, and an apparatus are provided for wireless communication of a first UE. An example apparatus encodes a sidelink message for a second UE as base layer of a MUST transmission. The example apparatus also encodes an uplink message for a base station as an enhancement layer of the MUST transmission. Additionally, the example apparatus transmits the MUST transmission to the second UE and the base station.

In another aspect of the disclosure, a method, a computer-readable medium, and an apparatus are provided for wireless communication of a first UE. An example apparatus receives, from a second UE, a MUST transmission including a base layer and an enhancement layer, the base layer comprising a sidelink message for the first UE and the enhancement layer comprising an uplink message for a base station. The example apparatus also attempts to decode the base layer of the MUST transmission to obtain the sidelink message. Additionally, the example apparatus transmits feedback indicating that the first UE did not successfully receive the sidelink message. The example apparatus also receives a sidelink transmission from a base station comprising a retransmission of the sidelink message in response to the feedback.

In another aspect of the disclosure, a method, a computer-readable medium, and an apparatus are provided for wireless communication of a base station. An example apparatus receives, from a first UE, a MUST transmission including a base layer and an enhancement layer, the base layer comprising a sidelink message for a second UE and the enhancement layer comprising an uplink message for the base station. The example apparatus also decodes the base layer of the MUST transmission to obtain the sidelink message.

Additionally, the example apparatus receives a sidelink feedback message from the second UE indicating that the second UE did not successfully receive the sidelink message. The example apparatus also transmits the sidelink message to the second UE in a sidelink transmission in response to the sidelink feedback message signals from the second UE.

In another aspect of the disclosure, a method, a computer-readable medium, and an apparatus are provided for wireless communication of a first UE. An example apparatus receives, from a second UE, a MUST transmission including a base layer and an enhancement layer, the base layer comprising an uplink message for a base station and the enhancement layer comprising a sidelink message for the first UE. The example apparatus also decodes the base layer of the MUST transmission to obtain the uplink message. Additionally, the example apparatus receives downlink feedback from the base station indicating unsuccessful receipt of the base layer. The example apparatus also applies a relay strategy to determine whether to transmit the base layer as an uplink transmission to the base station in response to the feedback from the base station.

In another aspect of the disclosure, a method, a computer-readable medium, and an apparatus are provided for wireless communication of a first UE. An example apparatus encodes an uplink message for a base station as a base layer of a MUST transmission. The example apparatus also encodes sidelink message for a second UE as an enhancement layer of the MUST transmission. Additionally, the example apparatus transmits the MUST transmission including the base layer and the enhancement layer.

In another aspect of the disclosure, a method, a computer-readable medium, and an apparatus are provided for wireless communication of a base station. An example apparatus receives, from the first UE, a MUST transmission including a base layer and an enhancement layer, the base layer comprising an uplink message for base station and the enhancement layer comprising a sidelink message for the second UE. The example apparatus also attempts to decode the base layer of the MUST transmission to obtain the uplink message. Additionally, the example apparatus transmits, using a downlink control channel, feedback indicating that the base station did not successfully decode the base layer. The example apparatus also receives a retransmission of the uplink message from the second UE in response to the feedback.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
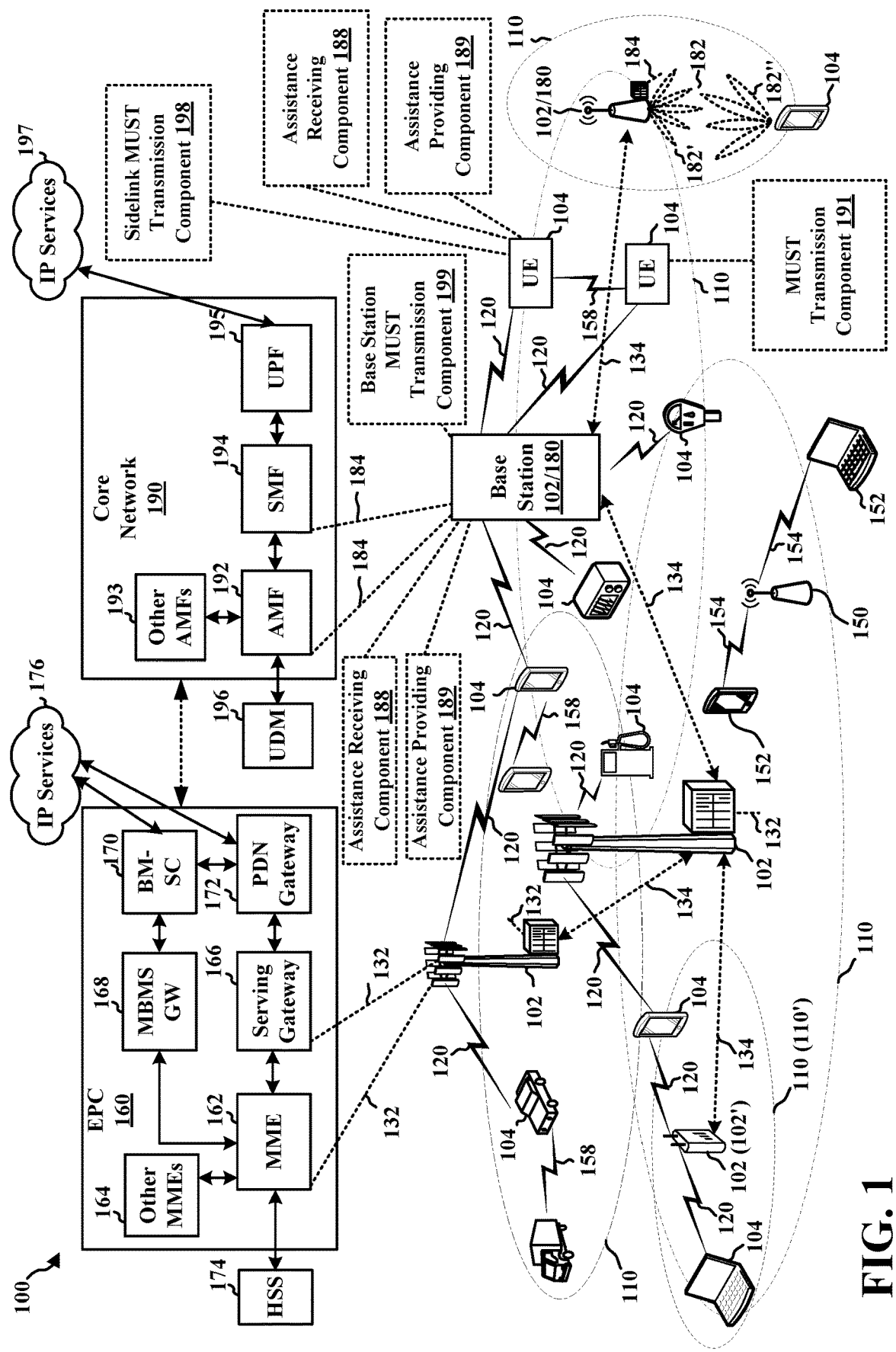
FIG. 1 is a diagram illustrating an example of a wireless communications system and an access network.

Sidelink communication enables a first user equipment (UE) to communicate with another UE directly. For example, the first UE and a second UE may communicate without routing the communication through a base station. As an example, sidelink may be beneficial for vehicle-based communications that allows a vehicle UE to communicate directly with another UE associated with, for example, another vehicle, a vulnerable road user (e.g., a pedestrian, a person on a bike, etc.), a network node, an infrastructure node, etc. Sidelink and the aspects presented herein are not limited to vehicular applications and may be applied for other types of sidelink devices.

Sidelink communications systems may provide resources for a UE to transmit a sidelink transmission that are separate from resources for uplink transmissions. Sidelink resources may be allocated in accordance with a mode 1 resource allocation (e.g., a centralized resource allocation) or a mode 2 resource allocation (e.g., a decentralized resource allocation). When employing mode 1, sidelink resources may be allocated for sidelink communication by a central entity, such as a base station. Thus, a UE may receive an allocation of resources from a base station that the UE may use for sidelink transmissions to another UE. When employing mode 2, the UE may autonomously select sidelink resources from a configured sidelink resource pool. The UE may employ a sensing procedure to monitor for sidelink reservations from other UEs and may select resources from the sidelink resource pool that are not reserved by the other UEs.

In some examples, a wireless communications system may support a multiple-user simultaneous transmissions (MUST) system that shares time and frequency resources. For example, a MUST transmission may include multiple streams of data intended for multiple communication devices, such as a UE or a base station. MUST transmissions may take advantage of the physical locations of the communication devices in the wireless communications system to enhance the overall data throughput of the resources. For example, in instances of signal-to-noise ratio (SNR) mismatch, a wireless device may perform superposition transmission where two or more messages are transmitted using a same set of resources instead of using separate resources for each of the messages. For example, a first communication device may transmit an enhancement layer to a second communication device that has a relatively higher geometry (e.g., a higher SNR that is typically associated with two communication devices that are physically close to each other) using overlapping resources with a base layer intended for a third communication device that has a relatively weaker geometry (e.g., a lower SNR that is typically associated with two communication devices that are physically far apart from each other). The MUST transmission may be combined (e.g., superposition) in various ways.

In some examples, a UE may leverage MUST transmissions to perform concurrent sidelink and uplink communications. For example, the UE may combine a base layer (message x) and an enhancement layer (message y) to transmit a MUST transmission to a second UE and to a base station. Performing concurrent sidelink and uplink communications may enable higher spectral efficiency as the enhancement layer message uses resources overlapping with the base layer message.

In some examples, a communication link between a first UE and a base station may be relatively stronger (e.g., having a higher geometry) than a communication link between the first UE and a second UE (e.g., due to a weaker geometry). In such examples, the sidelink message for transmission to the second UE may be encoded as the base layer of a MUST transmission and the uplink message for transmission to the base station may be encoded as the enhancement layer. For example, the first UE may transmit a sidelink message (message x) as the base layer of a MUST transmission to the second UE while concurrently transmitting an uplink message (message y) as the enhancement layer of the MUST transmission to the base station. However, there may be transmission errors in the sidelink message received by the second UE (e.g., due to the weaker communication link between the first UE and the second UE).

Aspects disclosed herein provide techniques for enabling the base station to enhance the reliability of the sidelink message (message x) being received by the second UE. That is, aspects disclosed herein provide techniques for enabling a base station to enhance sidelink reliability for sidelink communications with transmission that have been superposition encoded.

For example, the first UE may transmit a MUST transmission including a sidelink message (message x) as the base layer of the MUST transmission to the second UE while concurrently transmitting an uplink message (message y) as the enhancement layer of the MUST transmission to the base station. The second UE may or may not be able to decode the base layer (message x) and transmit a feedback message (e.g., an acknowledgement (ACK) message or a negative acknowledgement (NACK) message) accordingly. However, the base station may be configured to decode the base layer (message x) and the enhancement layer (message y). In examples in which the second UE is unable to decode the sidelink message (message x), the base station may relay the base layer message (message x) as a sidelink message to the second UE.

For example, the second UE may broadcast an ACK message after successfully decoding the base layer. The second UE may broadcast a NACK message when the second UE is unable to decode the base layer. The base station may use a sidelink feedback resource used by the second UE to transmit the NACK message to determine to which message the NACK message corresponds (e.g., the MUST transmission). For example, the second UE may be configured to use a first sidelink feedback resource to transmit an ACK/NACK message corresponding to a MUST transmission transmitted by the first UE. The base station may determine that the NACK message was transmitted by the second UE using the first sidelink feedback resource and determine that the second UE was unable to decode the base layer of the MUST transmission. In such examples, the base station may transmit the base layer message (message x) to the second UE.

In this manner, aspects disclosed herein enable the base station to enhance the reliability of the sidelink message (message x) being received by the second UE by relaying the base layer message to the second UE.

In some examples, a communication link between a first UE and a second UE may be relatively stronger (e.g., having a higher geometry) than a communication link between the first UE and a base station (e.g., due to a weaker geometry). In such examples, the uplink message for transmission to the base station may be encoded as the base layer of a MUST transmission and the sidelink message for transmission to the second UE may be encoded as the enhancement layer. For example, the first UE may transmit an uplink message (message x) as the base layer of a MUST transmission to the base station while concurrently transmitting a sidelink message (message y) as the enhancement layer of the MUST transmission to the second UE. However, there may be transmission errors in the uplink message received by the base station (e.g., due to the weaker communication link between the first UE and the base station).

Aspects disclosed herein provide techniques for enabling the second UE to enhance the reliability of the uplink message (message x) being received by the base station. That is, aspects disclosed herein provide techniques for enabling a second UE to enhance uplink reliability for transmissions that have been superposition encoded.

For example, the first UE may transmit a MUST transmission including an uplink message (message x) as the base layer of the MUST transmission to the base station while concurrently transmitting a sidelink message (message y) as the enhancement layer of the MUST transmission to the second UE. The base station may or may not be able to decode the base layer (message x) and transmit a feedback message (e.g., an acknowledgement (ACK) message or a negative acknowledgement (NACK) message) accordingly. However, the second UE may be configured to decode the base layer (message x) and the enhancement layer (message y). In examples in which the base station is unable to decode the uplink message (message x), the second UE may relay the base layer message (message x) as an uplink message to the base station.

For example, the base station may broadcast an ACK message after successfully decoding the base layer. The base station may broadcast a NACK message when the base station is unable to decode the base layer. The second UE may use a MUST transmission-specific radio network temporary identifier (RNTI) to decode the NACK message to determine to which message the NACK message corresponds (e.g., the MUST transmission). For example, the base station may use a MUST transmission-specific RNTI (e.g., a "relay-MUST-RNTI") to encode the NACK message. The second UE may receive the feedback message transmitted by the base station and determine that the base station was unable to decode the base layer of the MUST transmission by decoding the feedback message using the relay-MUST-RNTI. In such examples, the second UE may transmit the base layer message (message x) to the base station as an uplink message.

In this manner, aspects disclosed herein enable the second UE to enhance the reliability of the uplink message (message x) being received by the base station by relaying the base layer message to the base station.

In view of the above, it may be appreciated that in some examples, a wireless communications system may include a MUST transmitting UE, an assistance-providing communication device, and an assistance-receiving communication device. In some examples in which the base layer message comprises a sidelink message, the assistance-providing communication device may comprise a base station and the assistance-receiving communication device may comprise a sidelink UE. In some examples in which the base layer message comprises an uplink message, the assistance-providing communication device may comprise a sidelink UE and the assistance-receiving communication device may comprise a base station.

As used herein, the terms "MUST transmission," "concurrent transmission," and "superposition transmission," and variants thereof, are used interchangeably.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100 in which base stations 102 or 180 may wirelessly communicate with UEs 104. Some examples of device-to-device (D2D) communications may include vehicle-based communication devices that can communicate from vehicle-to-vehicle (V2V), vehicle-to-infrastructure (V2I) (e.g., from the vehicle-based communication device to road infrastructure nodes such as a Road Side Unit (RSU)), vehicle-to-network (V2N) (e.g., from the vehicle-based communication device to one or more network nodes, such as a base station), vehicle-to-pedestrian (V2P), cellular vehicle-to-everything (C-V2X), and/or a combination thereof and/or with other devices, which can be collectively referred to as vehicle-to-anything (V2X) communications. Sidelink communication may be based on V2X or other D2D communication, such as Proximity Services (ProSe), etc. In addition to UEs, sidelink communication may also be transmitted and received by other transmitting and receiving devices, such as Road Side Units (RSUs), etc. Sidelink communication may be exchanged using a PC5 interface, such as described in connection with the example in FIG. 4. In some examples, an intermediary device (e.g., such as a base station 102 or 180) may facilitate communication between an originating device (e.g., a first UE) and a target device (e.g., a second UE) using sidelink communication. For example, a base station may allocate resources for sidelink communication, in some examples. In other examples, the devices may communicate without assistance from an intermediary device. Although the following description, including the example slot structure of FIG. 4, may provide examples for sidelink communication in connection with 5G NR, the concepts described herein may be applicable to other similar areas, such as LTE, LTE-A, CDMA, GSM, and other wireless technologies.

In some examples, a sidelink communication device, such as a transmitting UE 104, may be configured to manage one or more aspects of wireless communication by facilitating base stations to serve as a MUST relay for superposition transmissions of sidelink and uplink communications. As an example, in FIG. 1, the transmitting UE 104 may include a MUST transmission component 191 configured to encode a sidelink message for a second UE as base layer of a MUST transmission. The example MUST transmission component 191 may also be configured to encode an uplink message for a base station as an enhancement layer of the MUST transmission. The example MUST transmission component 191 may also be configured to transmit the MUST transmission to the second UE and the base station.

Still referring to FIG. 1, a receiving UE 104 may include a sidelink MUST transmission component 198 configured to receive, from a second UE, a MUST transmission including a base layer and an enhancement layer, the base layer comprising a sidelink message for the first UE and the enhancement layer comprising an uplink message for a base station. The example sidelink MUST transmission component 198 may also be configured to attempt to decode the base layer of the MUST transmission to obtain the sidelink message. The example sidelink MUST transmission component 198 may also be configured to transmit feedback indicating that the first UE did not successfully receive the sidelink message. The example sidelink MUST transmission component 198 may also be configured to receive a sidelink transmission from a base station comprising a retransmission of the sidelink message in response to the feedback.

Still referring to FIG. 1, a base station, such as the base station 102 or 180, may be configured to manage one or more aspects of wireless communication by serving as a MUST relay for superposition transmissions of sidelink and uplink communications. As an example, in FIG. 1, the base station 102/180 may include a base station MUST transmission component 199 configured to receive, from a first UE, a MUST transmission including a base layer and an enhancement layer, the base layer comprising a sidelink message for a second UE and the enhancement layer comprising an uplink message for the base station. The example base station MUST transmission component 199 may also be configured to decode the base layer of the MUST transmission to obtain the sidelink message. The example base station MUST transmission component 199 may also be configured to receive a sidelink feedback message from the second UE indicating that the second UE did not successfully receive the sidelink message. The example base station MUST transmission component 199 may also be configured to transmit the sidelink message to the second UE in a sidelink transmission in response to the sidelink feedback message signals from the second UE.

In some examples, a sidelink communication device, such as a transmitting UE 104, may be configured to manage one or more aspects of wireless communication by facilitating base stations to serve as a MUST relay for superposition transmissions of sidelink and uplink communications. As an example, in FIG. 1, the transmitting UE 104 may include a MUST transmission component 191 configured to encode an uplink message for a base station as a base layer of a MUST transmission. The example MUST transmission component 191 may also be configured to encode a sidelink message for a second UE as an enhancement layer of the MUST transmission. The example MUST transmission component 191 may also be configured to transmit the MUST transmission including the base layer and the enhancement layer.

Still referring to FIG. 1, a receiving UE 104 may include a sidelink MUST transmission component 198 configured to receive, from a second UE, a MUST transmission including a base layer and an enhancement layer, the base layer comprising an uplink message for a base station and the enhancement layer comprising a sidelink message for the first UE. The example sidelink MUST transmission component 198 may also be configured to decode the base layer of the MUST transmission to obtain the uplink message. The example sidelink MUST transmission component 198 may also be configured to receive downlink feedback from the base station indicating unsuccessful receipt of the base layer. The example sidelink MUST transmission component 198 may also be configured to apply a relay strategy to determine whether to transmit the base layer as an uplink transmission to the base station in response to the feedback from the base station.

Still referring to FIG. 1, a base station, such as the base station 102 or 180, may be configured to manage one or more aspects of wireless communication by serving as a MUST relay for superposition transmissions of sidelink and uplink communications. As an example, in FIG. 1, the base station 102/180 may include a base station MUST transmission component 199 configured to receive, from the first UE, a MUST transmission including a base layer and an enhancement layer, the base layer comprising an uplink message for base station and the enhancement layer comprising a sidelink message for the second UE. The example base station MUST transmission component 199 may also be configured to attempt to decode the base layer of the MUST transmission to obtain the uplink message. The example base station MUST transmission component 199 may also be configured to transmit, using a downlink control channel, feedback indicating that the base station did not successfully decode the base layer. The example base station MUST transmission component 199 may also be configured to receive a retransmission of the uplink message from the second UE in response to the feedback.

In some examples, a transmitting UE 104 may be configured to manage one or more aspects of wireless communication by facilitating assistance-providing devices to serve as a MUST relay for superposition transmissions of sidelink and uplink communications. As an example, in FIG. 1, the transmitting UE 104 may include a MUST transmission component 191 configured to encode a first message for a first communication device as a base layer of a MUST transmission. The example MUST transmission component 191 may also be configured to encode a second message for a second communication device as an enhancement layer of the MUST transmission. The example MUST transmission component 191 may also be configured to transmit the MUST transmission to the first communication device and the second communication device.

Still referring to FIG. 1, an assistance-providing device, such as the base station 102/180 or the receiving UE 104, may be configured to manage one or more aspects of wireless communication by serving as a MUST relay for superposition transmissions of sidelink and uplink communications. As an example, the assistance-providing device (e.g., the base station 102/180 or the receiving UE 104) may include an assistance providing component 189 configured to receive, from a UE, a MUST transmission including a base layer and an enhancement layer, the base layer comprising a first message for a second communication device and the enhancement layer comprising a second message for the first communication device. The example assistance providing component 189 may also be configured to decode the base layer of the MUST transmission to obtain the first message. The example assistance providing component 189 may also be configured to receive a feedback message from the second communication device indicating that the second communication device did not successfully receive the first message. The example assistance providing component 189 may also be configured to retransmit the first message to the second communication device in response to the feedback message from the second communication device.

Still referring to FIG. 1, an assistance-receiving device, such as the receiving UE 104 or the base station 102/180, may be configured to manage one or more aspects of wireless communication by receiving base layer messages of superposition transmissions of sidelink and uplink communications from an assistance-providing device. As an example, an assistance-receiving device (e.g., the receiving UE 104 or the base station 102/180) may include an assistance receiving component 188 configured to receive, from a UE, a MUST transmission including a base layer and an enhancement layer, the base layer comprising a first message for the first communication device and the enhancement layer comprising a second message for a second communication device. The example assistance receiving component 188 may also be configured to attempt to decode the base layer of the MUST transmission to obtain the first message. Additionally, the example assistance receiving component 188 may be configured to transmit feedback indicating that the first communication device did not successfully receive the first message. The example assistance receiving component 188 may be configured to receive a transmission of the first message from the second communication device in response to the feedback.

Although the following description provides examples directed to 5G NR (and, in particular, to multiple-user simultaneous transmissions via 5G NR), the concepts described herein may be applicable to other similar areas, such as LTE, LTE-A, CDMA, GSM, and/or other wireless technologies, in which wireless communication devices may employ concurrent sidelink and uplink communications using a MUST transmission.

The wireless communications system (also referred to as a wireless wide area network (WWAN)) includes the base stations 102, the UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
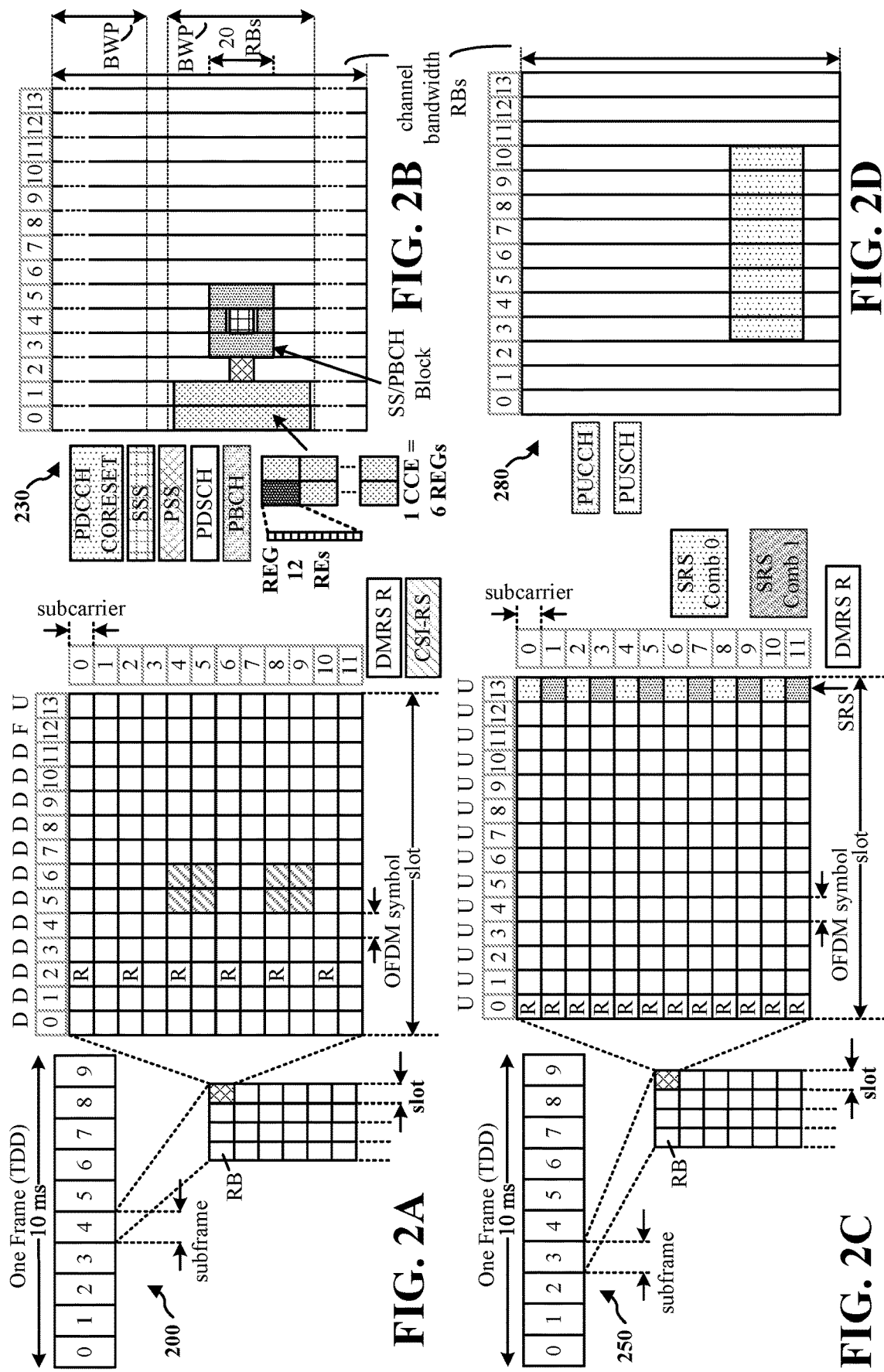
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 4:
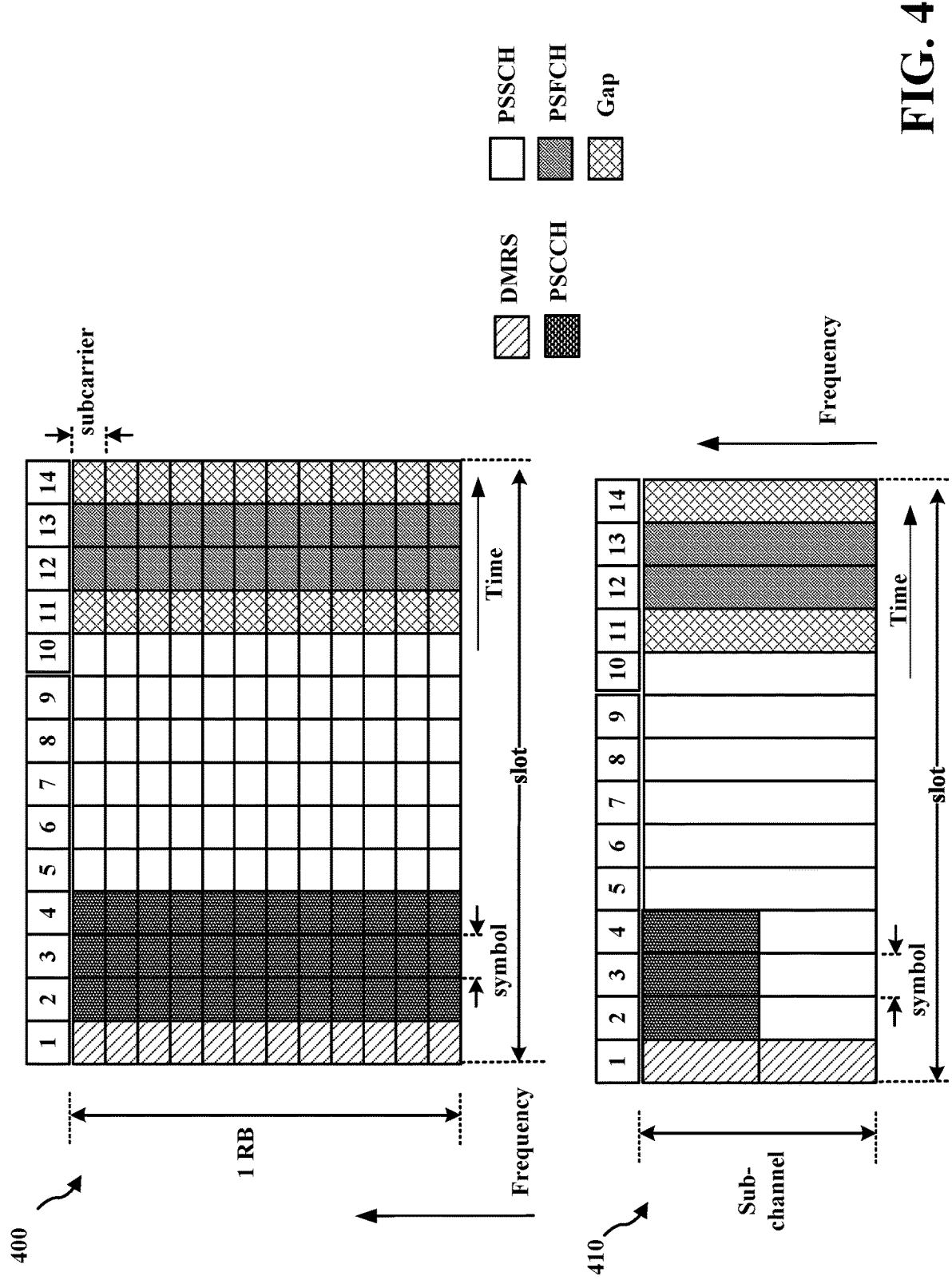
FIG. 4 illustrates example aspects of a sidelink slot structure.

FIG. 4 illustrates example diagrams 400 and 410 illustrating examples slot structures that may be used for wireless communication between UE 104 and UE 104', e.g., for sidelink communication. The slot structure may be within a 5G/NR frame structure. Although the following description may be focused on 5G NR, the concepts described herein may be applicable to other similar areas, such as LTE, LTE-A, CDMA, GSM, and other wireless technologies. This is merely one example, and other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. Diagram 400 illustrates a single slot transmission, e.g., which may correspond to a 0.5 ms transmission time interval (TTI). Diagram 410 illustrates an example two-slot aggregation, e.g., an aggregation of two 0.5 ms TTIs. Diagram 400 illustrates a single RB, whereas diagram 410 illustrates N RBs. In diagram 410, 10 RBs being used for control is merely one example. The number of RBs may differ.

A resource grid may be used to represent the frame structure. Each time slot may include a resource block (RB) (also referred to as physical RBs (PRBs)) that extends 12 consecutive subcarriers. The resource grid is divided into multiple resource elements (REs). The number of bits carried by each RE depends on the modulation scheme. As illustrated in FIG. 4, some of the REs may include control information, e.g., along with demodulation RS (DMRS). FIG. 4 also illustrates that symbol(s) may include CSI-RS. The symbols in FIG. 4 that are indicated for DMRS or CSI-RS indicate that the symbol includes DMRS or CSI-RS REs. Such symbols may also include REs that include data. For example, if a number of ports for DMRS or CSI-RS is 1 and a comb-2 pattern is used for DMRS/CSI-RS, then half of the REs may include the RS and the other half of the REs may include data. A CSI-RS resource may start at any symbol of a slot, and may occupy 1, 2, or 4 symbols depending on a configured number of ports. CSI-RS can be periodic, semi-persistent, or aperiodic (e.g., based on control information triggering). For time/frequency tracking, CSI-RS may be either periodic or aperiodic. CSI-RS may be transmitted in bursts of two or four symbols that are spread across one or two slots. The control information may include Sidelink Control Information (SCI). At least one symbol may be used for feedback, as described herein. A symbol prior to and/or after the feedback may be used for turnaround between reception of data and transmission of the feedback. Although symbol 12 is illustrated for data, it may instead be a gap symbol to enable turnaround for feedback in symbol 13. Another symbol, e.g., at the end of the slot may be used as a gap. The gap enables a device to switch from operating as a transmitting device to prepare to operate as a receiving device, e.g., in the following slot. Data may be transmitted in the remaining REs, as illustrated. The data may include the data message described herein. The position of any of the SCI, feedback, and LBT symbols may be different than the example illustrated in FIG. 4. Multiple slots may be aggregated together. FIG. 4 also illustrates an example aggregation of two slot. The aggregated number of slots may also be larger than two. When slots are aggregated, the symbols used for feedback and/or a gap symbol may be different that for a single slot. While feedback is not illustrated for the aggregated example, symbol(s) in a multiple slot aggregation may also be allocated for feedback, as illustrated in the one slot example.

Figure 3:
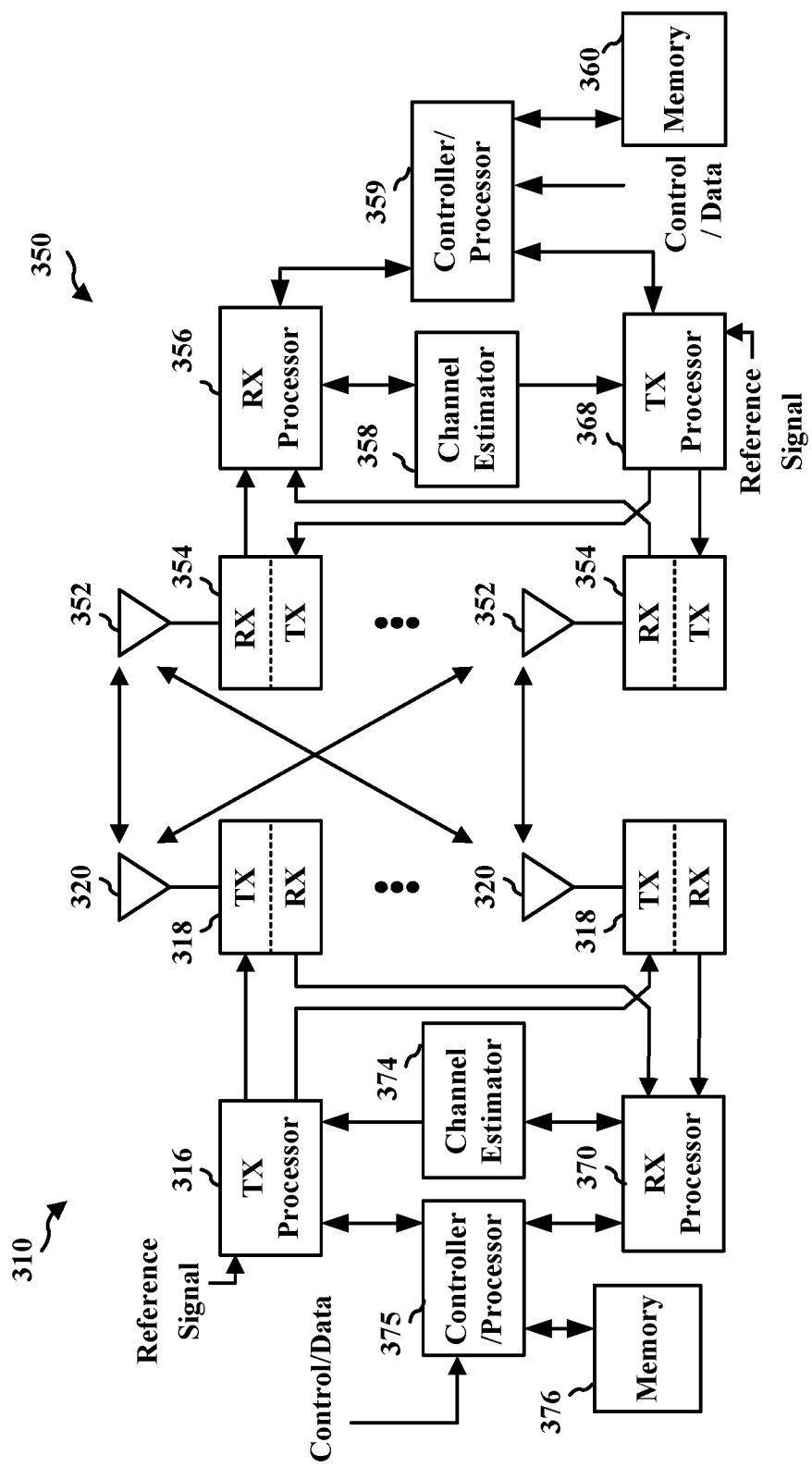
FIG. 3 is a diagram illustrating an example of a first communication device and a second communication device.

FIG. 3 is a block diagram of first communication device 310 in communication with a second communication device 350. In some examples, the communication between the communication devices 310, 350 may be based on sidelink. For example, the first communication device may comprise a transmitting device (e.g., the transmitting UE 104 of FIG. 1) communicating with one or more target devices using the second communication device 350 (e.g. the receiving UE 104 of FIG. 1). The first communication device 310 may communicate with the second communicate device 350 using sidelink communication. The first communication device 310 and/or the second communication device 350 may comprise a UE, an access point, a base station, a road side unit (RSU), etc.

In some examples, the communication between the communication devices 310, 350 may be in an access network. For example, the first communication device 310 may comprise a base station (e.g., the base station 102 or 180 of FIG. 1) and the second communication device 350 may comprise a UE (e.g., the UE 104) of FIG. 1). In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor (e.g., a TX processor 316) and the receive (RX) processor (e.g., an RX processor 370) implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to an RX processor 356. A TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by a channel estimator 358. The soft decisions are then decoded and deinterleaved to recover the data and control signals that were originally transmitted by the base station 310 on the physical channel. The data and control signals are then provided to a controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by the channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to the RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

In aspects in which the first communication device 310 comprises a base station, at least one of the TX processor 316, the RX processor 370, and the controller/processor 375 may be configured to perform aspects in connection with the base station MUST transmission component 199, the assistance receiving component 188, and/or the assistance providing component 189 of FIG. 1.

In aspects in which the first communication device 310 is in communication with the second communication device 350 based on sidelink, at least one of the TX processor 316 or 368, the RX processor 356 or 370, and the controller/processor 359 or 375 may be configured to perform aspects in connection with the MUST transmission component 191, the sidelink MUST transmission component 198, the assistance receiving component 188, and/or the assistance providing component 189 of FIG. 1.

Sidelink communication enables a first user equipment (UE) to communicate with another UE directly. For example, the first UE and a second UE may communicate without routing the communication through a base station. As an example, sidelink may be beneficial for vehicle-based communications that allows a vehicle UE to communicate directly with another UE associated with, for example, another vehicle, a vulnerable road user (e.g., a pedestrian, a person on a bike, etc.), a network node, an infrastructure node, etc. Sidelink and the aspects presented herein are not limited to vehicular applications and may be applied for other types of sidelink devices.

Sidelink communications systems may provide resources for a UE to transmit a sidelink transmission that are separate from resources for uplink transmissions. Sidelink resources may be allocated in accordance with a mode 1 resource allocation (e.g., a centralized resource allocation) or a mode 2 resource allocation (e.g., a decentralized resource allocation). When employing mode 1, sidelink resources may be allocated for sidelink communication by a central entity, such as a base station. Thus, a UE may receive an allocation of resources from a base station that the UE may use for sidelink transmissions to another UE. When employing mode 2, the UE may autonomously select sidelink resources from a configured sidelink resource pool. The UE may employ a sensing procedure to monitor for sidelink reservations from other UEs and may select resources from the sidelink resource pool that are not reserved by the other UEs.

Figure 5:
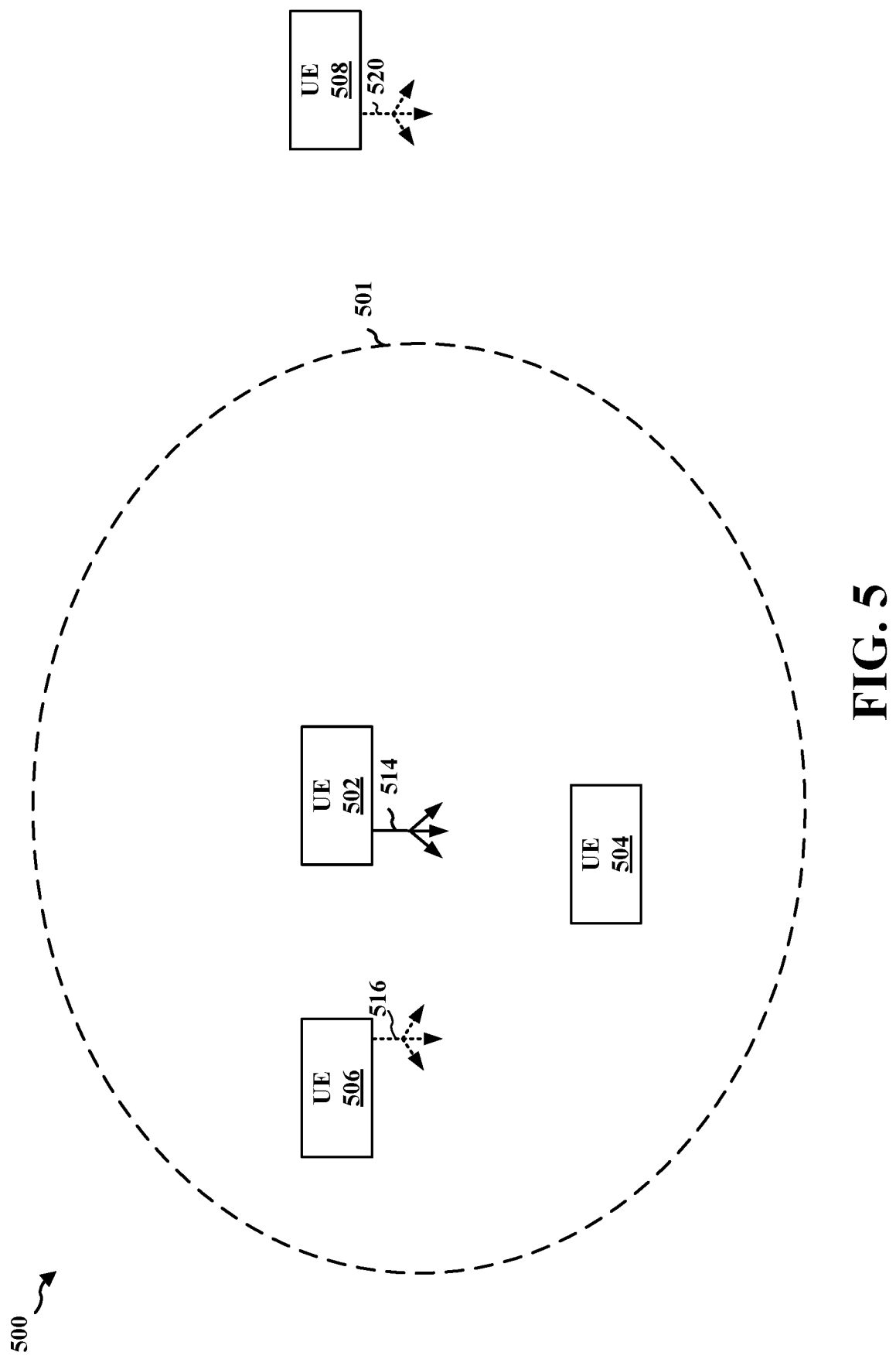
FIG. 5 is an example diagram illustrating wireless communication between devices based on sidelink communication.

FIG. 5 illustrates an example 500 wireless communication between devices based on sidelink communication. The communication may be based on a slot structure comprising aspects described in connection with FIG. 4. For example, transmitting UE 502 may transmit a transmission 514, e.g., comprising a control channel and/or a corresponding data channel, that may be received by receiving UEs 504, 506, 508. A control channel may include information for decoding a data channel and may also be used by a receiving device to avoid interference by refraining from transmitting on the occupied resources during a data transmission. The number of TTIs, as well as the RBs that will be occupied by the data transmission, may be indicated in a control message from the transmitting device. The UEs 502, 504, 506, 508 may each be capable of operating as a transmitting device in addition to operating as a receiving device. Thus, UEs 506, 508 are illustrated as transmitting a transmission 516, 520. The transmissions 514, 516, 520 may be broadcast or multicast to nearby devices. For example, the UE 502 may transmit communication intended for receipt by other UEs within a range 501 of UE 514.

Figure 6:
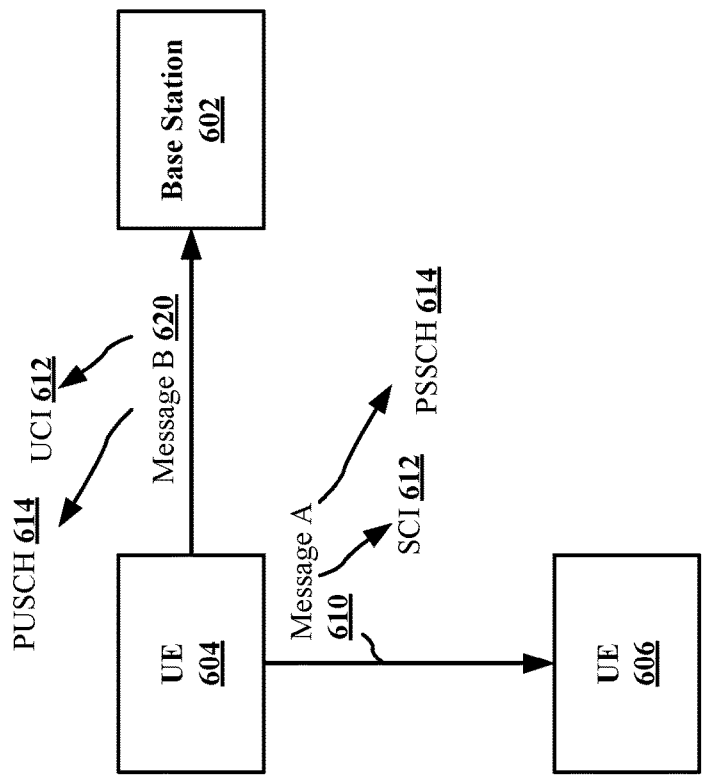
FIG. 6 illustrates an example of wireless communication between a base station, a first UE, and a second UE, in accordance with the teachings disclosed herein.

FIG. 6 illustrates an example 600 of wireless communication between a base station 602, a first UE 604, and a second UE 604, as presented herein. In the illustrated example of FIG. 6, the first UE 604 (e.g., a transmitting UE) is configured to transmit a first message 610 ("Message A") to the second UE 606 (e.g., a sidelink UE) using a sidelink transmission. The first message 610 may comprise control information (e.g., SCI 612) and a data channel (e.g., PSSCH 614). The control information of the first message 610 may include information regarding when the first UE 604 will retransmit a message, for example, in case the second UE 604 is unable to decode the first message 610. The first UE 604 is also configured to transmit a second message 620 ("Message B") to the base station 602 using an uplink transmission. The second message 620 may comprise control information (e.g., UCI 622) and/or a data channel (e.g., PUSCH 624).

In some examples, the first UE 604 may transmit the first message 610 to the second UE 606 using a first resource (e.g., a time and/or frequency resource). The first UE 604 may also transmit the second message 620 to the base station 602 using a second resource that is different than the first resource.

However, in some examples, a wireless communications system may support a MUST system that shares time and frequency resources. For example, a MUST transmission may include multiple streams of data intended for multiple communication devices, such as a UE or a base station. MUST transmissions may take advantage of the physical locations of the communication devices in the wireless communications system to enhance the overall data throughput of the resources. For example, in instances of SNR mismatch, a wireless device may perform superposition transmission where two or more messages are transmitted using a same set of resources instead of using separate resources for each of the messages.

For example, a first communication device may transmit an enhancement layer to a second communication device that has a relatively higher geometry (e.g., a higher SNR that is typically associated with two communication devices that are physically close to each other) using overlapping resources with a base layer intended for a third communication device that has a relatively weaker geometry (e.g., a lower SNR that is typically associated with two communication devices that are physically far apart from each other). The MUST transmission may be combined (e.g., superposition) in various ways.

In some examples, the UE may leverage MUST transmissions to perform concurrent sidelink and uplink communications. For example, the first UE 604 of FIG. 6 may combine a base layer message and an enhancement layer message to transmit a MUST transmission to the second UE 606 and/or to the base station 602. Performing concurrent sidelink and uplink communications may enable higher spectral efficiency as the enhancement layer message uses resources overlapping with the base layer message. For example, the first UE 604 may transmit a MUST transmission including the base layer message and the enhancement layer message using the same frequency and/or time resource.

Superposition Transmission of Sidelink and Uplink with Base Station as Relay

In some examples, a communication link between a first UE and a base station may be relatively stronger (e.g., having a higher geometry) than a communication link between the first UE and a second UE (e.g., due to a weaker geometry). In such examples, the sidelink message for transmission to the second UE may be encoded as the base layer of a MUST transmission and the uplink message for transmission to the base station may be encoded as the enhancement layer.

Figure 7:
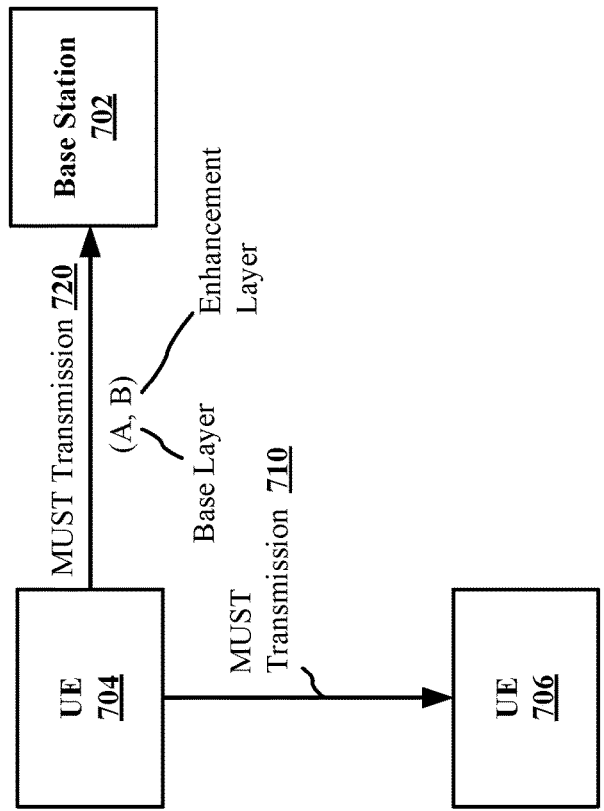
FIG. 7 illustrates an example of wireless communication between devices using MUST transmissions, in accordance with the teachings disclosed herein.

FIG. 7 illustrates an example 700 of wireless communication between devices using MUST transmissions, as presented herein. Aspects of a base station 702 may be implemented by the base station 602 of FIG. 6, aspects of the first UE 704 may be implemented by the first UE 604 of FIG. 6, and aspects of the second UE 706 may be implemented by the second UE 606 of FIG. 6.

In the illustrated example of FIG. 7, the first UE 704 is configured to transmit the message A to the second UE 706 using a sidelink transmission and to transmit the message B to the base station 702 using an uplink transmission. In the illustrated example, the communication link between the first UE 704 and the base station 702 may be relatively stronger than the communication link between the first UE 704 and the second UE 706. Additionally, the communication link between the first UE 704 and the base station 702 may facilitate the first UE 704 transmitting a MUST transmission to the base station 702. For example, the communication link between the first UE 704 and the base station 702 may be associated with a relatively high SNR to enable the first UE 704 to transmit two or more messages using a same frequency and/or time resource.

As shown in FIG. 7, the first UE 704 may transmit a first MUST transmission 710 to the second UE 706 using sidelink on a first resource. The first UE 704 may transmit a second MUST transmission 720 to the base station 702 using an uplink transmission on a second resource. The MUST transmissions 710, 720 may contain the first message (message A) and the second message (message B). For example, the base layer of the MUST transmissions 710, 720 may be encoded with the sidelink message (message A) and the enhancement layer of the MUST transmissions 710, 720 may be encoded with the uplink message (message B). Thus, it may be appreciated that the base layer of the MUST transmissions 710, 720 may be encoded based on the relatively weaker link (e.g., based on the sidelink message) and the enhancement layer of the MUST transmissions 710, 720 may be encoded based on the relatively stronger link (e.g., based on the uplink message).

Although the first MUST transmission 710 may include the sidelink message and the uplink message, the second UE 706 may be configured to decode the sidelink message and not the uplink message. For example, the second UE 706 may be configured to decode the base layer of the first MUST transmission 710 and may not be configured to decode the enhancement layer of the first MUST transmission 710. However, the base station 702 may be configured to decode the base layer and the enhancement layer of the second MUST transmission 720.

In some examples, there may be transmission errors in the first MUST transmission 710 received by the second UE 706 (e.g., due to the weaker communication link between the first UE 704 and the second UE 706). For example, the second UE 706 may be unable to decode the base layer of the first MUST transmission 710 and/or may not receive the first MUST transmission 710.

Aspects disclosed herein provide techniques for enabling the base station 702 to enhance the reliability of the sidelink message (message A) being received by the second UE 706. That is, aspects disclosed herein provide techniques for enabling the base station 702 to enhance sidelink reliability for sidelink communications with transmissions that have been superposition encoded.

Figure 8:
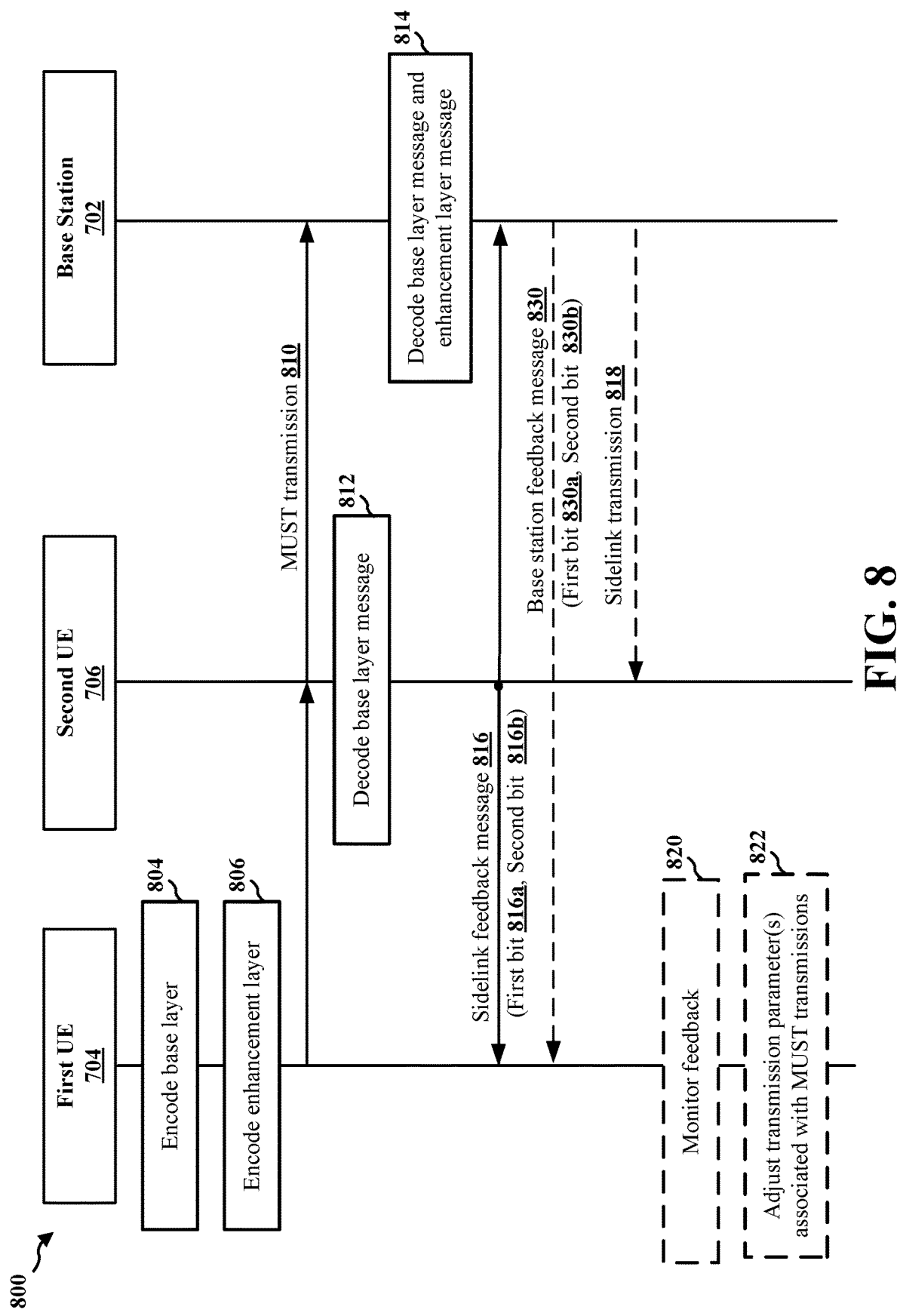
FIG. 8 illustrates an example communication flow between a base station, a first UE, and a second UE, in accordance with the teachings disclosed herein.

FIG. 8 illustrates an example communication flow 800 between the base station 702, the first UE 704, and the second UE 706 of FIG. 7, as presented herein. In the illustrated example, the communication flow 800 facilitates the base station 702 to enhance sidelink reliability for sidelink communications between the first UE 704 and the second UE 706 with transmissions that have been superposition encoded. Although not shown in the illustrated example of FIG. 8, it may be appreciated that in additional or alternative examples, the base station 702 may be in communication with one or more other base stations or UEs, and/or the UEs 704, 706 may be in communication with one or more other base stations or UEs.

At 804, the first UE 704 encodes a sidelink message as a base layer of a MUST transmission. For example, the first UE 704 may encode the sidelink message 610 (message A) of FIG. 6 as the base layer.

At 806, the first UE 704 encodes an uplink message as an enhancement layer of the MUST transmission. For example, the first UE 704 may encode the uplink message 620 (message B) of FIG. 6 as the enhancement layer.

In the illustrated example, the first UE 704 transmits a MUST transmission 810 that is received by the second UE 706 and the base station 702. The MUST transmission 810 may correspond to the MUST transmissions 710, 720 of FIG. 7. For example, the MUST transmission 810 may facilitate the concurrent transmission of a sidelink message (message A) and an uplink message (message B). The first UE 704 may encode the sidelink message (message A) as the base layer of the MUST transmission 810 (at 804) and may encode the uplink message (message B) as the enhancement layer of the MUST transmission 810 (at 806). In this manner, the first UE 704 may improve spectral efficiency by using one resource for transmitting the sidelink message and the uplink message.

The MUST transmission 810 may comprise control information and a data channel. In some examples, the first UE 704 may superposition encode the control information of the base layer and the enhancement layer. For example, the first UE 704 may superposition encode the SCI 612 of the sidelink message 610 and the UCI 622 of the uplink message 620 of FIG. 6. In some examples, the first UE 704 may not perform superposition encoding on the control information. For example, the first UE 704 may transmit the control information of the sidelink message (e.g., the SCI 612) and/or the control information of the uplink message (e.g., the UCI 622). The first UE 704 may determine not to perform superposition encoding on the control information to enhance the reliability of the second UE 704 receiving and decoding the control information corresponding to the base layer message (e.g., the SCI 612).

In a similar manner, the first UE 704 may superposition encode the data channel of the base layer and the enhancement layer. For example, the first UE 704 may superposition encode the PSSCH 624 of the sidelink message 610 and the PUSCH 624 of the uplink message 620 of FIG. 6. In some examples, the first UE 704 may not perform superposition encoding on the data channel. For example, the first UE 704 may transmit the data channel of the sidelink message (e.g., the PSSCH 622) and/or the data channel of the uplink message (e.g., the PUSCH 624). The first UE 704 may determine not to perform superposition encoding on the data channel to enhance the reliability of the second UE 704 receiving and decoding the data channel corresponding to the base layer message (e.g., the PSSCH 622).

At 812, the second UE 606 attempts to decode the base layer message (e.g., message A) of the received MUST transmission 810. As described above, the second UE 606 may be configured to decode the base layer of a MUST transmission and not configured to decode the enhancement layer of the MUST transmission. The second UE 606 may or may not be able to decode the base layer message of the MUST transmission 810. The second UE 706 may decode the control information of the MUST transmission 810. For example, the first UE 704 may encode the SCI 612 using an encoding rate that is low and, thus, allows additional redundancy in the control information.

As shown in FIG. 8, the second UE 606 transmits a sidelink feedback message 816. The second UE 606 may transmit the sidelink feedback message 816 using sidelink. For example, the sidelink feedback message 816 may be broadcast and received by the first UE 704 and the base station 702. The sidelink feedback message 816 may comprise an ACK message when the second UE 606 successfully decodes the base layer message (at 812). The sidelink feedback message 816 may comprise a NACK message when the second UE 606 is not able to decode the base layer message (at 812).

At 814, the base station 702 decodes the base layer message and the enhancement layer message of the received MUST transmission 810. For example, the base station 702 may be configured to decode the base layer of the MUST transmission 810 to receive the base layer message (e.g., the SCI 612 and the PSSCH 614 of the message A). The base station 702 may also be configured to decode the enhancement layer of the MUST transmission 810 to receive the enhancement layer message (e.g., the UCI 622 and the PUSCH 624 of the message B). In some examples, the base station 702 may be configured to decode the base layer of the MUST transmission 810 before attempting to decode the enhancement layer of the MUST transmission 810.

The base station 702 may transmit a base station feedback message 830 that is received by the first UE 704. The base station 702 may transmit the base station feedback message 830 using a downlink transmission. The base station feedback message 830 may comprise an ACK message or a NACK message based on whether the base station 702 was able to successfully decode the MUST transmission 810.

In some examples, based on whether the second UE 706 successfully decoded the base layer message of the MUST transmission 810, the base station 702 may relay the decoded base layer message (message A) to the second UE 706. For example, the sidelink feedback message 816 may comprise a NACK message. In some such examples, the base station 702 may transmit the decoded base layer message (message A) to the second UE 706 as a sidelink transmission 818.

In some examples, the base station 702 may apply different relay strategies when relaying the sidelink transmission 818 to the second UE 706. In a first relay strategy, the base station 702 may relay the sidelink transmission 818 at a same time (e.g., slot) when the first UE 704 is performing a retransmission of the sidelink message (e.g., the message A) to the second UE 706. For example, because the base station 702 is able to decode the base layer message (e.g., the SCI 612 and the PSSCH 614 of the message A), the base station 702 may be able to determine when the first UE 704 is configured to transmit a retransmission of the message A. In some such examples, the base station 702 may transmit the sidelink transmission 818 at the same instant (e.g., slot) that the first UE 702 is transmitting a retransmission of the message A. In some such examples, the second UE 706 may experience a power gain with respect to the message A and increase the reliability with which the second UE 706 successfully decodes the message A.

In a second relay strategy, the base station 702 may transmit the sidelink transmission 818 to the second UE 706 using a configured resource. In some examples, the configured resource may be at a different time than the first UE 704 is configured to transmit the retransmission of the message A to the second UE 706. In some examples, the resource used by the base station 702 for the sidelink transmission 818 may depend on (1) a slot and/or resource used for the original transmission from the source UE to the target UE (e.g., from the first UE 704 to the second UE 706), (2) a source ID (e.g., an identifier of the first UE 704), and (3) a destination ID (e.g., an identifier of the second UE 706). For example, the base station 702 may apply Equation 1 (below) to determine the resource to use to transmit the sidelink transmission 818 to the second UE 706.

$$\text{Resource} = n + \text{sourceID} \bmod N_1 + \text{destinationID} \bmod N_2 \qquad \text{Equation 1:}$$

In Equation 1, the parameter "n" represents the resource associated with the original transmission, the parameter "sourceID" represents the identifier of the source UE (e.g., the first UE 704), the parameter "destinationID" represents the identifier of the destination UE (e.g., the second UE 706), the parameter "$N_1$" represents a modification to apply to the sourceID, and the parameter "$N_2$" represents a modification to apply to the destinationID. The parameters $N_1$, $N_2$ may be configured (e.g., via RRC signaling) or may be signaled (e.g., via a MAC-control element (MAC-CE) or DCI).

The second UE 706 may use Equation 1 (above) to determine when the base station 702 may transmit the sidelink transmission 818. By applying Equation 1, the second UE 706 may be able to determine when the sidelink transmission 818 received from the base station 702 corresponds to a retransmission of the message A (e.g., from the first UE 704).

In some examples in which the base station 702 is configured to transmit the sidelink transmission 818 to the second UE 706, the first UE 704 may determine not to retransmit the message A to the second UE 706. For example, the first UE 704 may determine not to retransmit the message A based on a priority of the message A. For example, the first UE 704 may retransmit the message A to the second UE 706 when the message A is associated with a priority that satisfies a priority threshold (e.g., is less than or equal to the priority threshold) and may determine not to retransmit the message A to the second UE 706 when the message A is associated with a priority that does not satisfy the priority threshold (e.g., is greater than the priority threshold). In some examples, the priority threshold may be signaled to the first UE 704 (e.g., by the base station 702).

In some examples, the first UE 704 may determine whether to retransmit the message A to the second UE 706 based on a channel quality associated with the communication link between the first UE 704 and the second UE 706. For example, when the channel quality is below a quality threshold, the first UE 704 may determine not to retransmit the message A to the second UE 706, and may determine to retransmit the message A to the second UE 706 when the channel quality is greater than or equal to the quality threshold. In some examples, the quality threshold may be signaled to the first UE 704 (e.g., by the base station 702).

In some examples, the sidelink feedback message 816 may comprise one bit to indicate whether the second UE 806 was able to decode the base layer message (e.g., at 812). In some examples, the sidelink feedback message 816 may comprise two bits and facilitate link adaptation. For example, the sidelink feedback message 816 may include a first bit 816*a* that corresponds to base layer feedback and a second bit 816*b* that corresponds to enhancement layer feedback. For example, the second UE 706 may receive the MUST transmission 810 and transmit base layer feedback (e.g., an ACK or a NACK) based on whether the second UE 706 decodes the base layer message (e.g., at 812).

In some examples, the base station feedback message 830 may comprise one bit to indicate whether the base station 702 was able to decode the base layer message and/or the enhancement layer (e.g., at 814). For example, the base station feedback message 830 may comprise an ACK message when the base station 702 successfully decodes (e.g., at 814) the base layer message and the enhancement layer message, and may comprise a NACK message when the base station 702 is unable to successfully decode at least one of the base layer message and the enhancement layer. In some examples, the base station feedback message 830 may comprise an ACK message when the base station 702 successfully decodes (e.g., at 814) the base layer message, and may comprise a NACK message when the base station 702 is unable to successfully decode the base layer message. In some examples, the base station feedback message 830 may comprise an ACK message when the base station 702 successfully decodes (e.g., at 814) the enhancement layer message, and may comprise a NACK message when the base station 702 is unable to successfully decode the enhancement layer message.

In some examples, the base station feedback message 830 may comprise two bits and facilitate link adaptation. For example, the base station feedback message 830 may include a first bit 830*a* that corresponds to base layer feedback and a second bit 830*b* that corresponds to enhancement layer feedback. For example, the base station 702 may receive the MUST transmission 810 and transmit base layer feedback (e.g., an ACK or a NACK) based on whether the base station 802 decodes the base layer message and enhancement layer feedback (e.g., an ACK or a NACK) based on whether the base station 802 decodes the enhancement layer message (e.g., at 814).

In some examples, after receiving the base layer feedback (e.g., the first bit 816*a* of the sidelink feedback message 816 and/or the first bit 830*a* of the base station feedback message 830), the first UE 704 may modify aspects of the base layer and/or the enhancement layer. For example, the first UE 704 may modify one or more transmission parameters associated with the base layer and/or the enhancement layer of subsequent MUST transmission(s). For example, the first UE 704 may adapt the code rate, the modulation and coding scheme (MCS), and/or a power allocation associated with the base layer and/or the enhancement layer based on the base layer feedback.

In some examples, the first UE 704 may modify the or more transmission parameters based on base layer feedback received over a window. For example, at 820, the first UE 704 may monitor base layer feedback received over time window. At 822, the first UE 704 may adjust one or more transmission parameters of subsequent MUST transmissions based on the base layer feedback received during the time window.

For example, if, at 820, the first UE 704 receives an ACK threshold quantity of base layer ACK messages (e.g., the first bits 816*a*, 830*a* comprise an ACK) during a time window, the first UE 704 may determine that transmissions of the base layer message are successfully being decoded by the second UE 706 and the base station 702. In such examples, at 822, the first UE 704 may determine to increase the code rate and/or modulation of the base layer of subsequent MUST transmission(s), and/or may decrease the power allocation of the base layer of subsequent MUST transmission(s).

If, at 820, the first UE 704 receives a NACK threshold quantity of base layer NACK messages (e.g., the first bits 816*a*, 830*a* comprise a NACK) during a time window, the first UE 704 may determine that additional protection may be beneficial for transmissions of the base layer message. In such examples, at 822, the first UE 704 may determine to decrease the code rate and/or modulation of the base layer of subsequent MUST transmission(s), and/or may increase the power allocation of the base layer of subsequent MUST transmission(s).

If, at 820, the first UE 704 receives neither an ACK threshold quantity of base layer ACK messages nor a NACK threshold quantity of base layer NACK messages during the time window, the first UE 704 may determine to retain the code rate and/or modulation of the base layer of subsequent MUST transmission(s), and/or retain the power allocation of the base layer of subsequent MUST transmission(s).

In some examples, the resource(s) used for transmitting the MUST transmissions may be fixed. In such examples, the first UE 704 may adjust parameters associated with the enhancement layer based on the adjustment(s) that the first UE 704 makes (if any) to the base layer. For example, when the first UE 704 determines to increase the code rate and/or the modulation of the base layer, the first UE 704 may decrease or retain the code rate and/or the modulation of the enhancement layer of subsequent MUST transmission(s). When the first UE 704 determines to decrease the code rate and/or the modulation of the base layer, the first UE 704 may increase or retain the code rate and/or the modulation of the enhancement layer of subsequent MUST transmission(s). In a similar manner, when the first UE 704 determines to decrease the power allocation of the base layer, the first UE 704 may determine to increase or retain the power allocation of the enhancement layer of subsequent MUST transmission(s). When the first UE 704 determines to increase the power allocation of the base layer, the first UE 704 may determine to decrease or retain the power allocation of the enhancement layer of subsequent MUST transmission(s).

In some examples, the first UE 704 may be configured with the ACK threshold quantity and/or the NACK threshold quantity. For example, the first UE 704 may receive the ACK threshold quantity and/or the NACK threshold quantity via RRC signaling, a MAC-CE, or DCI. It may be appreciated that the first UE 704 may be configured with the ACK threshold quantity, the NACK threshold quantity, neither the ACK threshold quantity nor the NACK threshold quantity, or both of the ACK threshold quantity and the NACK threshold quantity. In such examples, the first UE 704 may monitor, at 820, for base layer feedback based on the configured threshold quantity (or threshold quantities).

As described above, the base layer of the MUST transmission 810 may be encoded to enhance reliability of decoding the base layer message. As such, if the base station 702 is unable to decode the base layer message, the base station 702 is also not likely to be able to decode the enhancement layer message. Accordingly, if, while monitoring feedback at 820, the first UE 704 receives base layer NACKs and enhancement layer NACKs during a time window, the first UE 704 may determine to make no adjustments to the transmission parameters or may determine to prioritize transmission of the base layer message (e.g., by decreasing the code rate and/or modulation of the base layer, and/or increasing the power allocation of the base layer of subsequent MUST transmission(s)).

If, while monitoring feedback at 820, the first UE 704 receives base layer ACKs and enhancement layer NACKs during a time window, the first UE 704 may determine to adjust the amount of information that the first UE 704 transmits using the base layer and/or the enhancement layer. For example, instead of transmitting a first quantity of bits (e.g., five bits) using the enhancement layer, the first UE 704 may determine to transmit a smaller quantity of bits (e.g., two bits) using the enhancement layer. In some examples, the first UE 704 may determine to maintain the first quantity of bits transmit using the enhancement layer, and may determine to reduce the quantity of bits transmit using the base layer.

In some examples, the second UE 706 may request the base station 702 act as a relay to the second UE 706 for MUST transmissions. For example, the second UE 706 may request that the base station 702 transmit sidelink transmissions to the second UE 706 when a sidelink message is transmitted by the first UE 704 using a MUST transmission and the second UE 706 is unable to decode the sidelink message.

Figure 9:
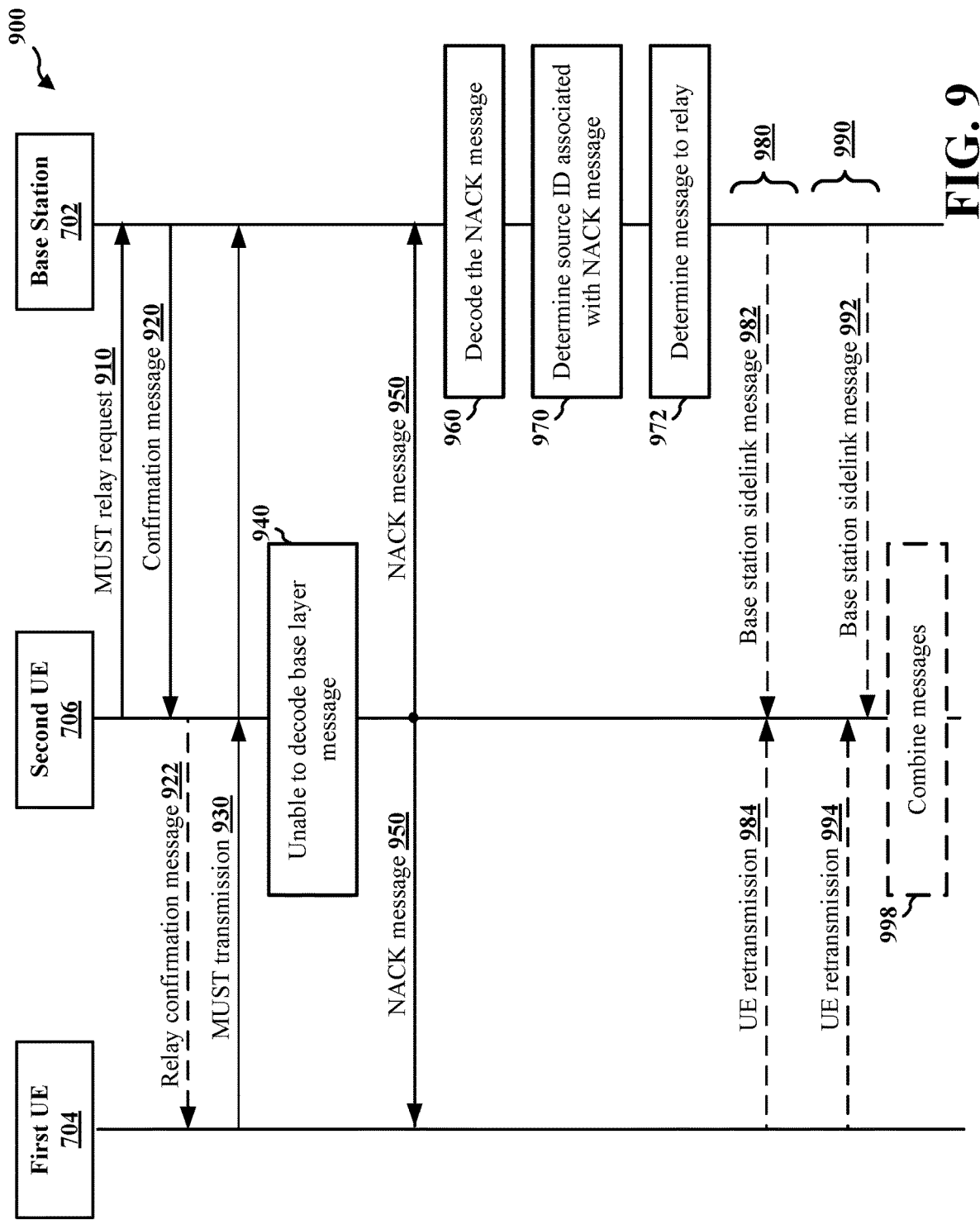
FIG. 9 illustrates an example communication flow between a base station, a first UE, and a second UE, in accordance with the teachings disclosed herein.

FIG. 9 illustrates an example communication flow 900 between the base station 702, the first UE 704, and the second UE 706 of FIGS. 7 and/or 8, as presented herein. In the illustrated example, the communication flow 900 facilitates the base station 702 to enhance sidelink reliability for sidelink communications between the first UE 704 and the second UE 706 with transmissions that have been superposition encoded. Aspects of the communication flow 900 may be similar to the communication flow 800 of FIG. 8. Although not shown in the illustrated example of FIG. 9, it may be appreciated that in additional or alternative examples, the base station 702 may be in communication with one or more other base stations or UEs, and/or the UEs 704, 706 may be in communication with one or more other base stations or UEs.

In the illustrated example of FIG. 9, the second UE 706 transmits a MUST relay request 910 that is received by the base station 702. The MUST relay request 910 may request that the base station 702 serve as a relay for MUST transmissions generated by a set of source identifiers (e.g., one or more source identifiers). For example, the MUST relay request 910 may request that the base station 702 serve as a relay for MUST transmissions generated by the first UE 704.

The base station 702 transmits a confirmation message 920 that is received by the second UE 706. The confirmation message 920 confirms the source identifiers of the set of source identifiers for which the base station 702 agrees to serve as a relay. The confirmation message 920 may indicate all of the source identifiers of the set of source identifiers or may indicate a subset of the source identifiers.

The first UE 704 transmits a MUST transmission 930 to the second UE 706 and the base station 702. Aspects of the MUST transmission 930 may be similar to the MUST transmission 810 of FIG. 8. For example, the MUST transmission 930 may include a sidelink message (message A) encoded in a base layer and an uplink message (message B) encoded in an enhancement layer of the MUST transmission 930.

As shown in FIG. 9, at 940, the second UE 706 may be unable to decode the base layer message of the MUST transmission 930. For example, there may be transmission errors in the MUST transmission 930 received by the second UE 706 (e.g., due to the weaker communication link between the first UE 704 and the second UE 706).

In the illustrated example, the second UE 706 transmits a NACK message 950. The NACK message 950 indicates that the second UE 706 did not successfully decode the base layer message of the MUST transmission 930. The second UE 706 may transmit the NACK message 950 using sidelink. For example, the second UE 706 may transmit the NACK message 950 using a sidelink feedback resource (e.g., PSFCH). Thus, it may be appreciated that the NACK message 950 may be broadcast and received by the first UE 704 and the base station 702.

At 960, the base station 702 decodes the NACK message 950. For example, the base station 702 may decode the NACK message 950 by applying similar techniques used to decode the base layer message of the MUST transmission (e.g., at 814 of FIG. 8).

At 970, the base station 702 determines the source identifier associated with the NACK message 950. For example, the base station 702 may determine to which UE the NACK message 950 is intended. As described above, the NACK message 950 may be broadcast and, thus, received by one or more communication devices within a range (e.g., a range 401) of the transmitting UE (e.g., the second UE 706). However, while the NACK message 950 may be received by one or more communication devices, the second UE 706 transmits the NACK message 950 intended for a particular UE (e.g., the first UE 704) and in response to a message (e.g., the message A).

The example base station 702 determines the source identifier associated with the NACK message 950 based on a sidelink feedback resource used by the second UE 706 to transmit the NACK message 950. For example, the second UE 706 may be configured to use different sidelink feedback resources that map to different source identifiers for transmitting feedback messages. For example, the second UE 706 may be configured to use a first sidelink feedback resource (e.g., a first PSFCH resource) to transmit an ACK/NACK message corresponding to a MUST transmission transmitted by the first UE 706, may be configured to use a second sidelink feedback resource (e.g., a second PSFCH resource) to transmit an ACK/NACK message corresponding to a MUST transmission transmitted by a third UE, etc.

The base station 702 may determine that the NACK message 950 was transmitted by the second UE 706 using the first sidelink feedback resource when decoding the NACK message 950 (e.g., at 960). The base station 702 may infer the source identifier associated with the NACK message 950 by mapping the first sidelink feedback resource to the first UE 704. Thus, based on the sidelink feedback resource used by the second UE 706 to transmit the NACK message 950, the base station 702 may determine which UE is the source UE for which the NACK message 950 is intended. In the example of FIG. 9, the base station 702 may determine that the first UE 704 is the intended target UE for the NACK message 950.

At 972, the base station 702 determines which message to relay. For example, the base station 702 may use the source identifier (e.g., the first UE 706) associated with the NACK message 950 to determine which message to relay to the second UE 706. The example base station 702 may determine to relay the sidelink message (e.g., the message A) encoded in the base layer of the MUST transmission 930.

The base station 702 may apply a first relay strategy 980 or a second relay strategy 990 when relaying the message (message A) to the second UE 706. When applying the first relay strategy 980, the base station 702 may transmit a base station sidelink message 982 of the message A at a same time (e.g., slot) as when the first UE 704 is transmitting a UE retransmission 984 of the sidelink message (e.g., the message A) to the second UE 706. Aspects of the base station sidelink message 982 may be similar to the sidelink retransmission 818 of FIG. 8. In some examples, because the base station 702 is able to decode the base layer message (e.g., the SCI 612 and the PSSCH 614 of the message A), the base station 702 may be able to determine one or more transmission parameters associated with the message A. For example, the base station 702 may be able to determine when the first UE 704 is configured to transmit the UE retransmission 984 of the message A, the code rate associated with the transmitting of the message A, the modulation and coding scheme (MCS) associated with the transmitting of the message A, etc.

Based on the transmission parameters associated with the message A, the base station 702 may transmit the base station sidelink message 982 at the same instant (e.g., slot) that the first UE 702 transmits the UE retransmission 984 of the message A. In some such examples, the second UE 706 may experience a power gain with respect to the message A and increase the reliability with which the second UE 706 successfully decodes the message A. For example, the second UE 706 may combine the UE retransmission 984 from the first UE 704 and the base station sidelink message 982 from the base station 702 to decode the message A.

When applying the second relay strategy 990, the base station 702 may transmit a base station sidelink message 992 containing the message A to the second UE 706 using a configured resource. In some examples, the configured resource may be at a different time than the first UE 704 is configured to transmit a UE retransmission 994 of the message A to the second UE 706. For example, Equation 1 (above) may be used to determine the resource based on (1) a slot and/or resource n used for the original transmission from the source UE to the target UE (e.g., from the first UE 704 to the second UE 706), (2) a sourceID parameter (e.g., an identifier of the first UE 704), and (3) a destinationID parameter (e.g., an identifier of the second UE 706). The values of the sourceID parameter and the destinationID parameter may be modified by $N_1$, $N_2$ parameters, respectively. The parameters $N_1$, $N_2$ may be configured (e.g., via RRC signaling) or may be signaled (e.g., via a MAC-control element (MAC-CE) or DCI)).

The base station 702 may use the determined resource to transmit the base station sidelink message 992 that is received by the second UE 704. The second UE 704 may use the Equation 1 (above) to determine when the base station 702 may transmit the base station sidelink message 992. For example, after transmitting the NACK message 950, the second UE 706 may apply Equation 1 (above) to determine when the base station sidelink message 992 received from the base station 702 corresponds to a retransmission of the message A (e.g., from the first UE 704).

In some examples, the base station 702 may apply different transmission parameters when transmitting the base station sidelink message 992 than associated with the UE retransmission 994. For example, the base station 702 may use a lower MCS and/or a lower code rate than associated with the UE retransmission 994. The lower MCS and/or the lower code rate may enhance the chances of the second UE 706 decoding the message A. In some such examples, the base station 702 may transmit separate control information to the second UE 706 to indicate the transmission parameters associated with the base station sidelink message 992 of the message A.

In some examples in which the base station 702 is configured to transmit the base station sidelink message 982, 992 to the second UE 706, the first UE 704 may determine not to retransmit the message A to the second UE 706. For example, the first UE 704 may determine not to transmit the UE retransmission 984, 994 of the message A to the second UE 706 based on a priority of the message A. In some examples, the first UE 704 may determine whether to transmit the UE retransmission 984, 994 of the message A to the second UE 706 based on a channel quality associated with the communication link between the first UE 704 and the second UE 706.

In some examples, the second UE 706 may signal to the first UE 704 when the base station 702 agrees to serve as a relay for the second UE 706. For example, after receiving the confirmation message 920 from the base station 702, the second UE 706 may transmit a relay confirmation message 922 that is received by the first UE 704. In some such examples in which the first UE 704 receives the relay confirmation message 922, the first UE 704 may determine not to transmit the UE retransmission 984, 994 to the second UE 706 after the first UE 704 receives the NACK message 950 from the second UE 706. In some examples, after receiving the relay confirmation message 922, the first UE 704 may determine not to transmit the UE retransmission 984, 994 of the message A to the second UE 706 when the first UE 704 is busy, for example, with receiving and/or transmitting other messages. In some such examples, the base station 702 may be configured to transmit the base station sidelink message 982, 992 independent of the first UE 704 transmitting the UE retransmission 984, 994.

At 998, the second UE 706 may combine the base station sidelink message 982, 992 and the UE retransmission 984, 994 to facilitate decoding the base layer message (e.g., the sidelink message).

In some examples, one or more UEs of a communications system may form a cluster or a group. In some such examples, a base station may be configured to serve as a MUST relay for the cluster.

Figure 10:
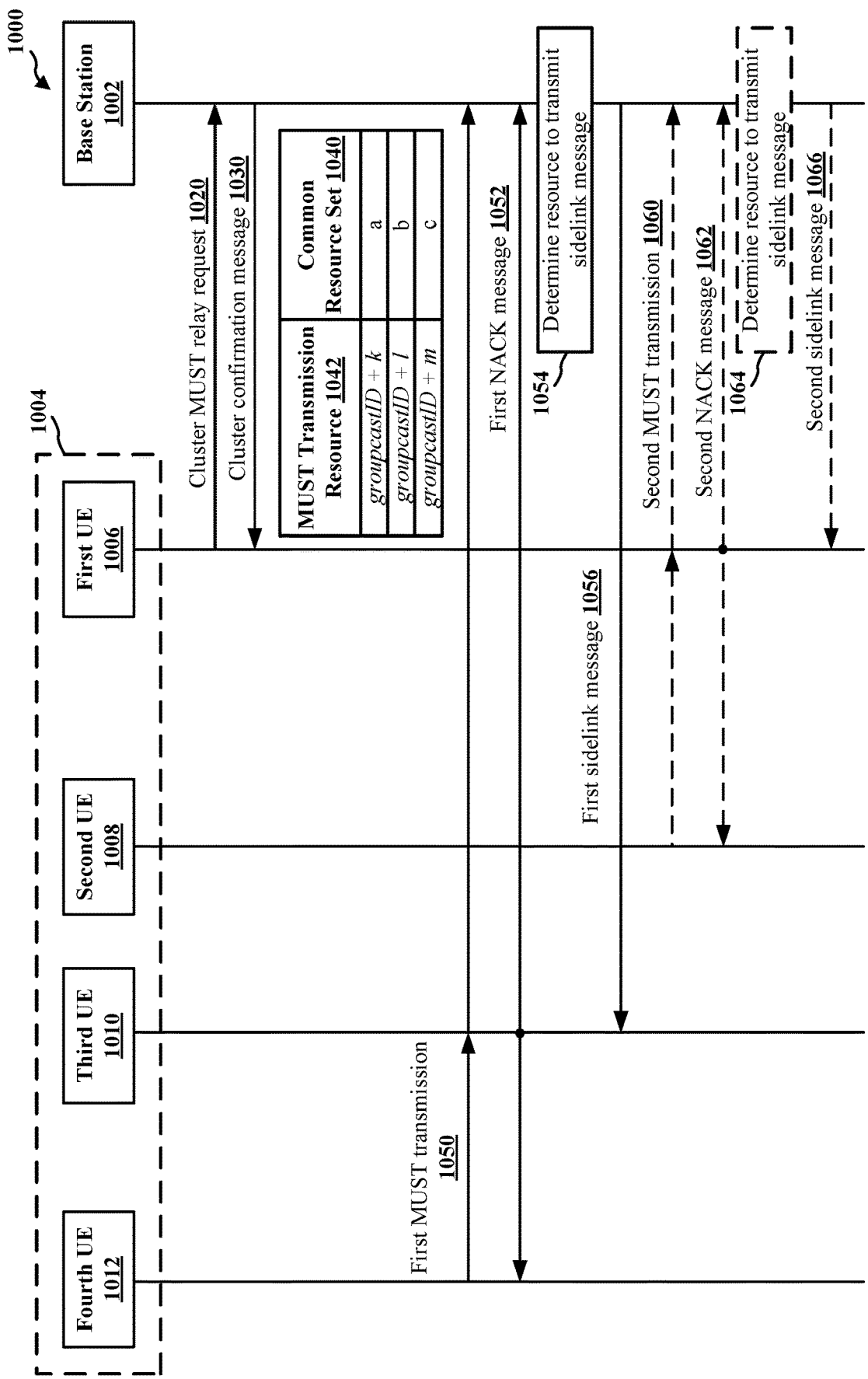
FIG. 10 illustrates an example communication flow between a base station and a cluster of UEs employing MUST transmissions, in accordance with the teachings disclosed herein.

FIG. 10 illustrates an example communication flow 1000 between devices employing MUST transmissions, as presented herein. The example of FIG. 10 includes a base station 1002 in communication with a cluster 1004 of UEs. The cluster 1004 includes a first UE 1006, a second UE 1008, a third UE 1010, and a fourth UE 1012. However, it may be appreciated that other example clusters may include any suitable quantity of UEs. In the illustrated example of FIG. 10, the first UE 1006 may be the cluster head of the cluster 1004.

In the illustrated example, the communication flow 1000 facilitates the base station 1002 to serve as a MUST relay for a groupcast setting. Aspects of the communication flow 1000 may be similar to the communication flow 800 of FIG. 8 and/or the communication flow 900 of FIG. 9. Although not shown in the illustrated example of FIG. 10, it may be appreciated that in additional or alternative examples, the base station 1002 may be in communication with one or more other base stations or UEs, and/or the UEs 1006, 1008, 1010, 1012 of the cluster 1004 may be in communication with one or more other base stations or UEs.

In the illustrated example, the cluster head (e.g., the first UE 1006) transmits a cluster MUST relay request 1020 to the base station 1002. The cluster MUST relay request 1020 may request that the base station 1002 serve as a relay for any MUST transmissions that occur within the cluster 1004. The cluster MUST relay request 1020 may include a groupcast identifier (e.g., a groupcastID) that identifies the cluster 1004 and a set of one or more UE identifiers that identify the members of the cluster 1004 (e.g., identifiers associated with the first UE 1006, the second UE 1008, the third UE 1010, and the fourth UE 1012).

The base station 1002 transmits a cluster confirmation message 1030 that is received by the cluster head (e.g., the first UE 1006). Aspects of the cluster confirmation message 1030 may be similar to the confirmation message 920 of FIG. 9.

In such examples in which the base station 1002 is configured to serve as a MUST relay for the cluster 1004, the base station 1002 may perform a retransmission of a base layer message for which a member of the cluster 1004 transmits a NACK message. The base station 1002 may transmit the retransmission of the base layer message using a resource of a common resource set that is based on the cluster. For example, a common resource set 1040 may include a set of resources {a, b, c} that are shared by the UEs of the cluster 1004. The common resource set 1040 may be configured using RRC signaling, a MAC-CE, and/or DCI.

In some examples, the resources of the common resource set 1040 may map to resources 1042 used by the members of the cluster 1004 to transmit a MUST transmission. For example, the resources of the common resource set 1040 may map to a groupcast identifier and a resource used to transmit a MUST transmission. In the illustrated example of FIG. 10, a first resource a of the common resource set 1040 maps to a first MUST transmission resource k used to transmit a MUST transmission by a UE of the cluster 1004, a second resource b of the common resource set 1040 maps to a second MUST transmission resource/used to transmit a MUST transmission by a UE of the cluster 1004, and a third resource c of the common resource set 1040 maps to a third MUST transmission resource m used to transmit a MUST transmission by a UE of the cluster 1004. The mapping between the common resource set 1040 and the MUST transmission resources 1042 may enable the UEs of the cluster 1004 to determine which message a retransmission corresponds.

In the illustrated example of FIG. 10, the fourth UE 1012 transmits a first MUST transmission 1050 using sidelink that includes a base layer message intended for the third UE 1010. Aspects of the first MUST transmission 1050 may be similar to the MUST transmission 720 of FIG. 7, the MUST transmission 810 of FIG. 8, and/or the MUST transmission 930 of FIG. 9. The fourth UE 1012 may transmit the first MUST transmission 1050 using the resource k of the MUST transmission resources 1042. As shown in FIG. 10, the third UE 1010 may be unable to decode the base layer message of the first MUST transmission 1050 and transmit a first NACK message 1052. The first NACK message 1052 may be received by at least the fourth UE 1012 and the base station 1002.

At 1054, the base station 1002 may determine which resource of the common resource set 1040 to use to transmit a sidelink message to the third UE 1010 based on the first NACK message 1052. For example, the base station 1002 may map the resource k and the groupcast identifier of the cluster 1004 to the resource a of the common resource set 1040. The base station 1002 may transmit a first sidelink message 1056 including the base layer message of the first MUST transmission 1050 to the third UE 1010. The base station 1002 may transmit the first sidelink message 1056 using the resource a of the common resource set 1040. The third UE 1010 may use the mapping between the resource a of the common resource set 1040 to the groupcast identifier of the cluster 1004 and the resource k to determine that the first sidelink message 1056 corresponds to the base layer message of the first MUST transmission 1050. Aspects of the first sidelink message 1056 may be similar to the sidelink transmission 818 of FIG. 8 and may be in accordance with the first relay strategy 980 or the second relay strategy 990 of FIG. 9.

In a similar manner, the second UE 1008 may transmit a second MUST transmission 1060 using sidelink that includes a base layer message intended for the first UE 1006. Aspects of the second MUST transmission 1060 may be similar to the MUST transmission 720 of FIG. 7, the MUST transmission 810 of FIG. 8, and/or the MUST transmission 930 of FIG. 9. The second UE 1008 may transmit the second MUST transmission 1060 using the resource m of the MUST transmission resources 1042. As shown in FIG. 10, the first UE 1006 may be unable to decode the base layer message of the second MUST transmission 1060 and transmit a second NACK message 1062. The second NACK message 1062 may be received by at least the second UE 1008 and the base station 1002.

At 1064, the base station 1002 may determine which resource of the common resource set 1040 to use to transmit a sidelink message to the first UE 1006 based on the second NACK message 1062. For example, the base station 1002 may map the resource m and the groupcast identifier of the cluster 1004 to the resource c of the common resource set 1040. The base station 1002 may transmit a second sidelink message 1066 including the base layer message of the second MUST transmission 1060 to the first UE 1006. The base station 1002 may transmit the second sidelink message 1066 using the resource c of the common resource set 1040. The first UE 1006 may use the mapping between the resource c of the common resource set 1040 to the groupcast identifier of the cluster 1004 and the resource m to determine that the second sidelink message 1066 corresponds to the base layer message of the second MUST transmission 1060. Aspects of the second sidelink message 1066 may be similar to the sidelink transmission 818 of FIG. 8 and may be in accordance with the first relay strategy 980 or the second relay strategy 990 of FIG. 9.

Although not shown in FIG. 10, it may be appreciated that the base station 1002 may decode the base layer message and the enhancement layer message of the first MUST transmission 1050 and the second MUST transmission 1060, as described in connection with 814 of FIG. 8. Additionally, the base station 1002 may decode the first NACK message 1052 and the second NACK message 1062 (e.g., as described in connection with 960 of FIG. 9), may determine the source identifier associated with the first NACK message 1052 and the second NACK message 1062 (e.g., as described in connection with 970 of FIG. 9), and/or may determine the message to relay based on the first NACK message 1052 and the second NACK message 1062 (e.g., as described in connection with 972 of FIG. 9).

Figure 11:
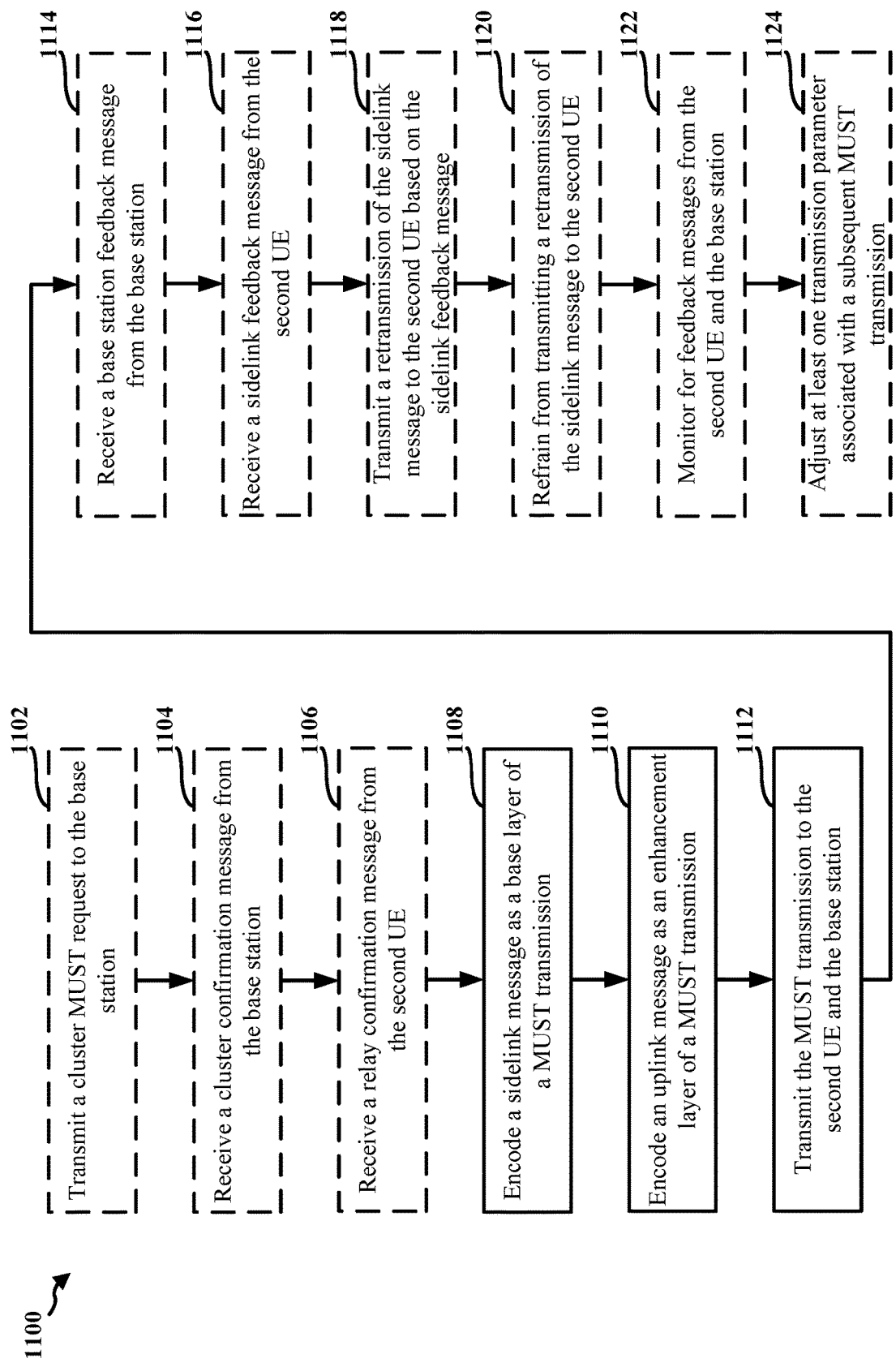
FIG. 11 is a flowchart of a method of wireless communication at a wireless device, in accordance with the teachings disclosed herein.

FIG. 11 is a flowchart 1100 of a method of wireless communication. The method may be performed by a UE or a component of a first UE (e.g., the UE 104, the wireless communication device 350, the first UE 704, the first UE 1006, the second UE 1008, the fourth UE 1012; the apparatus 1302). Optional aspects are illustrated with a dashed line. The method may facilitate improving sidelink communications by enabling a base station to serve as a relay for sidelink messages of superposition transmissions.

At 1108, the first UE encodes a sidelink message for a second UE as a base layer of a MUST transmission, as described in connection with 804 of FIG. 8. For example, 1108 may be performed by an encoding component 1340 of the apparatus 1302 of FIG. 13. In some examples, the sidelink message may include SCI and sidelink data.

At 1110, the first UE encodes an uplink message for a base station as an enhancement layer of the MUST transmission, as described in connection with 806 of FIG. 8. For example, 1110 may be performed by the encoding component 1340 of the apparatus 1302 of FIG. 13. In some examples, the uplink message includes at least one of UCI and uplink data. In some examples, the SCI may be superposition encoded with the UCI in the MUST transmission.

At 1112, the first UE transmits the MUST transmission to the second UE and the base station, as described in connection with the MUST transmission 810 of FIG. 8, the MUST transmission 930 of FIG. 9, and/or the MUST transmissions 1050, 1060 of FIG. 10. For example, 1112 may be performed by a MUST transmission component 1342 of the apparatus 1302 of FIG. 13.

In some examples, at 1106, the first UE may receive a relay confirmation message from the second UE indicating that the base station is serving as a relay for sidelink messages of MUST transmissions generated by the first UE, as described in connection with relay confirmation message 922 of FIG. 9. For example, 1106 may be performed by a relay setup component 1344 of the apparatus 1302 of FIG. 13.

At 1120, the first UE may refrain from transmitting a retransmission of the sidelink message to the second UE based at least in part on the relay confirmation message, as described in connection with the UE retransmissions 984, 994 of FIG. 9. For example, 1120 may be performed by a retransmission component 1346 of the apparatus 1302 of FIG. 13.

In some examples, at 1114, the first UE may receive a base station feedback message from the base station, as described in connection with the base station feedback message 830 of FIG. 8. For example, 1114 may be performed by a feedback component 1348 of the apparatus 1302 of FIG. 13. In some examples, the base station feedback message may include a first indicator corresponding to decoding of the sidelink message (e.g., the first bit 830a of FIG. 8) and a second indicator corresponding to decoding of the uplink message (e.g., the first bit 830b of FIG. 8).

In some examples, at 1116, the first UE may receive a sidelink feedback message from the second UE, as described in connection with sidelink feedback message 816 of FIG. 8. For example, 1116 may be performed by the feedback component 1348 of the apparatus 1302 of FIG. 13. In some examples, the sidelink feedback message may include a first indicator corresponding to decoding of the sidelink message (e.g., the first bit 816a of FIG. 8) and may include a second indicator corresponding to decoding of the uplink message (e.g., the second bit 816b of FIG. 8).

At 1118, the first UE may transmit a retransmission of the sidelink message to the second UE based on the sidelink feedback message, as described in connection with the UE retransmissions 984, 994 of FIG. 9. For example, 1118 may be performed by the retransmission component 1346 of the apparatus 1302 of FIG. 13.

In some examples, at 1122, the first UE may monitor for feedback from the second UE and the base station during a monitoring window, as described in connection with 820 of FIG. 8. For example, 1122 may be performed by a monitoring component 1350 of the apparatus 1302 of FIG. 13.

At 1124, the first UE may adjust at least one transmission parameter associated with a subsequent MUST transmission based on at least one feedback message received during the monitoring window, as described in connection with 822 of FIG. 8. For example, 1124 may be performed by an adjustment component 1352 of the apparatus 1302 of FIG. 13.

In some examples, the at least one feedback message received during the monitoring window may include a threshold quantity of one or more ACK messages indicating successful receipt of the base layer. In some such examples, the first UE may adjust the at least one transmission parameter associated with the subsequent MUST transmission by one or more of increasing a base layer code rate or modulation associated with the subsequent MUST transmission, decreasing a base layer power allocation associated with the subsequent MUST transmission, decreasing an enhancement layer code rate or modulation associated with the subsequent MUST transmission, or increasing an enhancement layer power allocation associated with the subsequent MUST transmission.

In some examples, the at least one feedback message received during the monitoring window may include a threshold quantity of one or more NACK messages indicating unsuccessful receipt of the base layer. In some such examples, the first UE may adjust the at least one transmission parameter associated with the subsequent MUST transmission by one or more of decreasing a base layer code rate or modulation associated with the subsequent MUST transmission, increasing a base layer power allocation associated with the subsequent MUST transmission, increasing an enhancement layer code rate or modulation associated with the subsequent MUST transmission, or decreasing an enhancement layer power allocation associated with the subsequent MUST transmission.

In some examples, the sidelink message (at 1106) may include a groupcast message that is directed to a group of UEs including the second message. For example, the first UE may be configured as a cluster head of a cluster of UEs communicating based on sidelink, as described in connection with the first UE 1006 and the cluster 1004 of FIG. 10. In some such examples, at 1102, the first UE may transmit a cluster MUST request to the base station, as described in connection with the cluster MUST relay request 1020 of FIG. 10. For example, 1102 may be performed by a cluster component 1354 of the apparatus 1302 of FIG. 13. The cluster MUST relay request may request that the base station serve as a relay for member UEs of the cluster. In some examples, the cluster MUST relay request may identify a groupcast identifier (groupcastID) associated with the cluster and the member UEs of the cluster. The member UEs of the cluster may include at least the first UE and the second UE.

At 1104, the first UE may receive a cluster confirmation message from the base station indicating that the base station is serving as a relay for sidelink messages of MUST transmissions generated by UEs of the cluster, as described in connection with the cluster confirmation message 1030 of FIG. 10. For example, 1104 may be performed by the cluster component 1354 of the apparatus 1302 of FIG. 13.

Figure 12:
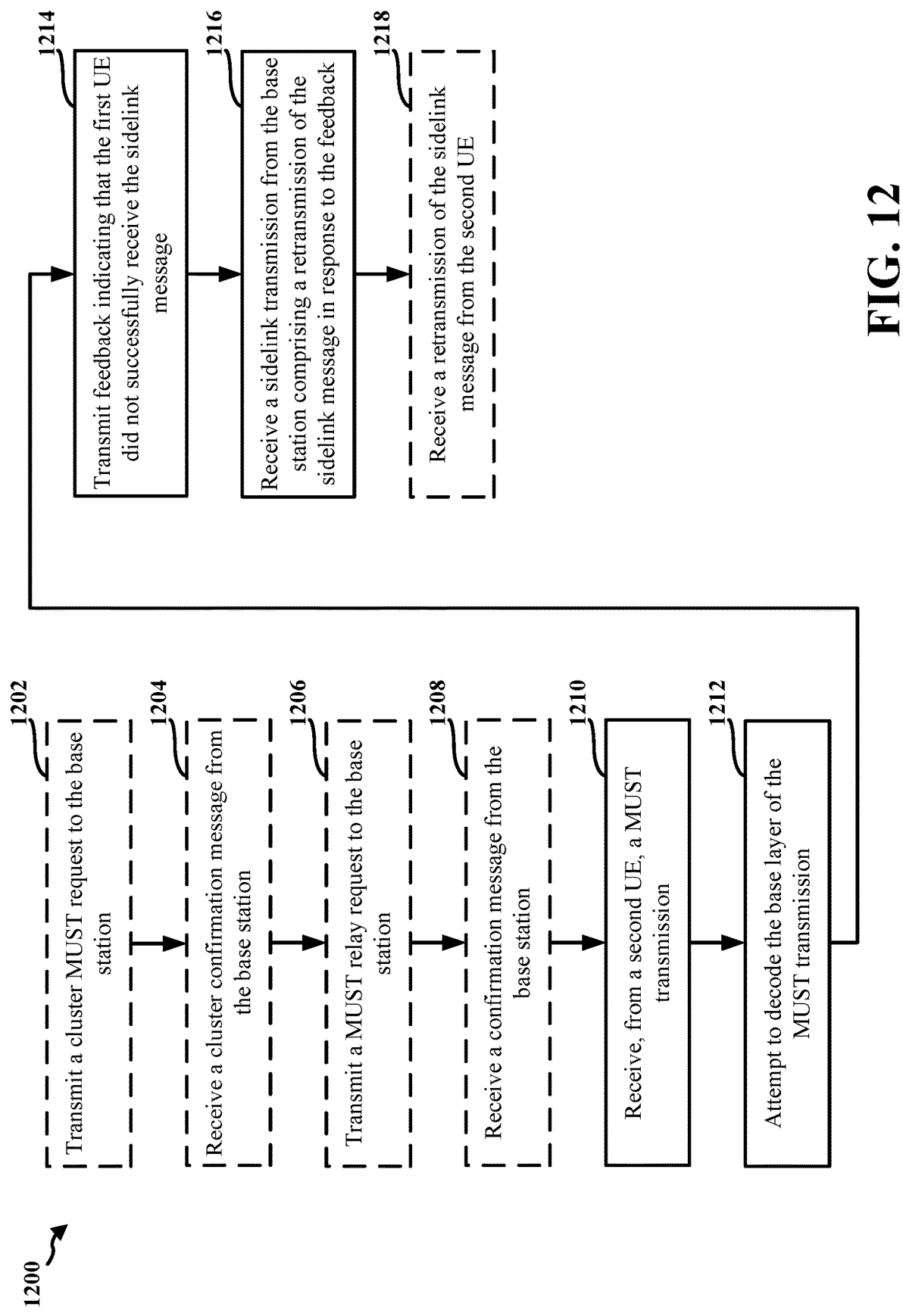
FIG. 12 is a flowchart of a method of wireless communication at a wireless device, in accordance with the teachings disclosed herein.

FIG. 12 is a flowchart 1200 of a method of wireless communication. The method may be performed by a UE or a component of a first UE (e.g., the UE 104, the wireless communication device 350, the second UE 706, the first UE 1006, the third UE 1010; the apparatus 1302). Optional aspects are illustrated with a dashed line. The method may facilitate improving sidelink communications by enabling a base station to serve as a relay for sidelink messages of superposition transmissions.

At 1210, the first UE receives, from a second UE, a MUST transmission including a base layer and an enhancement layer, as described in connection with the MUST transmission 810 of FIG. 8, the MUST transmission 930 of FIG. 9, and/or the MUST transmissions 1050, 1060 of FIG. 10. For example, 1210 may be performed by the MUST transmission component 1342 of the apparatus 1302 of FIG. 13. The base layer of the MUST transmission may include a sidelink message for the first UE and the enhancement layer of the MUST transmission may include an uplink message for the base station.

At 1212, the first UE attempts to decode the base layer of the MUST transmission to obtain the sidelink message, as described in connection with 812 of FIGS. 8 and/or 940 of FIG. 9. For example, 1212 may be performed by a decoding component 1356 of the apparatus 1302 of FIG. 13. In some examples, the sidelink message may include SCI and sidelink data.

At 1214, the first UE transmits feedback indicating that the first UE did not successfully receive the sidelink message, as described in connection with the sidelink feedback message 816 of FIG. 8 and/or the NACK message 950 of FIG. 9. For example, 1214 may be performed by the feedback component 1348 of the apparatus 1302 of FIG. 13. In some examples, the first UE may transmit the feedback using a sidelink feedback channel resource.

At 1216, the first UE receives a sidelink transmission from a base station comprising a retransmission of the sidelink message in response to the feedback, as described in connection with sidelink transmission 818 of FIG. 8 and/or the base station sidelink message 982, 992 of FIG. 9. For example, 1216 may be performed by a sidelink transmission component 1358 of the apparatus 1302 of FIG. 13.

In some examples, the first UE may receive the sidelink transmission from the base station using a configured resource for retransmission of sidelink messages by the base station. For example, the configured resource may be based on one or more of a transmission resource associated with transmission of the sidelink message from the second UE to the first UE, a source identifier associated with the second UE, or a destination identifier associated with the first UE.

In some examples, at 1206, the first UE may transmit a MUST relay request to the base station requesting that the base station serve as a relay of sidelink messages for MUST transmissions generated by a first set of source UEs, as described in connection with the MUST relay request 910 of FIG. 9. For example, 1206 may be performed by the relay setup component 1344 of the apparatus 1302 of FIG. 13. The first set of source UEs may include at least the second UE.

At 1208, the first UE may receive a confirmation message from the base station signaling a confirmation of the base station to serve as a relay for MUST transmissions generated by a second set of source UEs, as described in connection with the confirmation message 920 of FIG. 9. For example, 1208 may be performed by the relay setup component 1344 of the apparatus 1302 of FIG. 13. The second set of source UEs may include at least the second UE. In some examples, the first set of source UEs and the second set of source UEs may include the same UEs. In some examples, the second set of source UEs may comprise a subset of UEs of the first set of source UEs. In some examples, the first UE may transmit a relay confirmation message to the second UE indicating that the base station is serving as a relay of sidelink messages for MUST transmissions generated by the second UE, as described in connection with the relay confirmation message 922. The transmitting of the relay confirmation message may be performed by the relay setup component 1344 of the apparatus 1302 of FIG. 13.

At 1218, the first UE may receive a retransmission of the sidelink message from the second UE when the sidelink feedback message signals an inability of the first UE to obtain the sidelink message from the decoding of the base layer, as described in connection with the UE retransmission 984, 994 of FIG. 9. For example, 1218 may be performed by the retransmission component 1346 of the apparatus 1302 of FIG. 13.

In some examples, the first UE may receive the sidelink transmission of the sidelink message from the base station and the retransmission of the sidelink message from the second UE at a same time slot. In some examples, the first UE may receive the sidelink transmission of the sidelink message from the base station at a different time than the retransmission of the sidelink message from the second UE. In some examples, the first UE may combine the sidelink transmission of the sidelink message and the retransmission of the sidelink message to obtain the sidelink message, as described in connection with 998 of FIG. 9. For example, the combining of the sidelink transmission of the sidelink message and the retransmission of the sidelink message to obtain the sidelink message may be performed by the decoding component 1356 of the apparatus 1302 of FIG. 13.

In some examples, the first UE may be configured as a cluster head of a cluster of UEs communicating based on sidelink, as described in connection with the first UE 1006 and the cluster 1004 of FIG. 10. In some such examples, at 1202, the first UE may transmit a cluster MUST request to the base station, as described in connection with the cluster MUST relay request 1020 of FIG. 10. For example, 1202 may be performed by the cluster component 1354 of the apparatus 1302 of FIG. 13. The cluster MUST relay request may request that the base station serve as a relay for member UEs of the cluster. In some examples, the cluster MUST relay request may identify a groupcast identifier (groupcastID) associated with the cluster and the member UEs of the cluster. The member UEs of the cluster may include at least the first UE and the second UE.

At 1204, the first UE may receive a cluster confirmation message from the base station indicating that the base station is serving as a relay for sidelink messages of MUST transmissions generated by UEs of the cluster, as described in connection with the cluster confirmation message 1030 of FIG. 10. For example, 1204 may be performed by the cluster component 1354 of the apparatus 1302 of FIG. 13.

Figure 13:
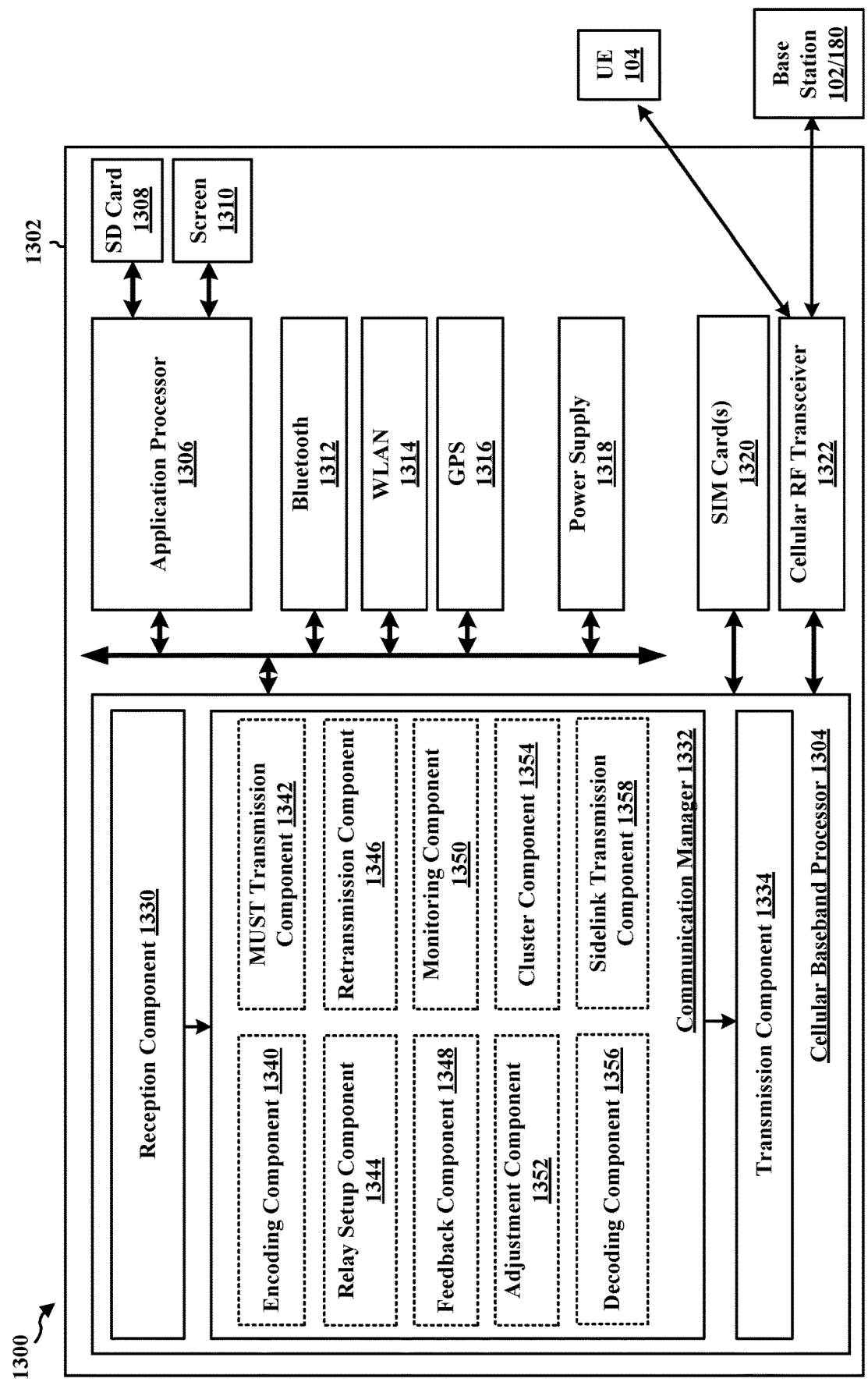
FIG. 13 is a diagram illustrating an example of a hardware implementation for an example apparatus, in accordance with the teachings disclosed herein.

FIG. 13 is a diagram 1300 illustrating an example of a hardware implementation for an apparatus 1302. The apparatus 1302 is a wireless device and includes a cellular baseband processor 1304 (also referred to as a modem) coupled to a cellular RF transceiver 1322 and one or more subscriber identity modules (SIM) cards 1320, an application processor 1306 coupled to a secure digital (SD) card 1308 and a screen 1310, a Bluetooth module 1312, a wireless local area network (WLAN) module 1314, a Global Positioning System (GPS) module 1316, and a power supply 1318. The cellular baseband processor 1304 communicates through the cellular RF transceiver 1322 with the UE 104 and/or base station 102/180. The cellular baseband processor 1304 may include a computer-readable medium/memory. The computer-readable medium/memory may be non-transitory. The cellular baseband processor 1304 is responsible for general processing, including the execution of software stored on the computer-readable medium/memory. The software, when executed by the cellular baseband processor 1304, causes the cellular baseband processor 1304 to perform the various functions described supra. The computer-readable medium/memory may also be used for storing data that is manipulated by the cellular baseband processor 1304 when executing software. The cellular baseband processor 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the cellular baseband processor 1304. The cellular baseband processor 1304 may be a component of the first wireless communication device 310 and may include the memory 376 and/or at least one of the TX processor 316, the RX processor 370, and the controller/processor 375. In one configuration, the apparatus 1302 may be a modem chip and include just the baseband processor 1304, and in another configuration, the apparatus 1302 may be the entire wireless device (e.g., see the first wireless communication device 310 of FIG. 3) and include the additional modules of the apparatus 1302.

The communication manager 1332 includes encoding component 1340 that is configured to encode a sidelink message as a base layer of a MUST transmission and encode an uplink message as an enhancement layer of a MUST transmission, for example, as described in connection with 1108 and 1110 of FIG. 11. The communication manager 1332 also includes a MUST transmission component 1342 that is configured to transmit the MUST transmission to the second UE and the base station, for example, as described in connection with 1112 of FIG. 11, and/or configured to receive a MUST transmission, for example, as described in connection with 1210 of FIG. 12. The communication manager 1332 also includes a relay setup component 1344 that is configured to receive a relay confirmation message from the second UE, for example, as described in connection with 1106 of FIG. 11, and/or configured to transmit a MUST relay request to base station or to receive a confirmation message from the base station, for example, as described in connection with 1206 and 1208 of FIG. 12. The communication manager 1332 also includes a retransmission component 1346 that is configured to transmit a retransmission of the sidelink message to the second UE based on the sidelink feedback message or refrain from transmitting a retransmission of the sidelink message to the second UE, for example, as described in connection with 1118 and 1120 of FIG. 11 and/or configured to receive a retransmission of the sidelink message from the second UE, for example, as described in connection with 1218 of FIG. 12. The communication manager 1332 also includes a feedback component 1348 that is configured to receive a base station feedback message from the base station and receive a sidelink feedback message from the second UE, for example, as described in connection with 1114 and 1116 of FIG. 11 and/or configured to transmit feedback indicating that the first UE did not successfully receive the sidelink message, for example, as described in connection with 1214 of FIG. 12. The communication manager 1332 also includes a monitoring component 1350 that is configured to monitor the feedback messages from the second UE and the base station, for example, as described in connection with 1122 of FIG. 11. The communication manager 1332 also includes an adjustment component 1352 that is configured to adjust at least one transmission parameter associated with a subsequent MUST transmission, for example, as described in connection with 1124 of FIG. 11. The communication manager 1332 also includes a cluster component 1354 that is configured to transmit a cluster MUST request to the base station and receive a cluster confirmation message from the base station, for example, as described in connection with 1102 and 1104 of FIG. 11 and/or configured to transmit a cluster MUST request to the base station and receive a cluster confirmation message from the base station, for example, as described in connection with 1202 and 1204 of FIG. 12. The communication manager 1332 also includes a decoding component 1356 that is configured to attempt to decode the base layer of the MUST transmission, for example, as described in connection with 1212 of FIG. 12. The communication manager 1332 also includes a sidelink transmission component 1358 that is configured to receive a sidelink transmission from the base station comprising a retransmission of the sidelink message in response to the feedback, for example, as described in connection with 1216 of FIG. 12.

The apparatus may include additional components that perform each of the blocks of the algorithm in the aforementioned flowcharts of FIGS. 11 and/or 12. As such, each block in the aforementioned flowcharts of FIGS. 11 and/or 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1302, and in particular the cellular baseband processor 1304, includes means for encoding a sidelink message for a second UE as base layer of a MUST transmission. The example apparatus 1302 also includes means for encoding an uplink message for a base station as an enhancement layer of the MUST transmission. The example apparatus 1302 also includes means for transmitting the MUST transmission to the second UE and the base station. The example apparatus 1302 also includes means for receiving a relay confirmation message from the second UE indicating that the base station is serving as a relay for sidelink messages of MUST transmissions generated by the first UE. The example apparatus 1302 also includes means for refraining from transmitting a retransmission of the sidelink message to the second UE based at least in part on the relay confirmation message. The example apparatus 1302 also includes means for receiving a sidelink feedback message from the second UE indicating whether the second UE obtained the sidelink message from the base layer of the MUST transmission. The example apparatus 1302 also includes means for transmitting a retransmission of the sidelink message to the second UE based on the sidelink feedback message. The example apparatus 1302 also includes means for monitoring for feedback messages from the second UE and the base station during a monitoring window. The example apparatus 1302 also includes means for adjusting at least one transmission parameter associated with a subsequent MUST transmission based on at least one feedback message received during the monitoring window. The example apparatus 1302 also includes means for adjusting at least one transmission parameter associated with the subsequent MUST transmission including one or more of: increasing a base layer code rate or modulation associated with the subsequent MUST transmission, decreasing a base layer power allocation associated with the subsequent MUST transmission, decreasing an enhancement layer code rate or modulation associated with the subsequent MUST transmission, or increasing an enhancement layer power allocation associated with the subsequent MUST transmission. The example apparatus 1302 also includes means for the adjusting of the at least one transmission parameter associated with the subsequent MUST transmission including one or more of: decreasing a base layer code rate or modulation associated with the subsequent MUST transmission, increasing a base layer power allocation associated with the subsequent MUST transmission, increasing an enhancement layer code rate or modulation associated with the subsequent MUST transmission, or decreasing an enhancement layer power allocation associated with the subsequent MUST transmission. The example apparatus 1302 also includes means for receiving, from a second UE, a MUST transmission including a base layer and an enhancement layer, the base layer comprising a sidelink message for the first UE and the enhancement layer comprising an uplink message for a base station. The example apparatus 1302 also includes means for attempting to decode the base layer of the MUST transmission to obtain the sidelink message. The example apparatus 1302 also includes means for transmitting feedback indicating that the first UE did not successfully receive the sidelink message. The example apparatus 1302 also includes means for receiving a sidelink transmission from a base station comprising a retransmission of the sidelink message in response to the feedback. The example apparatus 1302 also includes means for transmitting a MUST relay request to the base station requesting that the base station serve as a relay of sidelink messages for MUST transmissions generated by a first set of source UEs, wherein the set of source UEs includes at least the second UE. The example apparatus 1302 also includes means for receiving a confirmation message from the base station signaling a confirmation of the base station to serve as a relay for MUST transmissions generated by a second set of source UEs, wherein the second set of source UEs includes at least the second UE. The example apparatus 1302 also includes means for receiving a retransmission of the sidelink message from the second UE when the sidelink feedback message signals an inability of the first UE to obtain the sidelink message from the decoding of the base layer.

The aforementioned means may be one or more of the aforementioned components of the apparatus 1302 configured to perform the functions recited by the aforementioned means. As described supra, the apparatus 1302 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Figure 14:
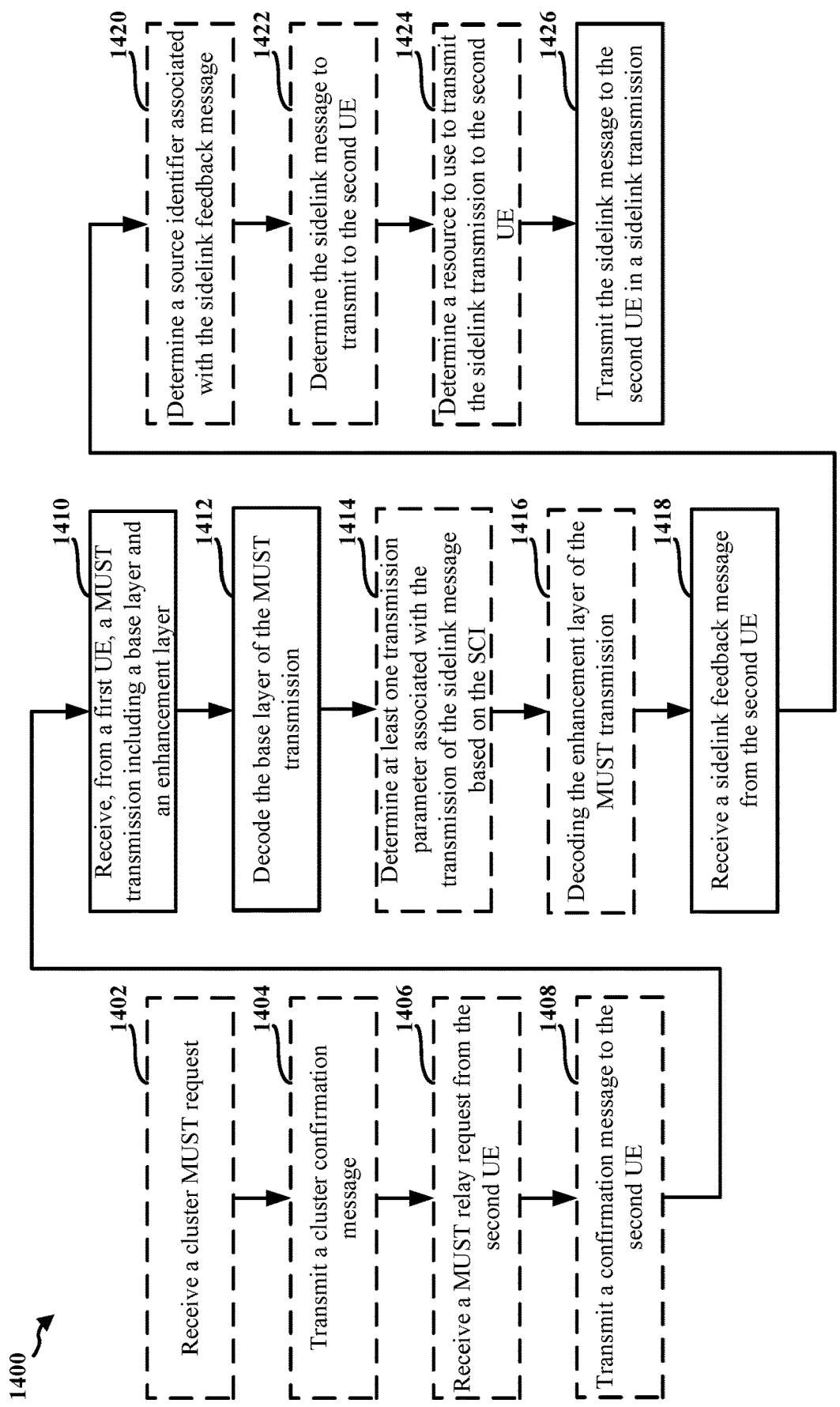
FIG. 14 is a flowchart of a method of wireless communication at a base station, in accordance with the teachings disclosed herein.

FIG. 14 is a flowchart 1400 of a method of wireless communication. The method may be performed by a base station or a component of a base station (e.g., the base station 102/180, the wireless communication device 310, the base station 702, the base station 1002; the apparatus 1502). Optional aspects are illustrated with a dashed line. The method may facilitate improving sidelink communications by enabling a base station to serve as a relay for sidelink messages of superposition transmissions.

At 1410, the base station receives, from a first UE, a MUST transmission including a base layer and an enhancement layer, as described in connection with the MUST transmission 810 of FIG. 8, the MUST transmission 930 of FIG. 9, and/or the MUST transmission 1050, 1060 of FIG. 10. For example, 1410 may be performed by a MUST transmission component 1540 of the apparatus 1502 of FIG. 15. The base layer of the MUST transmission may include a sidelink message for a second UE and the enhancement layer comprising an uplink message for the base station.

At 1412, the base station decodes the base layer of the MUST transmission to obtain the sidelink message, as described in connection with 814 of FIG. 8. For example, 1412 may be performed by a decoding component 1542 of the apparatus 1502 of FIG. 15.

At 1418, the base station receives a sidelink feedback message from the second UE indicating that the second UE did not successfully receive the sidelink message, as described in connection with the sidelink feedback message 816 of FIG. 8, the NACK message 950 of FIG. 9, and/or the NACK message 1052, 1062 of FIG. 10. For example, 1418 may be performed by a feedback component 1544 of the apparatus 1502 of FIG. 15.

At 1426, the base station transmits the sidelink message to the second UE in a sidelink transmission in response to the sidelink feedback message signals from the second UE, as described in connection with the sidelink transmission 818 of FIG. 8, the base station sidelink message 982, 992 of FIG. 9, and/or the sidelink message 1056, 1066 of FIG. 10. For example, 1426 may be performed by a sidelink transmission component 1546 of the apparatus 1502 of FIG. 15.

In some examples, at 1406, the base station may receive a MUST relay request from the second UE requesting that the base station serve as a relay of sidelink messages for MUST transmissions generated by a first set of source UEs, as described in connection with the MUST relay request 910 of FIG. 9. For example, 1406 may be performed by a relay setup component 1548 of the apparatus 1502 of FIG. 15. The set of source UEs may include at least the first UE.

At 1408, the base station may transmit a confirmation message to the second UE signaling a confirmation of the base station to serve as a relay for MUST transmissions generated by a second set of source UEs, as described in connection with the confirmation message 920 of FIG. 9. For example, 1408 may be performed by the relay setup component 1548 of the apparatus 1502 of FIG. 15. The second set of source UEs may include at least the second UE.

In some examples, the first set of source UEs and the second set of source UEs may include the same UEs. In some examples, the second set of source UEs may comprise a subset of UEs of the first set of source UEs.

In some examples, the sidelink message may include SCI and sidelink data. At 1414, the base station may determine at least one transmission parameter associated with transmission of the sidelink message from the first UE to the second UE based on the SCI, as described in connection with 814 of FIGS. 8 and/or 960 of FIG. 9. For example, 1414 may be performed by a transmission parameter component 1550 of the apparatus 1502 of FIG. 15. The at least one transmission parameter may include a resource reservation, a coding rate, and/or an MCS. In some examples, the base station transmits (e.g., at 1426) the sidelink transmission to the second UE using at least one same transmission parameter as the transmission of the base layer from the first UE.

In some examples, the base station transmits (e.g., at 1426) the sidelink transmission using at least one different transmission parameter as the transmission of the sidelink message from the first UE to the second UE. For example, the base station may transmit the sidelink transmission using at least one of a lower MSC and a lower code rate than an MCS and a code rate associated with the transmission of the sidelink message from the first UE to the second UE. In some such examples, the base station may transmit a control message to the second UE signaling the at least one of the lower MCS and the lower code.

In some examples, at 1416, the base station may decode the enhancement layer of the MUST transmission to obtain the uplink message, as described in connection with 814 of FIG. 8. For example, 1416 may be performed by the decoding component 1542 of the apparatus 1502 of FIG. 15. In some examples, the base station may decode the enhancement layer after obtaining the sidelink message.

In some examples, at 1420, the base station may determine a source identifier associated with the sidelink feedback message based on a sidelink feedback channel resource used by the second UE to transmit the sidelink feedback message, as described in connection with 970 of FIG. 9. For example, 1420 may be performed by a sidelink message handling component 1552 of the apparatus 1502 of FIG. 15. In some examples, the source identifier may indicate a source UE to which the sidelink feedback message is directed.

At 1422, the base station may determine the sidelink message to transmit to the second UE based at least in part on the determined source identifier, as described in connection with 972 of FIG. 9. For example, 1422 may be performed by the sidelink message handling component 1552 of the apparatus 1502 of FIG. 15.

In some examples, at 1424, the base station may determine a resource to use to transmit the sidelink transmission to the second UE based on SCI of the sidelink message, as described in connection with 980, 990 of FIG. 9, and/or 1054, 1064 of FIG. 10. For example, 1424 may be performed by a resource component 1554 of the apparatus 1502 of FIG. 15.

In some examples, the base station may transmit (e.g., at 1426) the sidelink transmission to the second UE at a same time slot when the SCI indicates that the second UE transmits a retransmission of the sidelink message to the second UE. In some examples, the base station determines the resource to use to transmit the sidelink transmission based on one or more of a transmission resource associated with transmission of the sidelink message from the first UE to the second UE, a source identifier associated with the first UE, and a destination identifier associated with the second UE.

In some examples, at 1402, the base station may receive a cluster MUST request from the first UE or the second UE, as described in connection with the cluster MUST relay request 1020 of FIG. 10. For example, 1402 may be performed by a cluster component 1556 of the apparatus 1502 of FIG. 15. The cluster MUST relay request may request that the base station serve as a relay for member UEs of a cluster communicating using sidelink, such as the UEs of the cluster 1004 of FIG. 10. In some examples, the cluster MUST relay request may identify a groupcast identifier (groupcastID) associated with the cluster and the member UEs of the cluster. The member UEs of the cluster may include at least the first UE and the second UE.

At 1404, the base station may transmit a cluster confirmation message indicating that the base station is serving as a relay for sidelink messages of MUST transmissions generated by member UEs of the cluster, as described in connection with the cluster confirmation message 1030 of FIG. 10. For example, 1404 may be performed by the cluster component 1556 of the apparatus 1502 of FIG. 15.

In some examples, the MUST transmission (e.g., at 1410) may comprise a cluster MUST transmission and the base layer may comprise a groupcast sidelink message. In some such examples, the base station may transmit (e.g., at 1426) the sidelink message in response to a NACK message from any UE in the cluster.

In some examples, the base station may determine (e.g., at 1424) a resource common to the cluster to use to transmit the sidelink message to the second UE. The base station may transmit (e.g., at 1426) the sidelink message to the second UE using the resource that is common to the cluster. In some examples, the determining (e.g., at 1424) of the resource common to the cluster may include determining a MUST transmission resource used to transmit the cluster MUST transmission, mapping the MUST transmission resource and the groupcast identifier of the cluster to a common resource set, and selecting the common resource from the common resource set based on the mapping.

Figure 15:
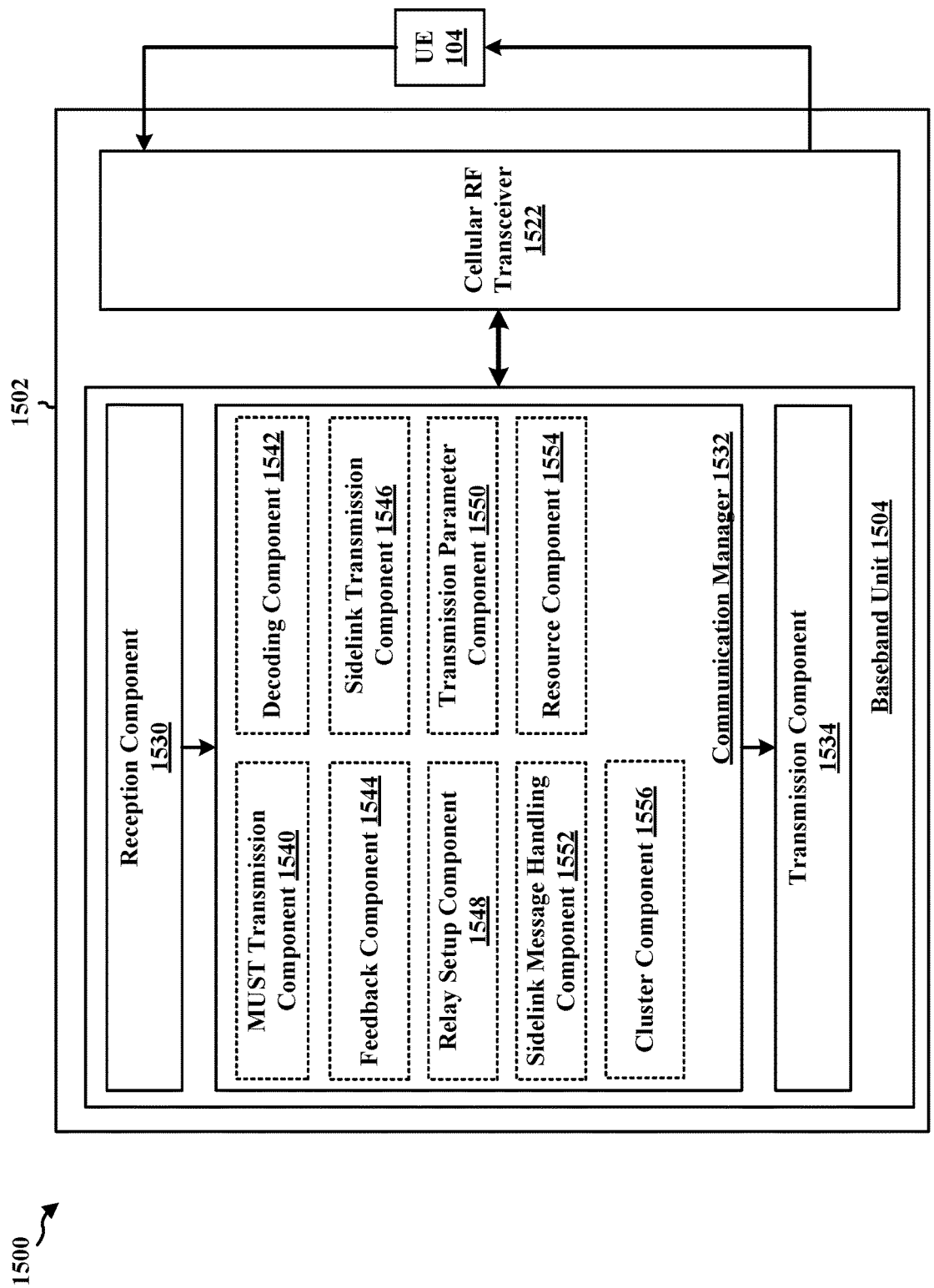
FIG. 15 is a diagram illustrating an example of a hardware implementation for an example apparatus, in accordance with the teachings disclosed herein.

FIG. 15 is a diagram 1500 illustrating an example of a hardware implementation for an apparatus 1502. The apparatus 1502 is a wireless communication device and includes a baseband unit 1504. The baseband unit 1504 may communicate through a cellular RF transceiver 1522 with the UE 104. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 15321532 includes the one or more illustrated components. The components within the communication manager 1532 may be stored in the computer-readable medium/memory and/or configured as hardware within the baseband unit 1504. The baseband unit 1504 may be a component of the first wireless communication device 310 and may include the memory 376 and/or at least one of the TX processor 316, the RX processor 370, and the controller/processor 375. In one configuration, the apparatus 1502 may be a modem chip and include just the baseband processor 1504, and in another configuration, the apparatus 1502 may be the entire wireless communication device (e.g., see the first wireless communication device 310 of FIG. 3) and include the additional modules of the apparatus 1502.

The communication manager 1532 includes a MUST transmission component 1540 that is configured to receive, from a first UE, a MUST transmission including a base layer and an enhancement layer, for example, as described in connection with 1410 of FIG. 14. The communication manager 1532 also includes a decoding component 1542 that is configured to decode the base layer of the MUST transmission and/or decode the enhancement layer of the MUST transmission, for example, as described in connection with 1412 and 1416 of FIG. 14. The communication manager 1532 also includes a feedback component 1544 that is configured to receive a sidelink feedback message from the second UE, for example, as described in connection with 1418 of FIG. 14. The communication manager 1532 also includes a sidelink transmission component 1546 that is configured to transmit the sidelink message to the second UE in a sidelink transmission, for example, as described in connection with 1426 of FIG. 14. The communication manager 1532 also includes a relay setup component 1548 that is configured to receive a MUST relay request from the second UE and transmit a confirmation message to the second UE, for example, as described in connection with 1406 and 1408 of FIG. 14. The communication manager 1532 also includes a transmission parameter component 1550 that is configured to determine at least one transmission parameter associated with the transmission of the sidelink message based on the SCI, for example, as described in connection with 1414 of FIG. 14. The communication manager 1532 also includes a sidelink message handling component 1552 that is configured to determine a source identifier associated with the sidelink feedback message and determine the sidelink message to transmit to the second UE, for example, as described in connection with 1420 and 1422 of FIG. 14. The communication manager 1532 also includes a resource component 1554 that is configured to determine a resource to use to transmit the sidelink transmission to the second UE, for example, as described in connection with 1424 of FIG. 14. The communication manager 1532 also includes a cluster component 1556 that is configured to receive a cluster MUST request and transmit a cluster confirmation message, for example, as described in connection with 1402 and 1404 of FIG. 14.

The apparatus may include additional components that perform each of the blocks of the algorithm in the aforementioned flowchart of FIG. 14. As such, each block in the aforementioned flowchart of FIG. 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1502, and in particular the baseband unit 1504, includes means for receiving, from a first UE, a MUST transmission including a base layer and an enhancement layer, the base layer comprising a sidelink message for a second UE and the enhancement layer comprising an uplink message for the base station. The example apparatus 1502 also includes means for decoding the base layer of the MUST transmission to obtain the sidelink message. The example apparatus 1502 also includes means for receiving a sidelink feedback message from the second UE indicating that the second UE did not successfully receive the sidelink message. The example apparatus 1502 also includes means for transmitting the sidelink message to the second UE in a sidelink transmission in response to the sidelink feedback message signals from the second UE. The example apparatus 1502 also includes means for receiving a MUST relay request from the second UE requesting that the base station serve as a relay of sidelink messages for MUST transmissions generated by a first set of source UEs, wherein the set of source UEs includes at least the first UE. The example apparatus 1502 also includes means for transmitting a confirmation message to the second UE signaling a confirmation of the base station to serve as a relay for MUST transmissions generated by a second set of source UEs, wherein the second set of source UEs includes at least the second UE. The example apparatus 1502 also includes means for determining at least one transmission parameter associated with transmission of the sidelink message from the first UE to the second UE based on the SCI. The example apparatus 1502 also includes means for decoding the enhancement layer of the MUST transmission to obtain the uplink message, and wherein the base station decodes the enhancement layer after obtaining the sidelink message. The example apparatus 1502 also includes means for determining a source identifier associated with the sidelink feedback message based on a sidelink feedback channel resource used by the second UE to transmit the sidelink feedback message, wherein the source identifier indicates a source UE to which the sidelink feedback message is directed. The example apparatus 1502 also includes means for determining the sidelink message to transmit to the second UE based at least in part on the determined source identifier. The example apparatus 1502 also includes means for determining a resource common to the cluster to use to transmit the sidelink message to the second UE, wherein the base station transmits the sidelink message to the second UE using the resource that is common to the cluster. The example apparatus 1502 also includes means for determining the resource common to the cluster including: determining a MUST transmission resource used to transmit the cluster MUST transmission, mapping the MUST transmission resource and the groupcast identifier of the cluster to a common resource set, and selecting the common resource from the common resource set based on the mapping.

The aforementioned means may be one or more of the aforementioned components of the apparatus 1502 configured to perform the functions recited by the aforementioned means. As described supra, the apparatus 1502 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means Superposition Transmission of Sidelink and Uplink with Base Station as Relay In some examples, a communication link between a first UE and a second UE may be relatively stronger (e.g., having a higher geometry) than a communication link between the first UE and a base station (e.g., due to a weaker geometry). In such examples, the uplink message for transmission to the base station may be encoded as the base layer of a MUST transmission and the sidelink message for transmission to the second UE may be encoded as the enhancement layer.

Figure 16:
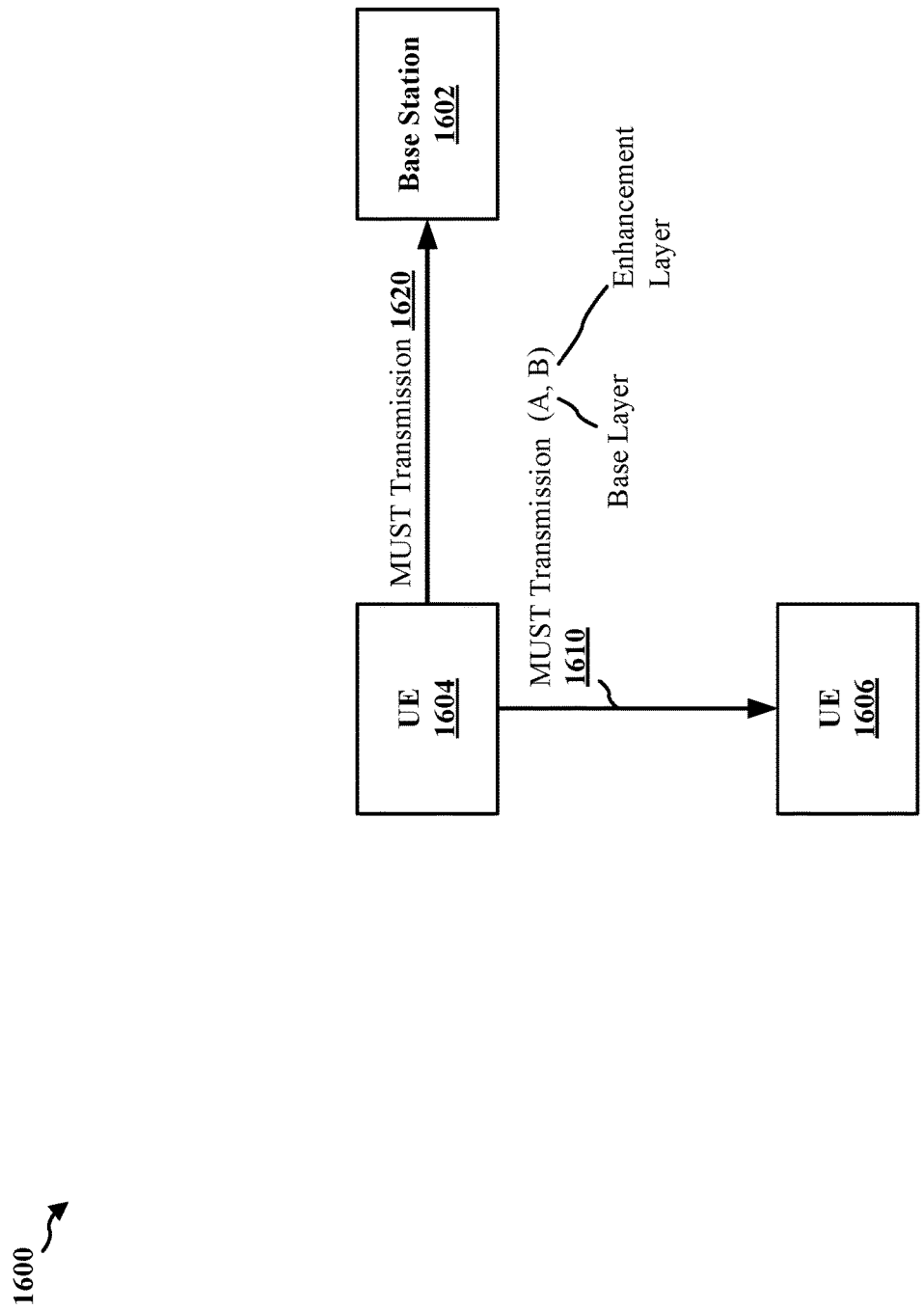
FIG. 16 illustrates an example of wireless communication between devices using MUST transmissions, in accordance with the teachings disclosed herein.

FIG. 16 illustrates an example 1600 of wireless communication between devices using MUST transmissions, as presented herein. Aspects of a base station 1602 may be implemented by the base station 602 of FIG. 6, aspects of the first UE 1604 may be implemented by the first UE 604 of FIG. 6, and aspects of the second UE 1606 may be implemented by the second UE 606 of FIG. 6.

In the illustrated example of FIG. 16, the first UE 1604 is configured to transmit the message A to the second UE 1606 using a sidelink transmission and to transmit the message B to the base station 1602 using an uplink transmission. In the illustrated example, the communication link between the first UE 1604 and the second UE 1606 may be relatively stronger than the communication link between the first UE 1604 and the base station 1602. Additionally, the communication link between the first UE 1604 and the second UE 1606 may facilitate the first UE 1604 transmitting a MUST transmission to the second UE 1606. For example, the communication link between the first UE 1604 and the second UE 1606 may be associated with a relatively high SNR to enable the first UE 1604 to transmit two or more messages using a same frequency and/or time resource.

As shown in FIG. 16, the first UE 1604 may transmit a first MUST transmission 1610 to the base station 1602 using an uplink transmission on a first resource. The first UE 1604 may transmit a second MUST transmission 1620 to the second UE 1606 using sidelink on a second resource. The MUST transmissions 1610, 1620 may contain the first message (message A) and the second message (message B). For example, the base layer of the MUST transmissions 1610, 1620 may be encoded with the uplink message (message B) and the enhancement layer of the MUST transmissions 1610, 1620 may be encoded with the sidelink message (message A). Thus, it may be appreciated that the base layer of the MUST transmissions 1610, 1620 may be encoded based on the relatively weaker link (e.g., based on the uplink message) and the enhancement layer of the MUST transmissions 1610, 1620 may be encoded based on the relatively stronger link (e.g., based on the sidelink message).

Although the first MUST transmission 1610 may include the sidelink message and the uplink message, the base station 1602 may be configured to decode the uplink message and not the sidelink message. For example, the base station 1602 may be configured to decode the base layer of the first MUST transmission 1610 and may not be configured to decode the enhancement layer of the first MUST transmission 1610. However, the second UE 1606 may be configured to decode the base layer and the enhancement layer of the second MUST transmission 1620.

In some examples, there may be transmission errors in the first MUST transmission 1610 received by the base station 1602 (e.g., due to the weaker communication link between the first UE 1604 and the base station 1602). For example, the base station 1602 may be unable to decode the base layer of the first MUST transmission 1610 and/or may not receive the first MUST transmission 1610.

Aspects disclosed herein provide techniques for enabling the second UE 1606 to enhance the reliability of the uplink message (message B) being received by the base station 1602. That is, aspects disclosed herein provide techniques for enabling the second UE 1606 to enhance uplink reliability for transmissions that have been superposition encoded.

Figure 17:
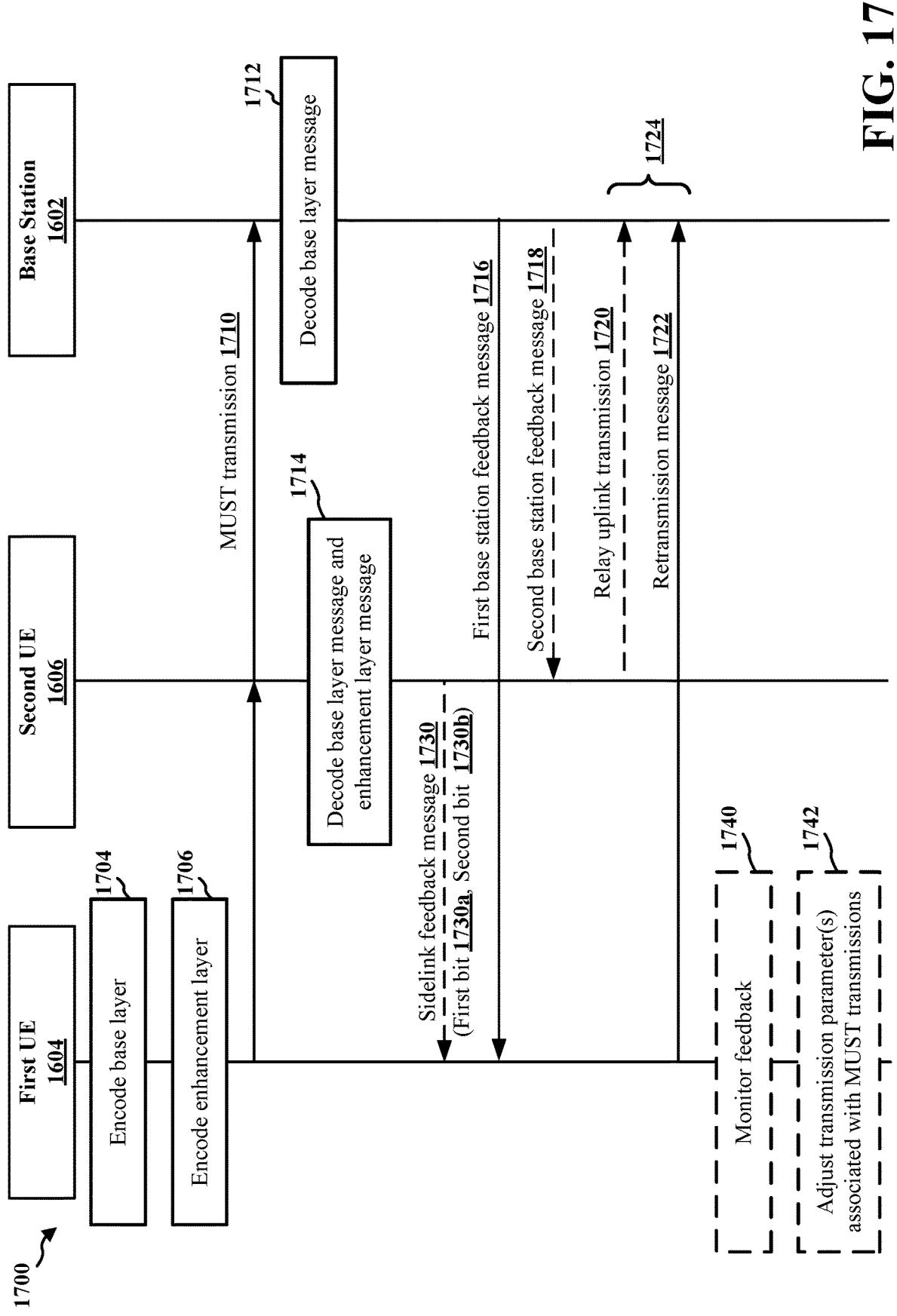
FIG. 17 illustrates an example communication flow between a base station, a first UE, and a second UE, in accordance with the teachings disclosed herein.

FIG. 17 illustrates an example communication flow 1700 between the base station 1602, the first UE 1604, and the second UE 1606 of FIG. 16, as presented herein. In the illustrated example, the communication flow 1700 facilitates the second UE 1606 to enhance uplink reliability for communication between the first UE 1604 and the base station 1602 with transmissions that have been superposition encoded. Although not shown in the illustrated example of FIG. 17, it may be appreciated that in additional or alternative examples, the base station 1602 may be in communication with one or more other base stations or UEs, and/or the UEs 1604, 1606 may be in communication with one or more other base stations or UEs.

At 1704, the first UE 1604 encodes an uplink message as a base layer of a MUST transmission. For example, the first UE 1604 may encode the uplink message 620 (message B) of FIG. 6 as the base layer.

At 1706, the first UE 1604 encodes a sidelink message as an enhancement layer of the MUST transmission. For example, the first UE 1604 may encode the sidelink message 610 (message A) of FIG. 6 as the enhancement layer.

In the illustrated example, the first UE 1604 transmits a MUST transmission 1710 that is received by the second UE 1606 and the base station 1602. The MUST transmission 1710 may correspond to the MUST transmissions 1610, 1620 of FIG. 16. For example, the MUST transmission 1710 may facilitate the concurrent transmission of a sidelink message (message A) and an uplink message (message B). The first UE 1604 may encode the uplink message (message B) as the base layer of the MUST transmission 1710 and may encode the sidelink message (message A) as the enhancement layer of the MUST transmission 1710. In this manner, the first UE 1604 may improve spectral efficiency by using one resource for transmitting the sidelink message and the uplink message.

The MUST transmission 1710 may comprise control information and a data channel. In some examples, the first UE 1604 may superposition encode the control information of the base layer and the enhancement layer. For example, the first UE 1604 may superposition encode the SCI 612 of the sidelink message 610 and the UCI 622 of the uplink message 620 of FIG. 6. In some examples, the first UE 1604 may not perform superposition encoding on the control information. For example, the first UE 1604 may transmit the control information of the sidelink message (e.g., the SCI 612) and/or the control information of the uplink message (e.g., the UCI 622). The first UE 1604 may determine not to perform superposition encoding on the control information to enhance the reliability of the base station 1602 receiving and decoding the control information corresponding to the base layer message (e.g., the UCI 622).

In a similar manner, the first UE 1604 may superposition encode the data channel of the base layer and the enhancement layer. For example, the first UE 1604 may superposition encode the PSSCH 624 of the sidelink message 610 and the PUSCH 624 of the uplink message 620 of FIG. 6. In some examples, the first UE 1604 may not perform superposition encoding on the data channel. For example, the first UE 1604 may transmit the data channel of the sidelink message (e.g., the PSSCH 622) and/or the data channel of the uplink message (e.g., the PUSCH 624). The first UE 1604 may determine not to perform superposition encoding on the data channel to enhance the reliability of the base station 1602 receiving and decoding the data channel corresponding to the base layer message (e.g., the PUSCH 624).

At 1712, the base station 1602 attempts to decode the base layer message (e.g., message B) of the received MUST transmission 1710. As described above, the base station 1602 may be configured to decode the base layer of a MUST transmission and not configured to decode the enhancement layer of the MUST transmission. The base station 1602 may or may not be able to decode the base layer message of the MUST transmission 1710. The base station 1602 may decode the control information of the MUST transmission 1710. For example, the first UE 1604 may encode the UCI 622 using an encoding rate that is low and, thus, allows additional redundancy in the control information.

As shown in FIG. 17, the base station 1602 transmits a first base station feedback message 1716. The base station 1602 may transmit the first base station feedback message 1716 using a downlink transmission to the first UE 1604. The first base station feedback message 1716 may comprise an ACK message when the base station 1602 successfully decodes the base layer message (at 1712). The first base station feedback message 1716 may comprise a NACK message when the base station 1602 is not able to decode the base layer message (at 1712).

At 1714, the second UE 1606 decodes the base layer message and the enhancement layer message of the received MUST transmission 1710. For example, the second UE 1606 may be configured to decode the base layer of the MUST transmission 1710 to receive the base layer message (e.g., the UCI 622 and the PUSCH 624 of the message B). The second UE 1606 may also be configured to decode the enhancement layer of the MUST transmission 1710 to receive the enhancement layer message (e.g., the SCI 612 and the PSSCH 614 of the message A). In some examples, the second UE 1606 may be configured to decode the base layer of the MUST transmission 1710 before attempting to decode the enhancement layer of the MUST transmission 1710.

The second UE 1606 may transmit a sidelink feedback message 1730 that is received by the first UE 1604. The second UE 1606 may transmit the sidelink feedback message 1730 using sidelink. The sidelink feedback message 1730 may comprise an ACK message or a NACK message based on whether the second UE 1606 successfully decodes the MUST transmission 1710.

In some examples, based on whether the base station 1602 successfully decoded the base layer message of the MUST transmission 1710, the second UE 1606 may relay the decoded base layer message (message B) to the base station 1602. For example, when transmitting feedback associated with a MUST transmission, the base station 1602 may transmit the first base station feedback message 1716 to the first UE 1604, and the base station 1602 may transmit a second base station feedback message 1718 to the second UE 1606. The base station 1602 may transmit the second base station feedback message 1718 using a downlink transmission. Similar to the first base station feedback message 1716, the second base station feedback message 1718 may comprise an ACK message or a NACK message based on whether the base station 1602 successfully decodes the base layer message of the MUST transmission 1710. When the base station 1602 is unable to decode the base layer message of the MUST transmission 1710, the base station feedback messages 1716, 1718 may comprise a NACK message. After receiving the second base station feedback message 1718 comprising the NACK message, the second UE 1606 may transmit the decoded base layer message (message B) to the base station 1602 as a relay uplink transmission 1720.

In some examples, the second UE 1606 may apply different relay strategies 1724 when transmitting the relay uplink transmission 1720 to the base station 1602. The relay strategies 1724 may correspond to rules to coordinate performing retransmissions of a message (e.g., the message B) by the first UE 1604 and the second UE 1606. For example, the different relay strategies 1724 may indicate when the first UE 1604 transmits a retransmission message 1722 and when the second UE 1606 transmits the relay uplink transmission 1720.

In a first relay strategy, the second UE 1606 may transmit the relay uplink transmission 1720 at a same time (e.g., slot) as when the first UE 1604 is performing a retransmission of the uplink message (e.g., the message B) to the base station 1602. For example, the second UE 1606 may transmit the relay uplink transmission 1720 at the same instant (e.g., slot) that the first UE 1602 transmits the retransmission message 1722. In some such examples, the base station 1602 may experience a power gain with respect to the message B, which may increase the reliability with which the base station 1602 successfully decodes the message B. For example, the base station 1602 may apply coherent combining of the retransmission message 1722 from the first UE 1604 and the relay uplink transmission 1720 from the second UE 1606 to provide a power gain associated with the message B at the base station 1602. The second UE 1606 may transmit the relay uplink transmission 1720 using a resource indicated in a grant provided by the base station 1602 (e.g., via the first base station feedback message 1716). The first UE 1604 may transmit the retransmission message 1722 using a resource indicated in a grant provided by the base station 1602 (e.g., via the second base station feedback message 1718).

In a second example relay strategy, the second UE 1606 may determine whether to participate in a retransmission of a message (e.g., by transmitting the relay uplink transmission 1720 to the base station 1602) based on a priority of the message for which retransmission may be performed (e.g., the priority associated with the message B). For example, if the priority associated with the message B is greater than or equal to a first priority threshold (e.g., priority>=THR1), the first UE 1604 may transmit the retransmission message 1722 and the second UE 1606 may transmit the relay uplink transmission 1720 to the base station 1602. In some examples, if the priority associated with the message B is less than the first priority threshold and is greater than or equal to a second priority threshold (e.g., THR2<=priority<THR1), the first UE 1604 may transmit the retransmission message 1722, but the second UE 1606 may refrain from transmitting the relay uplink transmission 1720 to the base station 1602. In other examples, if the priority associated with the message B is less than the first priority threshold and greater than or equal to the second priority threshold (e.g., THR2<=priority<THR1), the second UE 1606 may transmit the relay uplink transmission 1720, but the first UE 1604 may refrain from transmitting the retransmission message 1720 to the base station 1602. The second UE 1606 may transmit the relay uplink transmission 1720 using an allocated first common grant provided by the base station 1602 (e.g., via the first base station feedback message 1716). The first UE 1604 may transmit the retransmission message 1722 using an allocated second common grant provided by the base station 1602 (e.g., via the second base station feedback message 1718).

In a third example relay strategy, the second UE 1606 may participate in the retransmission of the message B when a condition is satisfied. For example, the second UE 1606 may transmit the relay uplink transmission 1720 to the base station 1602 when Equation 2 (below) is satisfied.

$$\text{UE2ID} \bmod N \in S \qquad \text{Equation 2:}$$

In Equation 2, the parameter "UE2ID" represents the identifier of the second UE, the parameter "N" represents a modification to apply to the UE2ID, and the parameter "S" represents a condition. The parameters N, S may be configured (e.g., via RRC signaling) or may be signaled (e.g., via a MAC-CE or DCI). In some examples, Equation 2 may be satisfied by odd slots, by even slots, by every tenth slot, etc.

In some examples, the base station 1602 may use Equation 2 (above) to determine when the second UE 1606 may transmit the relay uplink transmission 1720. By applying Equation 2, the base station 1602 may be able to determine when the relay uplink transmission 1720 received from the second UE 1606 corresponds to a retransmission of the message B.

In a fourth example relay strategy, the first UE 1604 and the second UE 1606 may participate in the retransmission of the message B to the base station 1602 based on independent uplink grants provided by the base station 1602. For example, the base station 1602 may provide the first UE 1604 a first grant (e.g., via the first base station feedback message 1716) and may provide the second UE 1606 a second grant (e.g., via the second base station feedback message 1718) after determining that the base station 1602 is unable to decode the base layer message (e.g., at 1712). For example, the first grant may configure the first UE 1604 to transmit the retransmission message 1722 at a slot n+m$_1$ for a message (e.g., the message B) that was originally transmit at slot n. In some examples, the first grant received by the first UE 1604 may be an uplink grant (e.g., a conventional uplink grant). The second grant may configure the second UE 1606 to transmit the relay uplink transmission 1720 at a slot n+m$_2$ for the message (e.g., the message B) that was originally transmit at slot n. In some examples, the offsets m$_1$, m$_2$ may be configured (e.g., via RRC signaling) and/or explicitly signaled (e.g., via a MAC-CE or DCI).

In a fifth example relay strategy, the base station 1602 may provide grant-free scheduling to the second UE 1606. For example, the base station 1602 may provide the grant-free scheduling to the second UE 1606 via the second base station feedback message 1718. In some such examples, the grant-free scheduling may be based on decode failures of the base layer message by the base station 1602 (e.g., at 1712). For example, if the base station 1602 indicates a quantity or percentage of decode failures that is greater than a failures threshold (failures>THR), the base station 1602 may request that the second UE 1606 provide assistance to the base station 1602 (e.g., transmit the relay uplink transmission 1720). For example, if the base station 1602 transmits ten decode failures (e.g. NACK messages) in a window (e.g., a 100 millisecond window), the base station 1602 may request the second UE 1602 provide relay assistance to the base station 1602 with respect to the base layer message.

In some examples, the grant-free scheduling may be implemented via a type-1 grant. In some such examples, the base station 1602 may provide the type-1 grant when the failures threshold is reached (e.g., the failures>THR). The base station 1602 may provide the type-1 grant to the second UE 1606 via RRC signaling. In some examples, the type-1 grant may indicate a resource allocation for the second UE 1606 to use when transmitting the relay uplink transmission 1720 for a message received in the latest slot. In some examples, the type-1 grant may request that the second UE 1606 transmit the relay uplink transmission 1720 at a slot n for a base layer message that the base station 1602 received at slot (n–m). In some examples, the base station 1602 may provide the offset m via RRC signaling.

In some examples, the grant-free scheduling may be implemented via a type-2 grant. The type-2 grant may be similar to the type-1 grant, but the base station 1602 may activate or deactivate the grant using a control channel (e.g., PDCCH) transmitted to the second UE 1606. For example, when employing the type-2 grant, the base station 1602 may provide the grant to the second UE 1606 using RRC signaling. The base station 1602 may then activate or deactivate the grant dynamically or as needed.

In some examples, the sidelink feedback message 1730 may comprise one bit to indicate whether the second UE 1606 successfully decoded the base layer message and/or the enhancement layer (e.g., at 1714). For example, the sidelink feedback message 1730 may comprise an ACK message when the second UE 1606 successfully decodes (e.g., at 1714) the base layer message and the enhancement layer message, and may comprise a NACK message when the second UE 1606 is unable to successfully decode at least one of the base layer message and the enhancement layer. In some examples, the sidelink feedback message 1730 may comprise an ACK message when the second UE 1606 successfully decodes (e.g., at 1714) the base layer message, and may comprise a NACK message when the second UE 1606 is unable to successfully decode the base layer message. In some examples, the sidelink feedback message 1730 may comprise an ACK message when the second UE 1606 successfully decodes (e.g., at 1714) the enhancement layer message, and may comprise a NACK message when the second UE 1606 is unable to successfully decode the enhancement layer message.

In some examples, the sidelink feedback message 1730 may comprise two bits and facilitate link adaptation. For example, the sidelink feedback message 1730 may include a first bit 1730a that corresponds to base layer feedback and a second bit 1730b that corresponds to enhancement layer feedback. For example, the second UE 1606 may receive the MUST transmission 1710 and transmit base layer feedback (e.g., an ACK or a NACK) using the first bit 1730a based on whether the second UE 1606 successfully decodes the base layer message and enhancement layer feedback (e.g., an ACK or a NACK) using the second bit 1730b based on whether the second UE 1606 successfully decodes the enhancement layer message (e.g., at 1714).

In some examples, after receiving the base layer feedback (e.g., the first bit 1730a of the sidelink feedback message 1730), the first UE 1604 may modify aspects of the base layer and/or the enhancement layer. For example, the first UE 1604 may modify one or more transmission parameters associated with the base layer and/or the enhancement layer of subsequent MUST transmission(s). For example, the first UE 1604 may adapt the code rate, the modulation and coding scheme (MCS), and/or a power allocation associated with the base layer and/or the enhancement layer based on the base layer feedback.

In some examples, the first UE 1604 may modify the or more transmission parameters based on the base layer feedback and/or the enhancement layer feedback received over a window. For example, at 1740, the first UE 1604 may monitor base layer feedback and/or enhancement layer feedback received over a time window. At 1742, the first UE 1604 may adjust one or more transmission parameters of subsequent MUST transmissions based on the base layer feedback and/or the enhancement layer feedback received during the time window.

For example, if, at 1740, the first UE 1604 receives a NACK threshold quantity of base layer NACK messages (e.g., the first bit 1730a comprises a NACK) during a time window, the first UE 1604 may determine that additional protection may be beneficial for transmissions of the base layer message. In such examples, at 1742, the first UE 1604 may determine to decrease the code rate and/or modulation of the base layer of subsequent MUST transmission(s), and/or may increase the power allocation of the base layer of subsequent MUST transmission(s).

If, at 1740, the first UE 1604 receives an ACK threshold quantity of base layer ACK messages (e.g., the first bit 1730a comprises an ACK) and a NACK threshold quantity of enhancement layer NACK messages (e.g., the second bit 1730b comprises a NACK) during a time window, the first UE 1704 may determine that transmissions of the base layer message are successfully being decoded by the second UE 1706. In such examples, at 1742, the first UE 1604 may determine to decrease or retain the code rate and/or modulation of the base layer of subsequent MUST transmission(s), and/or may decrease or retain the power allocation of the base layer of subsequent MUST transmission(s). The first UE 1604 may also determine to increase the code rate and/or modulation of the enhancement layer of subsequent MUST transmission(s), and/or increase the power allocation of the enhancement layer of subsequent MUST transmission(s).

If, at 1740, the first UE 1604 receives an ACK threshold quantity of base layer ACK messages and an ACK threshold quantity of enhancement layer ACK messages during the time window, the first UE 1604 may determine to decrease, increase, or retain the code rate and/or modulation of the base layer and enhancement layer of subsequent MUST transmission(s), and/or decrease, increase, or retain the power allocation of the base layer and enhancement layer of subsequent MUST transmission(s).

In some examples, the resource(s) used for transmitting the MUST transmissions may be fixed. In such examples, the first UE 1604 may adjust parameters associated with the enhancement layer based on the adjustment(s) that the first UE 1604 makes (if any) to the base layer. For example, when the first UE 1604 determines to increase the code rate and/or the modulation of the base layer, the first UE 1604 may decrease or retain the code rate and/or the modulation of the enhancement layer of subsequent MUST transmission(s). When the first UE 1604 determines to decrease the code rate and/or the modulation of the base layer, the first UE 1604 may increase or retain the code rate and/or the modulation of the enhancement layer of subsequent MUST transmission(s). In a similar manner, when the first UE 1604 determines to decrease the power allocation of the base layer, the first UE 1604 may determine to increase or retain the power allocation of the enhancement layer of subsequent MUST transmission(s). When the first UE 1604 determines to increase the power allocation of the base layer, the first UE 1604 may determine to decrease or retain the power allocation of the enhancement layer of subsequent MUST transmission(s).

In some examples, the first UE 1604 may be configured with the ACK threshold quantity and/or the NACK threshold quantity. For example, the first UE 1604 may receive the ACK threshold quantity and/or the NACK threshold quantity via RRC signaling, a MAC-CE, or DCI. It may be appreciated that the first UE 1604 may be configured with the ACK threshold quantity, the NACK threshold quantity, neither the ACK threshold quantity nor the NACK threshold quantity, or both of the ACK threshold quantity and the NACK threshold quantity. In such examples, the first UE 1604 may monitor, at 1740, for base layer feedback and/or enhancement layer feedback based on the configured threshold quantity (or threshold quantities).

In some examples, if, while monitoring feedback at 1740, the first UE 1604 receives base layer ACKs and enhancement layer NACKs during a time window, the first UE 1604 may determine to adjust the amount of information that the first UE 1604 transmits using the base layer and/or the enhancement layer. For example, instead of transmitting a first quantity of bits (e.g., five bits) using the enhancement layer, the first UE 1604 may determine to transmit a smaller quantity of bits (e.g., two bits) using the enhancement layer. In some examples, the first UE 1604 may determine to maintain the first quantity of bits transmit using the enhancement layer, and may determine to reduce the quantity of bits transmit using the base layer.

In some examples, the first UE 1604 may request the second UE 1606 act as a relay to the first UE 1604 for MUST transmissions. For example, the first UE 1604 may request that the second UE 1606 transmit uplink transmissions to the base station 1602 when an uplink message is transmitted by the first UE 1604 using a MUST transmission and the base station 1602 is unable to decode the uplink message (e.g., the message B).

Figure 18:
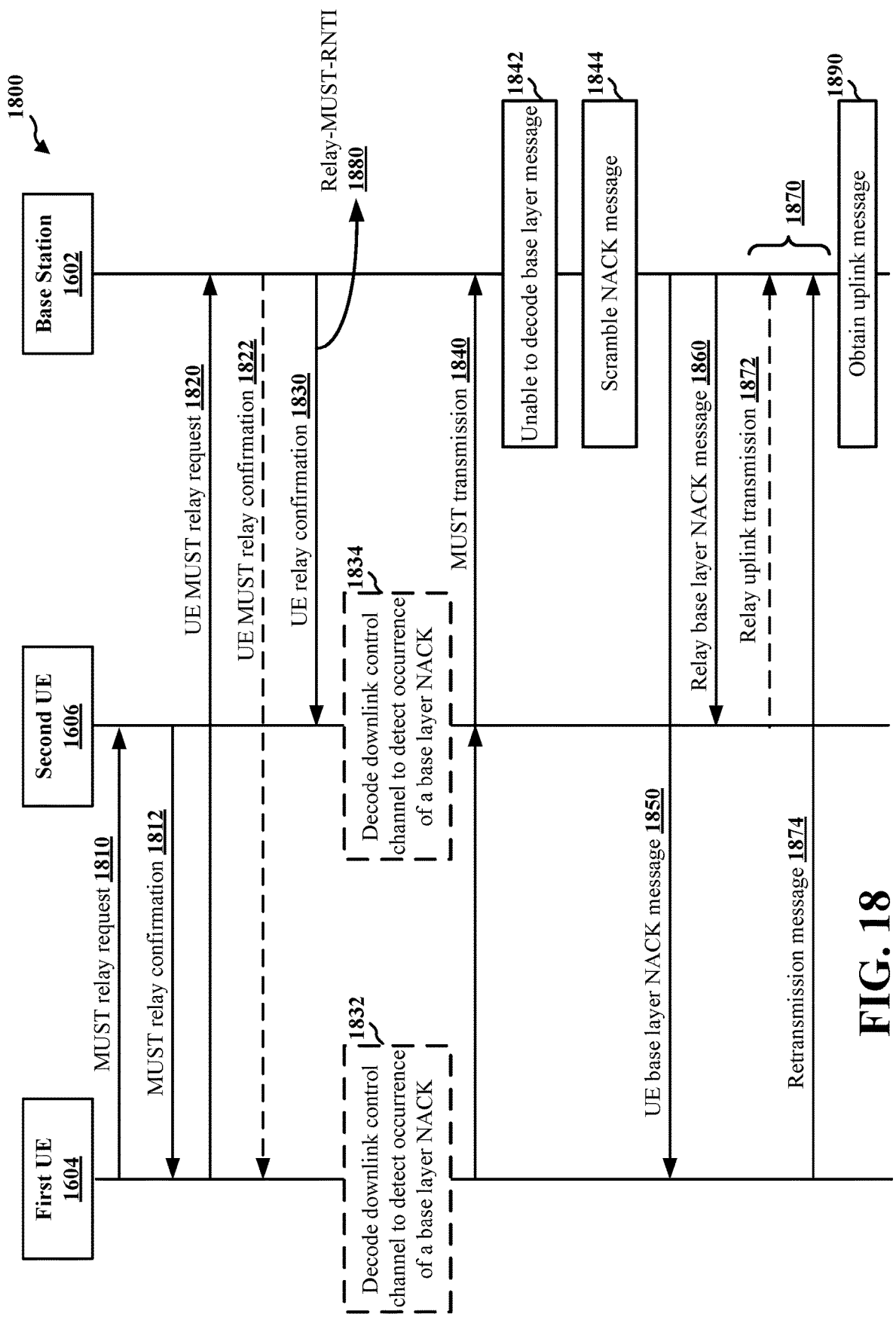
FIG. 18 illustrates an example communication flow between a base station, a first UE, and a second UE, in accordance with the teachings disclosed herein.

FIG. 18 illustrates an example communication flow 1800 between the base station 1602, the first UE 1604, and the second UE 1606 of FIGS. 16 and/or 17, as presented herein. In the illustrated example, the communication flow 1800 facilitates the second UE 1606 to enhance uplink reliability for communications between the first UE 1604 and the base station 1602 with transmissions that have been superposition encoded. Aspects of the communication flow 1800 may be similar to the communication flow 1700 of FIG. 17. Although not shown in the illustrated example of FIG. 18, it may be appreciated that in additional or alternative examples, the base station 1602 may be in communication with one or more other base stations or UEs, and/or the UEs 1604, 1606 may be in communication with one or more other base stations or UEs.

In the illustrated example of FIG. 18, the first UE 1604 transmits a MUST relay request 1810 that is received by the second UE 1606. The MUST relay request 1810 may request that the second UE 1606 serve as a relay for MUST transmissions generated by the first UE 1604.

The second UE 1606 transmits a MUST relay confirmation 1812 that is received by the first UE 1604. The MUST relay confirmation 1812 confirms to the first UE 1604 that the second UE 1606 agrees to serve as a relay.

As shown in FIG. 18, the first UE 1604 transmits a UE MUST relay request 1820 that is received by the base station 1602. The UE MUST relay request 1820 may indicate to the base station 1602 that the second UE 1606 has agreed to serve as a relay for the first UE 1604 for MUST transmissions to the base station 1602.

The base station 1602 may transmit a UE relay confirmation 1822 that is received by the first UE 1604. The UE relay confirmation 1822 may confirm to the first UE 1604 that the base station 1602 acknowledges that the second UE 1602 is serving as a relay for the first UE 1604.

In the illustrated example of FIG. 18, the base station 1602 transmits a UE relay confirmation 1830 that is received by the second UE 1606. The UE relay confirmation 1830 confirms to the second UE 1606 that the second UE 1606 is configured to act as a relay for the first UE 1604 for MUST transmissions to the base station 1602.

When the second UE 1606 is configured to act as the relay for the first UE 1604, the second UE 1606 may retransmit a base layer message to the base station 1602 when the base station 1602 indicates that the base station 1602 is unable to decode the base layer message of a MUST transmission. For example, when the base station 1602 is unable to decode the base layer message of a MUST transmission, the base station 1602 may transmit a NACK message using a downlink transmission. However, it may be appreciated that to maintain security and/or provide privacy, the base station 1602 may transmit the NACK message as a unicast message to the first UE 1604 (e.g., may not broadcast the NACK message). For example, the first UE 1604 may receive a downlink control channel (e.g., PDCCH) and decode the downlink control channel to determine that the base station 1602 transmit a NACK message. The first UE 1604 may decode the downlink control channel based on a configuration provided by the base station 1602.

However, the second UE 1606 may not receive the downlink control channel and/or may not be configured to decode the downlink control channel. That is, based on the above, while the second UE 1606 may be configured to serve as a relay to the first UE 1604, the second UE 1606 may be unable to determine when to provide support to the first UE 1604. For example, based on the above, the second UE 1606 may be unable to determine when the base station 1602 transmits a NACK message after not being able to decode the base layer message of a MUST transmission.

Aspects disclosed herein provide a relay-MUST-RNTI that the base station 1602 may use to encode (or scramble) a downlink control channel when transmitting a NACK message to signal an inability to decode a base layer message of a MUST transmission. For example, the base station 1602 may receive a MUST transmission and be unable to decode the base layer message of the MUST transmission. The base station 1602 may generate a NACK message and use the relay-MUST-RNTI to encode the NACK message. The base station 1602 may transmit a first downlink control channel to the first UE 1604 and a second downlink control channel to the second UE 1606. The downlink control channels may include the encoded NACK message. The first UE 1604 and the second UE 1606 may use the relay-MUST-RNTI to decode the respective received downlink control channels to determine that the base station 1602 transmitted a NACK message in response to the MUST transmission. The second UE 1606 may then transmit the base layer message to the base station 1602 as an uplink transmission to serve as the relay for the first UE 1604.

It may be appreciated that in some such examples, the first UE 1604 and the second UE 1606 may be configured with multiple RNTIs. For example, the first UE 1604 and the second UE 1606 may be configured with a first RNTI to decode downlink transmissions received from the base station 1602 that are not related to MUST transmissions, and may be configured with the relay-MUST-RNTI to decode downlink transmissions received from the base station 1602 that are related to MUST transmissions.

In the illustrated example, the UE relay confirmation 1830 from the base station 1602 to the second UE 1606 may include a relay-MUST-RNTI 1880. Additionally, the UE MUST relay confirmation 1822 from the base station 1602 to the first UE 1604 may include the relay-MUST-RNTI.

In some examples, the relay-MUST-RNTI 1880 may be valid for N slots based on the type of relay-MUST-RNTI. For example, a type-1 relay-MUST-RNTI may be valid for $N_1$ slots. A type-2 relay-MUST-RNTI may be valid for $N_2$ slots from the time that the relay-MUST-RNTI is received. For example, from the time that a type-2 relay-MUST-RNTI is issued, the relay-MUST-RNTI 1880 may be valid for the next ten slots.

In some examples, the base station 1602 may provide signaling to activate or deactivate the relay-MUST-RNTI 1880. For example, the base station 1602 may transmit signaling (e.g., via layer 1 signaling, RRC signaling, or a MAC-CE) to activate the relay-MUST-RNTI or to deactivate the relay-MUST-RNTI.

As shown in FIG. 18, after receiving the relay-MUST-RNTI 1880, the first UE 1604 and the second UE 1606 may attempt to decode downlink control channels received from the base station 1602 to detect an occurrence of a NACK message. For example, at 1832, the first UE 1604 may attempt to decode downlink control channels using the relay-MUST-RNTI 1880 to detect an occurrence of a NACK message signaling an inability by the base station 1602 to decode the base layer message of a MUST transmission. In a similar manner, at 1834, the second UE 1606 may attempt to decode downlink control channels using the relay-MUST-RNTI 1880 to detect an occurrence of a NACK message signaling an inability by the base station 1602 to decode the base layer message of a MUST transmission.

In the illustrated example of FIG. 18, the first UE 1604 transmits a MUST transmission 1840 that is received by the second UE 1606 and the base station 1602. Aspects of the MUST transmission 1840 may be similar to the MUST transmission 1710 of FIG. 17. For example, the MUST transmission 1840 may include an uplink message (message B) encoded in a base layer and a sidelink message (message A) encoded in an enhancement layer of the MUST transmission 1840.

As shown in FIG. 18, at 1842, the base station 1602 may be unable to decode the base layer message of the MUST transmission 1840. For example, there may be transmission errors in the MUST transmission 1840 received by the base station 1602 (e.g., due to the weaker communication link between the first UE 1604 and the base station 1602).

In the illustrated example, at 1844, the base station 1602 scrambles a NACK message indicating that the base station 1602 is unable to decode the base layer message of the MUST transmission 1840. For example, the base station 1602 may apply the relay-MUST-RNTI 1880 to encode the NACK message.

The base station 1602 transmits a UE base layer NACK message 1850 that is received by the first UE 1604. The base station 1602 also transmits a relay base layer NACK message 1860 that is received by the second UE 1606. The base layer NACK messages 1850, 1860 indicate that the base station 1602 did not successfully decode the base layer message of the MUST transmission 1840. The base station 1602 may transmit the base layer NACK messages 1850, 1860 to the UEs 1604, 1606 using respective downlink control channels. In some examples, the base layer NACK messages 1850, 1860 may include signaling to activate or deactivate the relay-MUST-RNTI 1880 (e.g., for a type-2 relay-MUST-RNTI). In some examples, the base layer NACK messages 1850, 1860 may include respective grants allocating resources for the respective UEs 1604, 1606 to retransmit the base layer message.

The UEs 1604, 1606 may decode the base layer NACK messages 1850, 1860 as described in connection with 1832 and 1834. For example, the second UE 1606 may apply the relay-MUST-RNTI 1880 to decode the relay base layer NACK message 1860 and to determine that the base station 1602 may be unable to decode the base layer message of the MUST transmission 1840.

As shown in FIG. 18, the first UE 1604 and the second UE 1606 may apply a relay strategy 1870 when retransmitting the base layer message (message B) to the base station 1602. The relay strategy 1870 may correspond to rules to coordinate performing retransmissions of the message B by the first UE 1604 and the second UE 1606 to the base station 1602. For example, different relay strategies 1870 may indicate when the first UE 1604 transmits a retransmission message 1874 to the base station 1602 and when the second UE 1606 transmits a relay uplink transmission 1872 to the base station 1602. Aspects of the relay strategies 1870 may be similar to the relay strategies 1724 of FIG. 17. Aspects of the relay uplink transmission 1872 may be similar to the relay uplink transmission 1720 of FIG. 17, and aspects of the retransmission message 1874 may be similar to the retransmission message 1722 of FIG. 17.

In a first example relay strategy, the second UE 1606 may transmit the relay uplink transmission 1872 at a same time (e.g., slot) as when the first UE 1604 is performing a retransmission of the uplink message (e.g., the message B) to the base station 1602. For example, the second UE 1606 may transmit the relay uplink transmission 1872 at the same instant (e.g., slot) that the first UE 1602 transmits the retransmission message 1874. When applying the first example relay strategy, the first UE 1604 and the second UE 1606 may apply the transmission parameters (e.g., MCS, code rate, etc.) as used by the MUST transmission 1840. In some such examples, the base station 1602 may experience a power gain with respect to the message B, which may increase the reliability with which the base station 1602 successfully decodes the message B. For example, the base station 1602 may apply coherent combining of the retransmission message 1874 from the first UE 1604 and the relay uplink transmission 1872 from the second UE 1606 to provide a power gain associated with the message B at the base station 1602. The second UE 1606 may transmit the relay uplink transmission 1872 using a resource indicated in a grant provided by the base station 1602 (e.g., via the relay base layer NACK message 1860). The first UE 1604 may transmit the retransmission message 1874 using a resource indicated in a grant provided by the base station 1602 (e.g., via the UE base layer NACK message 1850).

In a second example relay strategy, the second UE 1606 may determine whether to participate in a retransmission of a message (e.g., by transmitting the relay uplink transmission 1872 to the base station 1602) based on a priority of the message for which retransmission may be performed (e.g., the priority associated with the message B). For example, if the priority associated with the message B is greater than or equal to a first priority threshold (e.g., priority>=THR1), the first UE 1604 may transmit the retransmission message 1874 and the second UE 1606 may transmit the relay uplink transmission 1872 to the base station 1602. In some examples, if the priority associated with the message B is less than the first priority threshold and is greater than or equal to a second priority threshold (e.g., THR2<=priority<THR1), the first UE 1604 may transmit the retransmission message 1874, but the second UE 1606 may refrain from transmitting the relay uplink transmission 1872 to the base station 1602. In other examples, if the priority associated with the message B is less than the first priority threshold and greater than or equal to the second priority threshold (e.g., THR2<=priority<THR1), the second UE 1606 may transmit the relay uplink transmission 1872, but the first UE 1604 may refrain from transmitting the retransmission message 1874 to the base station 1602. The second UE 1606 may transmit the relay uplink transmission 1872 using an allocated first common grant provided by the base station 1602 (e.g., via the relay base layer NACK message 1860). The first UE 1604 may transmit the retransmission message 1874 using an allocated second common grant provided by the base station 1602 (e.g., via the UE base layer NACK message 1850).

In a third example relay strategy, the second UE 1606 may participate in the retransmission of the message B when a condition is satisfied. For example, the second UE 1606 may transmit the relay uplink transmission 1872 to the base station 1602 when Equation 2 (reproduced below) is satisfied.

$$\text{UE2ID mod } N \in S \qquad \text{Equation 2:}$$

In some examples, the base station 1602 may use Equation 2 (above) to determine when the second UE 1606 may transmit the relay uplink transmission 1872. By applying Equation 2, the base station 1602 may be able to determine when the relay uplink transmission 1872 received from the second UE 1606 corresponds to a retransmission of the message B.

In a fourth example relay strategy, the first UE 1604 and the second UE 1606 may participate in the retransmission of the message B to the base station 1602 based on independent uplink grants provided by the base station 1602. For example, the base station 1602 may provide the first UE 1604 a first grant (e.g., via the UE base layer NACK message 1850) and may provide the second UE 1606 a second grant (e.g., via the relay base layer NACK message 1860) after determining that the base station 1602 is unable to decode the base layer message (e.g., at 1842). For example, the first grant may configure the first UE 1604 to transmit the retransmission message 1874 at a slot $n+m_1$ for a message (e.g., the message B) that was originally transmit at slot n. In some examples, the first grant received by the first UE 1604 may be an uplink grant (e.g., a conventional uplink grant). The second grant may configure the second UE 1606 to transmit the relay uplink transmission 1872 at a slot $n+m_2$ for the message (e.g., the message B) that was originally transmit at slot n. In some examples, the offsets $m_1$, $m_2$ may be configured (e.g., via RRC signaling) and/or explicitly signaled (e.g., via a MAC-CE or DCI).

In a fifth example relay strategy, the base station 1602 may provide grant-free scheduling to the second UE 1606. For example, the base station 1602 may provide the grant-free scheduling to the second UE 1606 via the UE relay confirmation 1830 and/or the relay base layer NACK message 1860. In some such examples, the grant-free scheduling may be based on decode failures of the base layer message by the base station 1602 (e.g., at 1842). For example, if the base station 1602 indicates a quantity or percentage of decode failures that is greater than a failures threshold (failures>THR), the base station 1602 may request that the second UE 1606 provide assistance to the base station 1602 (e.g., transmit the relay uplink transmission 1872). For example, if the base station 1602 transmits ten decode failures (e.g. NACK messages) in a window (e.g., a 100 millisecond window), the base station 1602 may request the second UE 1602 provide relay assistance to the base station 1602 with respect to the base layer message.

In some examples, the grant-free scheduling may be implemented via a type-1 grant. In some such examples, the base station 1602 may provide the type-1 grant when the decoding failures threshold is reached (e.g., the decoding failures>THR). The base station 1602 may provide the type-1 grant to the second UE 1606 via RRC signaling. In some examples, the type-1 grant may indicate a resource allocation for the second UE 1606 to use when transmitting the relay uplink transmission 1872 for a message received in the latest slot. In some examples, the type-1 grant may request that the second UE 1606 transmit the relay uplink transmission 1872 at a slot n for a base layer message that the base station 1602 received at slot (n−m). In some examples, the base station 1602 may provide the offset m via RRC signaling.

In some examples, the grant-free scheduling may be implemented via a type-2 grant. The type-2 grant may be similar to the type-1 grant, but the base station 1602 may activate or deactivate the grant using a control channel (e.g., PDCCH) transmitted to the second UE 1606. For example, when employing the type-2 grant, the base station 1602 may provide the grant to the second UE 1606 using RRC signaling. The base station 1602 may then activate or deactivate the grant dynamically or as needed.

At 1890, the base station 1602 may obtain the uplink message. For example, the baes station 1602 may combine the relay uplink message 1872 and the retransmission message 1874 to facilitate decoding the base layer message (e.g., the uplink message).

Figure 19:
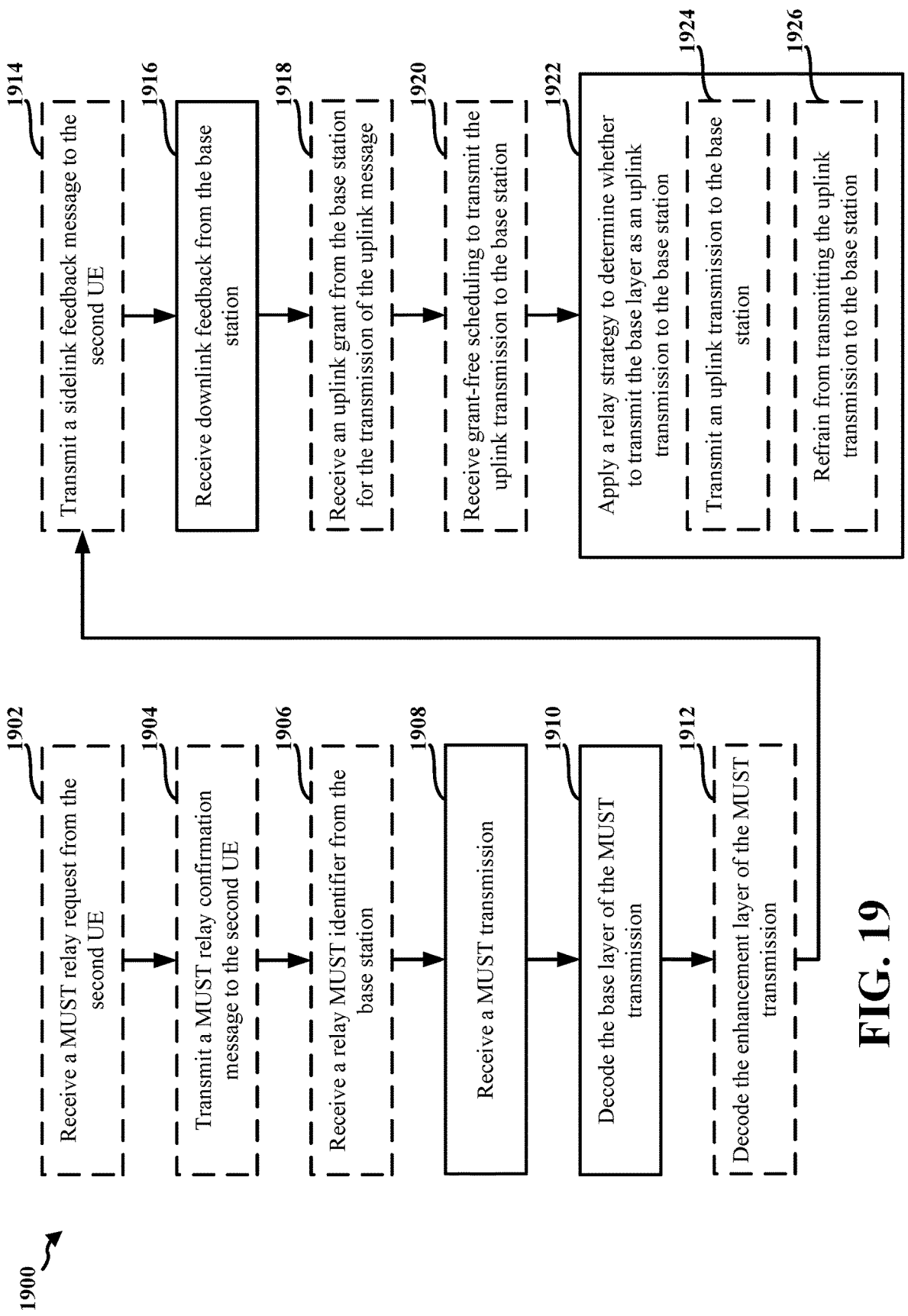
FIG. 19 is a flowchart of a method of wireless communication at a wireless device, in accordance with the teachings disclosed herein.

FIG. 19 is a flowchart 1900 of a method of wireless communication. The method may be performed by a first UE or a component of a first UE (e.g., the UE 104, the wireless communication device 350, the second UE 1606; the apparatus 2102). Optional aspects are illustrated with a dashed line. The method may facilitate improving uplink communications by enabling a sidelink UE to serve as a relay for uplink messages of superposition transmissions.

At 1908, the first UE receives, from a second UE, a MUST transmission including a base layer and an enhancement layer, as described in connection with the MUST transmission 1710 of FIG. 17 and/or the MUST transmission 1840 of FIG. 18. For example, 1908 may be performed by a MUST transmission component 2140 of the apparatus 2102 of FIG. 21. The base layer of the MUST transmission may comprise an uplink message for a base station and the enhancement layer of the MUST transmission may comprise a sidelink message for the first UE.

At 1910, the first UE decodes the base layer of the MUST transmission to obtain the uplink message, as described in connection with 1714 of FIG. 17. For example, 1910 may be performed by a decoding component 2142 of the apparatus 2102 of FIG. 21.

In some examples, at 1912, the first UE may decode the enhancement layer of the MUST transmission to obtain the sidelink message, as described in connection with 1714 of FIG. 17. For example, 1912 may be performed by the decoding component 2142 of the apparatus 2102 of FIG. 21.

In some examples, at 1914, the first UE may transmit a sidelink feedback message to the second UE indicating whether the first UE obtained at least one of the uplink message and the sidelink message, as described in connection with the sidelink feedback message 1730 of FIG. 17. For example, 1914 may be performed by the feedback component 2144 of the apparatus 2102 of FIG. 21. In some examples, the sidelink feedback message may include a first indicator corresponding to decoding of the base layer (e.g., the first bit 1730a of FIG. 17) and a second indicator corresponding to decoding of the enhancement layer (e.g., the second bit 1730b of FIG. 17).

At 1916, the first UE receives downlink feedback from the base station indicating unsuccessful receipt of the base layer, as described in connection with the second base station feedback message 1718 of FIG. 17 and/or the relay base layer NACK message 1860 of FIG. 18. For example, 1916 may be performed by a feedback component 2144 of the apparatus 2102 of FIG. 21. In some examples, the downlink feedback message may include a relay uplink grant.

At 1922, the first UE applies a relay strategy to determine whether to transmit the base layer as an uplink transmission to the base station in response to the feedback from the base station, as described in connection with 1724 of FIGS. 17 and/or 1870 of FIG. 18. For example, 1922 may be performed by a relay handling component 2146 of the apparatus 2102 of FIG. 21.

In some examples, at 1902, the first UE may receive a MUST relay request from the second UE requesting that the first UE serve as a relay for uplink messages of MUST transmissions from the second UE, as described in connection with the MUST relay request 1810 of FIG. 18. For example, 1902 may be performed by a relay setup component 2148 of the apparatus 2102 of FIG. 21.

At 1904, the first UE may transmit a MUST relay confirmation message to the second UE signaling a confirmation of the first UE to serve as a relay for uplink messages of MUST transmissions from the second UE, as described in connection with the MUST relay confirmation 1812 of FIG. 18. For example, 1904 may be performed by the relay setup component 2148 of the apparatus 2102 of FIG. 21.

In some examples, at 1906, the first UE may receive a relay MUST identifier from the base station, as described in connection with the UE relay confirmation 1830 and the relay-MUST-RNTI 1880 of FIG. 18. For example, 1906 may be performed by a relay MUST identifier component 2150 of the apparatus 2102 of FIG. 21. The first UE may receive the downlink feedback from the base station using the relay MUST identifier. In some examples, the relay MUST identifier may be valid for N slots, and where N is an integer number. In some examples, the relay MUST identifier may be valid for N slots after the first UE receives the relay MUST identifier, and where N is an integer number. In some examples, the first UE may receive signaling from the base station to activate or deactivate the relay MUST identifier.

In some examples, at 1918, the first UE may receive an uplink grant from the base station for the transmission of the uplink message to the base station, as described in connection with the second base station feedback message 1718 of FIG. 17 and/or the relay bae station NACK message 1860 of FIG. 18. For example, 1918 may be performed by a grant handling component 1952 of the apparatus 2102 of FIG. 21. In some examples, applying the relay strategy (e.g., at 1922) may include transmitting the uplink transmission including the uplink message to the base station based on the uplink grant. In some examples, the uplink grant may indicate resources that may be used by the first UE to transmit the uplink transmission and for the second UE to transmit a retransmission of the uplink message to the base station. In some examples, at 1924, the first UE may transmit the uplink transmission to the base station using one or more transmission parameters of the MUST transmission based on uplink control information (UCI) of the uplink message. In some examples, the one or more transmission parameters may include a same MCS or a same code rate.

In some examples, the first UE may apply the relay strategy (e.g., at 1922) by determining whether to transmit the uplink transmission to the base station or to refrain from transmitting the uplink transmission to the base station. For example, at 1924, the first UE may transmit the uplink transmission including the uplink message to the base station, as described in connection with 1724 and the relay uplink transmission 1720 of FIG. 17 and and/or 1870 and the relay uplink transmission 1872 of FIG. 18. For example, 1924 may be performed by a retransmission component 2154 of the apparatus 2102 of FIG. 21.

At 1926, the first UE may refrain from transmitting the uplink transmission to the base station, as described in connection with 1724 and the relay uplink transmission 1720 of FIG. 17 and and/or 1870 and the relay uplink transmission 1872 of FIG. 18. For example, 1926 may be performed by the retransmission component 2154 of the apparatus 2102 of FIG. 21.

In some examples, the first UE may transmit (e.g., at 1924) the uplink transmission to the base station if an uplink message priority satisfies a priority threshold. For example, the uplink message priority may satisfy the priority threshold when the uplink message priority is greater than or equal to the priority threshold. The first UE may refrain (e.g., at 1926) from transmitting the uplink transmission to the base station if the uplink message priority does not satisfy the priority threshold. For example, the uplink message priority may not satisfy the priority threshold when the uplink message priority is less than the priority threshold. The first UE may obtain the uplink message priority using the UCI of the uplink message from the base layer of the MUST transmission (e.g., when decoding the base layer of the MUST transmission at 1910).

In some examples, the first UE may transmit (e.g., at 1924) the uplink transmission to the base station if a slot number corresponding to a candidate transmission of the uplink message to the base station satisfies a condition. The first UE may refrain (e.g., at 1926) from transmitting the uplink transmission to the base station if the slot number corresponding to a candidate transmission of the uplink message to the base station does not satisfy the condition. In some examples, the first UE may apply Equation 2 (above) to determine if the slot number corresponding to the candidate transmission of the uplink message satisfies the condition S. In some examples, the first UE may receive a parameter for the condition via at least one of RRC signaling, a MAC-CE, or DCI.

In some examples, the first UE may transmit (e.g., at 1924) the uplink transmission including the uplink message to the base station may be based on an uplink grant of different resources than resources for the second UE to transmit a retransmission of the uplink message to the base station. For example, the first UE may transmit the uplink transmission including the uplink message to the base station at slot (n+m) based on a slot n used to transmit the MUST transmission and an offset m. In some such examples, the first UE may receive the offset m via a UE relay confirmation (e.g., at 1906) or the downlink feedback (e.g., at 1916).

In some examples, 1920, the first UE may receive grant-free scheduling to transmit the uplink transmission including the uplink message to the base station, as described in connection with the second base station feedback message 1718 of FIG. 17, the UE relay confirmation 1830 of FIG. 18, and/or the relay base layer NACK message 1860 of FIG. 18. For example, 1920 may be performed by the grant handling component 2152 of the apparatus 2102 of FIG. 21.

In some examples, the grant-free scheduling may include a resource allocation to transmit the uplink transmission at a slot (n–m) based on a slot n used to transmit the MUST transmission and an offset m. In some such examples, the first UE may receive the offset m via RRC signaling. In some examples, the offset m may be set to zero. In some examples, the grant-free scheduling may include a resource allocation to transmit the uplink transmission to the base station. In some such examples, the first UE may receive a downlink control channel (e.g., PDCCH) from the base station activating or deactivating the resource allocation. The first UE may transmit (e.g., at 1924) the uplink transmission to the base station based on the grant-free scheduling.

Figure 20:
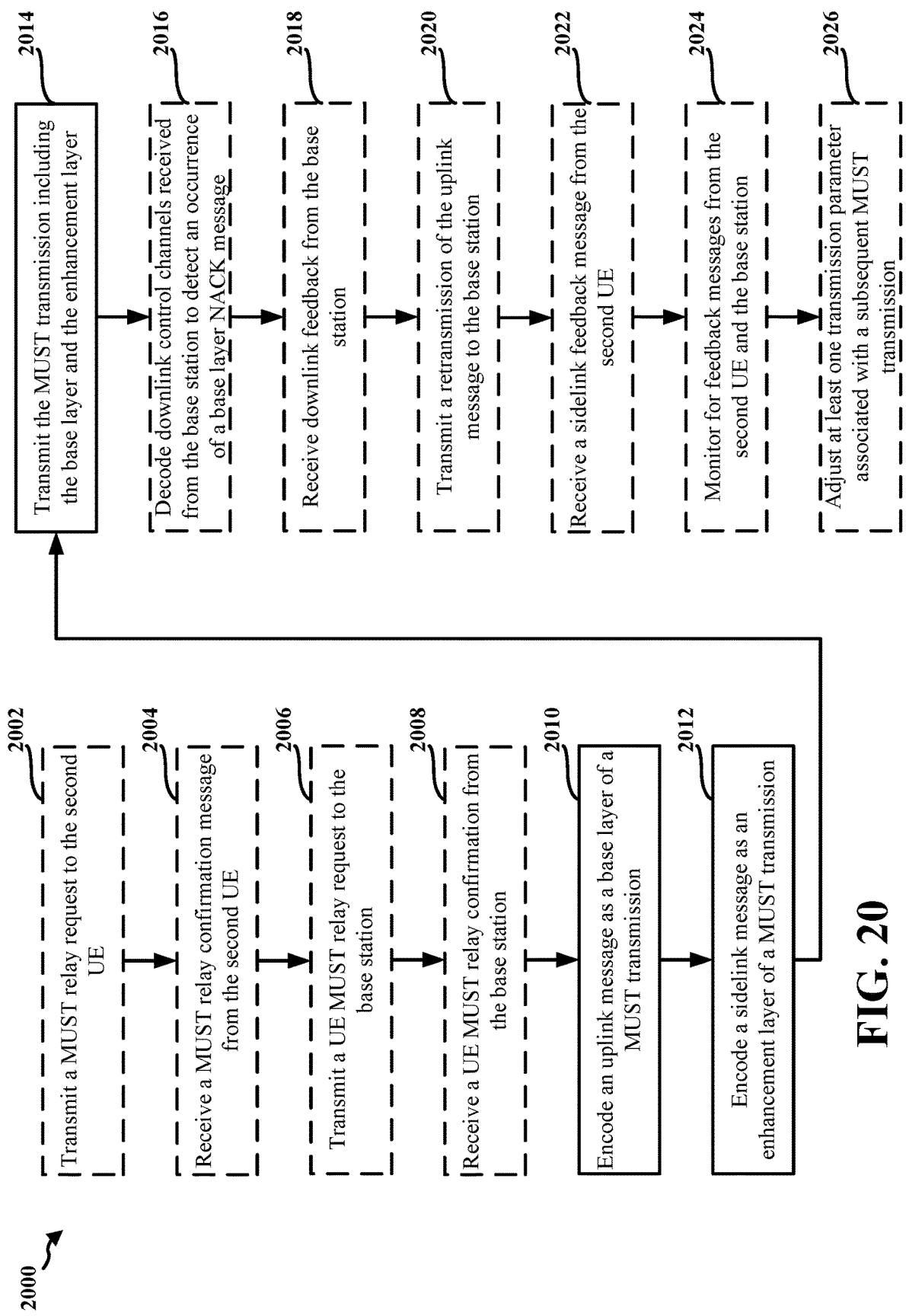
FIG. 20 is a flowchart of a method of wireless communication at a wireless device, in accordance with the teachings disclosed herein.

FIG. 20 is a flowchart 2000 of a method of wireless communication. The method may be performed by a first UE or a component of a first UE (e.g., the UE 104, the wireless communication device 350, the first UE 1604; the apparatus 2102). Optional aspects are illustrated with a dashed line. The method may facilitate improving uplink communications by enabling a sidelink UE to serve as a relay for uplink messages of superposition transmissions.

In some examples, at 2002, the first UE may transmit a MUST relay request to the second UE requesting that the second UE serve as a relay for uplink messages of MUST transmissions from the first UE, as described in connection with the MUST relay request 1810 of FIG. 18. For example, 2002 may be performed by the relay setup component 2148 of the apparatus 2102 of FIG. 21.

At 2004, the first UE may receive a MUST relay confirmation message from the second UE signaling a confirmation of the second UE to serve as a relay for uplink messages of MUST transmissions from the first UE, as described in connection with the MUST relay confirmation 1812 of FIG. 18. For example, 2004 may be performed by the relay setup component 2148 of the apparatus 2102 of FIG. 21.

At 2006, the first UE may transmit a UE MUST relay request to the base station signaling that the second UE is configured to serve as a relay for uplink messages of MUST transmissions from the first UE, as described in connection with the UE MUST relay request 1820 of FIG. 18. For example, 2006 may be performed by the relay setup component 2148 of the apparatus 2102 of FIG. 21.

In some examples, at 2008, the first UE may receive a UE MUST relay confirmation from the base station acknowledging that the second UE is configured to serve as the relay for uplink messages of MUST transmission from the first UE, as described in connection with the UE MUST relay confirmation 1822 of FIG. 18. For example, 2008 may be performed by the relay setup component 2148 of the apparatus 2102 of FIG. 21.

At 2010, the first UE encodes an uplink message for a base station as a base layer of a MUST transmission, as described in connection with 1704 of FIG. 17. For example, 2010 may be performed by an encoding component 2156 of the apparatus 2102 of FIG. 21.

At 2012, the first UE encodes a sidelink message for a second UE as an enhancement layer of the MUST transmission, as described in connection with 1706 of FIG. 17. For example, 2012 may be performed by the encoding component 2156 of the apparatus 2102 of FIG. 21.

At 2014, the first UE transmits the MUST transmission including the base layer and the enhancement layer, as described in connection with the MUST transmission 1710 of FIG. 17 and the MUST transmission 1840 of FIG. 18. For example, 2014 may be performed by the MUST transmission component 2140 of the apparatus 2102 of FIG. 21.

At 2016, the first UE may decode downlink control channels received from the base station to detect an occurrence of a NACK message signaling that the base station did not successfully receive the base layer of the MUST transmission, as described in connection with 1832 of FIG. 18. For example, 2016 may be performed by the decoding component 2142 of the apparatus 2102 of FIG. 21.

At 2018, the first UE may receive downlink feedback from the base station indicating that the base station did not successfully receive the base layer of the MUST transmission, as described in connection with the first base station feedback message 1716 of FIG. 17 and/or the UE base layer NACK message 1850 of FIG. 18. For example, 2018 may be performed by the feedback component 2144 of the apparatus 2102 of FIG. 21.

At 2020, the first UE may transmit a retransmission of the uplink message to the base station in response to the feedback, as described in connection with the retransmission message 1722 of FIG. 17 and/or the retransmission message 1874 of FIG. 18. For example, 2020 may be performed by the retransmission component 2154 of the apparatus 2102 of FIG. 21.

In some examples, the first UE may transmit the retransmission of the uplink message to the base station at a slot (n+m) based on a slot n used to transmit the MUST transmission and an offset m. In some such examples, the first UE may receive the offset m via the UE MUST relay confirmation from the base station (e.g., at 2008) or the downlink feedback (e.g., at 2018).

In some examples, at 2022, the first UE may receive a sidelink feedback message from the second UE indicating whether the second UE obtained at least one of the uplink message and the sidelink message, as described in connection with the sidelink feedback message 1730 of FIG. 17. For example, 2022 may be performed by the feedback component 2144 of the apparatus 2102 of FIG. 21. In some examples, the sidelink feedback message may include a first indicator corresponding to decoding of the base layer (e.g., the first bit 1730*a* of FIG. 17) and a second indicator corresponding to decoding of the enhancement layer (e.g., the second bit 1730*b* of FIG. 17).

In some examples, at 2024, the first UE may monitor for feedback messages from the second UE and the base station during a monitoring window, as described in connection with 1740 of FIG. 17. For example, 2024 may be performed by a monitoring component 2158 of the apparatus 2102 of FIG. 21.

At 2026, the first UE may adjust at least one transmission parameter associated with a subsequent MUST transmission based on at least one feedback message received during the monitoring window, as described in connection with 1742 of FIG. 17. For example, 2026 may be performed by an adjustment component 2160 of the apparatus 2102 of FIG. 21.

For example, in some examples, the at least one feedback message received during the monitoring window (e.g., at 2024) may include a threshold quantity of one or more base layer NACK messages indicating successful receipt of the base layer. In some such examples, the first UE may adjust (e.g., at 2026) the at least one transmission parameter associated with the subsequent MUST transmission by decreasing a base layer code rate or modulation associated with the subsequent MUST transmission, and/or increasing a base layer power allocation associated with the subsequent MUST transmission.

In some examples, the at least one feedback message received during the monitoring window (e.g., at 2024) may include a threshold quantity of one or more base layer ACK messages indicating successful receipt of the base layer and a threshold quantity of one or more enhancement layer NACK messages indicating unsuccessful receipt of the enhancement layer. In some such examples, the first UE may adjust (e.g., at 2026) the at least one transmission parameter associated with the subsequent MUST transmission by increasing a base layer code rate or modulation associated with the subsequent MUST transmission, decreasing a base layer power allocation associated with the subsequent MUST transmission, decreasing an enhancement layer code rate or modulation associated with the subsequent MUST transmission, and/or increasing an enhancement layer power allocation associated with the subsequent MUST transmission.

In some examples, the at least one feedback message received during the monitoring window (e.g., at 2024) may include a threshold quantity of one or more base layer ACK messages indicating successful receipt of the base layer and a threshold quantity of one or more enhancement layer ACK messages indicating successful receipt of the enhancement layer. In some such examples, the first UE may adjust (e.g., at 2026) the at least one transmission parameter associated with the subsequent MUST transmission by increasing a base layer code rate or modulation associated with the subsequent MUST transmission, decreasing a base layer power allocation associated with the subsequent MUST transmission, increasing an enhancement layer code rate or modulation associated with the subsequent MUST transmission, and/or decreasing an enhancement layer power allocation associated with the subsequent MUST transmission.

Figure 21:
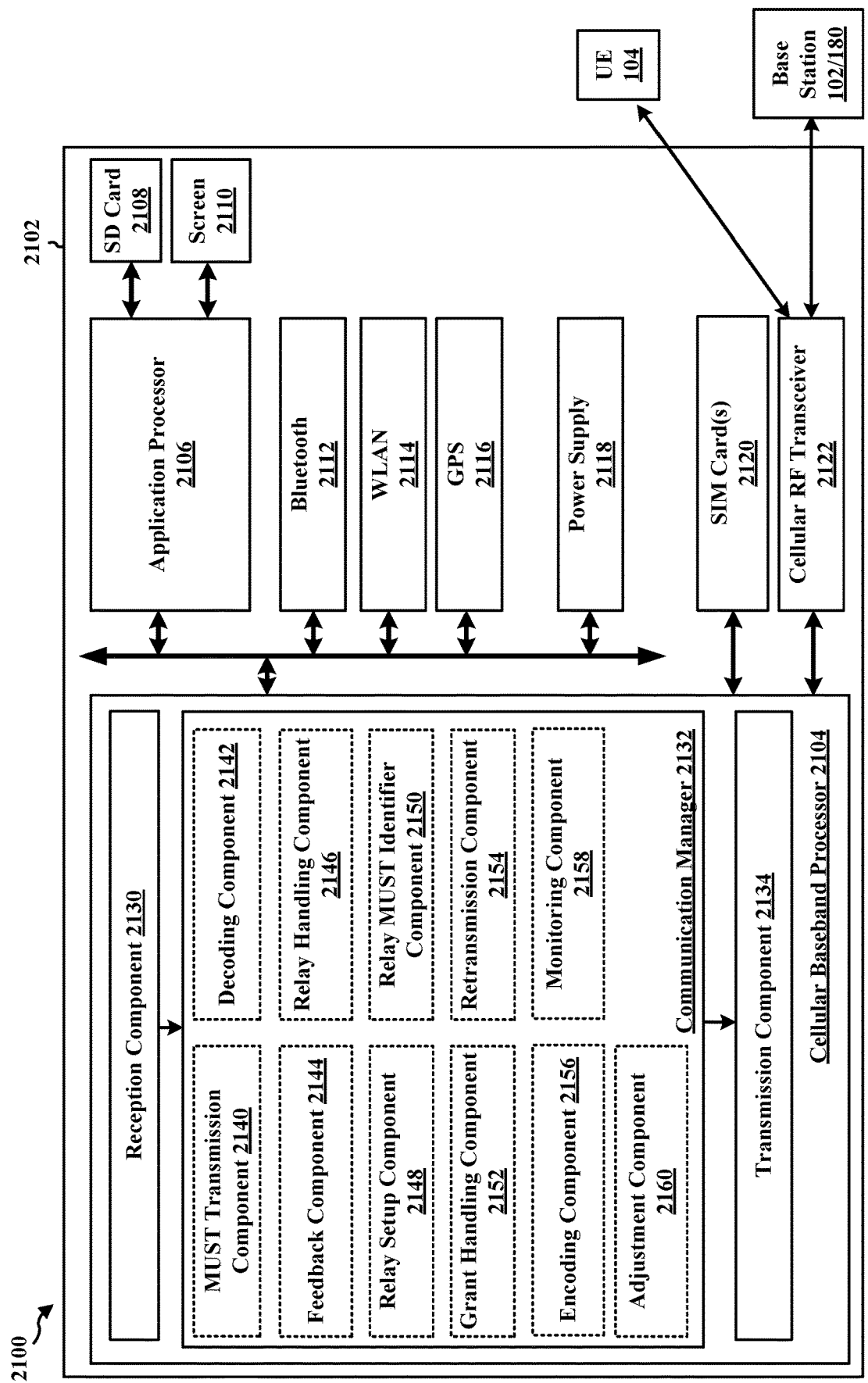
FIG. 21 is a diagram illustrating an example of a hardware implementation for an example apparatus, in accordance with the teachings disclosed herein.

FIG. 21 is a diagram 2100 illustrating an example of a hardware implementation for an apparatus 2102. The apparatus 2102 is a wireless device and includes a cellular baseband processor 2104 (also referred to as a modem) coupled to a cellular RF transceiver 2122 and one or more subscriber identity modules (SIM) cards 2120, an application processor 2106 coupled to a secure digital (SD) card 2108 and a screen 2110, a Bluetooth module 2112, a wireless local area network (WLAN) module 2114, a Global Positioning System (GPS) module 2116, and a power supply 2118. The cellular baseband processor 2104 communicates through the cellular RF transceiver 2122 with the UE 104 and/or base station 102/180. The cellular baseband processor 2104 may include a computer-readable medium/memory. The computer-readable medium/memory may be non-transitory. The cellular baseband processor 2104 is responsible for general processing, including the execution of software stored on the computer-readable medium/memory. The software, when executed by the cellular baseband processor 2104, causes the cellular baseband processor 2104 to perform the various functions described supra. The computer-readable medium/memory may also be used for storing data that is manipulated by the cellular baseband processor 2104 when executing software. The cellular baseband processor 2104 further includes a reception component 2130, a communication manager 2132, and a transmission component 2134. The communication manager 2132 includes the one or more illustrated components. The components within the communication manager 2132 may be stored in the computer-readable medium/memory and/or configured as hardware within the cellular baseband processor 2104. The cellular baseband processor 2104 may be a component of the first wireless communication device 310 and may include the memory 376 and/or at least one of the TX processor 316, the RX processor 370, and the controller/processor 375. In one configuration, the apparatus 2102 may be a modem chip and include just the baseband processor 2104, and in another configuration, the apparatus 2102 may be the entire wireless device (e.g., see the first wireless communication device 310 of FIG. 3) and include the additional modules of the apparatus 2102.

The communication manager 2132 includes a MUST transmission component 2140 that is configured to receive a MUST transmission, for example, as described in connection with 1908 of FIG. 19, and/or may be configured to transmit a MUST transmission including a base layer and an enhancement layer, for example, as described in connection with 2014 of FIG. 20. The communication manager 2132 also includes a decoding component 2142 that is configured to decode the base layer of the MUST transmission and/or decode the enhancement layer of the MUST transmission, for example, as described in connection with 1910 and 1912 of FIG. 19, and/or may be configured to decode downlink control channels received from the base station to detect an occurrence of a base layer NACK message, for example, as described in connection with 2016 of FIG. 20. The communication manager 2132 also includes a feedback component 2144 that is configured to receive downlink feedback from the base station and/or transmit a sidelink feedback message to the second UE, for example, as described in connection with 1916 and/or 1914 of FIG. 19, and/or may be configured to receive downlink feedback from the base station and/or receive a sidelink feedback message from the second UE, for example, as described in connection with 2018 and 2022 of FIG. 20. The communication manager 2132 also includes a relay handling component 2146 that is configured to apply a relay strategy to determine whether to transmit the base layer as an uplink transmission to the base station, for example, as described in connection with 1922 of FIG. 19. The communication manager 2132 also includes a relay setup component 2148 that is configured to receive a MUST relay request from the second UE and transmit a MUST relay confirmation message to the second UE, for example, as described in connection with 1902 and 1904 of FIG. 19, and/or may be configured to transmit a MUST relay request to the second UE, receive a MUST relay confirmation message from the second UE, transmit a UE MUST relay request to the base station, and/or receive a UE MUST relay confirmation from the base station, for example, as described in connection with 2002, 2004, 2006, and 2008 of FIG. 20. The communication manager 2132 also includes a relay MUST identifier component 2150 that is configured to receive a relay MUST identifier from the base station, for example, as described in connection with 1906 of FIG. 19. The communication manager 2132 also includes a grant handling component 2152 that is configured to receive an uplink grant from the base station for the transmission of the uplink message and/or receive grant-free scheduling to transmit the uplink transmission to the base station, for example, as described in connection with 1918 and/or 1920 of FIG. 19. The communication manager 2132 also includes a retransmission component 2154 that is configured to transmit an uplink transmission to the base station or refrain from transmitting the uplink transmission to the base station, for example, as described in connection with 1924 and 1926 of FIG. 19, and/or may be configured to transmit a retransmission of the uplink message to the base station, for example, as described in connection with 2020 of FIG. 20. The communication manager 2132 also includes an encoding component 2156 that is configured to encode an uplink message as a base layer of a MUST transmission and encode a sidelink message as an enhancement layer of a MUST transmission, for example, as described in connection with 2010 and 2012 of FIG. 20. The communication manager 2132 also includes a monitoring component 2158 that is configured to monitor for feedback messages from the second UE and the base station, for example, as described in connection with 2024 of FIG. 20. The communication manager 2132 also includes an adjustment component 2160 that is configured to adjust at least one transmission parameter associated with a subsequent MUST transmission, for example, as described in connection with 2026 of FIG. 20.

The apparatus may include additional components that perform each of the blocks of the algorithm in the aforementioned flowcharts of FIGS. 19 and/or 20. As such, each block in the aforementioned flowcharts of FIGS. 19 and/or 20 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2102, and in particular the cellular baseband processor 2104, includes means for receiving, from a second UE, a MUST transmission including a base layer and an enhancement layer, the base layer comprising an uplink message for a base station and the enhancement layer comprising a sidelink message for the first UE. The example apparatus 2102 also includes means for decoding the base layer of the MUST transmission to obtain the uplink message. The example apparatus 2102 also includes means for receiving downlink feedback from the base station indicating unsuccessful receipt of the base layer. The example apparatus 2102 also includes means for applying a relay strategy to determine whether to transmit the base layer as an uplink transmission to the base station in response to the feedback from the base station. The example apparatus 2102 also includes means for decoding the enhancement layer to obtain the sidelink message. The example apparatus 2102 also includes means for receiving a MUST relay request from the second UE requesting that the first UE serve as a relay for uplink messages of MUST transmissions from the second UE. The example apparatus 2102 also includes means for transmitting a MUST relay confirmation message to the second UE signaling a confirmation of the first UE to serve as a relay for uplink messages of MUST transmissions from the second UE. The example apparatus 2102 also includes means for receiving a relay MUST identifier from the base station, wherein the first UE receives the downlink feedback from the base station using the relay MUST identifier. The example apparatus 2102 also includes means for receiving an uplink grant from the base station for the transmission of the uplink message to the base station, wherein applying the relay strategy includes transmitting the uplink transmission including the uplink message to the base station based on the uplink grant. The example apparatus 2102 also includes means for applying the relay strategy including: transmitting the uplink transmission including the uplink message to the base station if an uplink message priority satisfies a priority threshold, and refraining from transmitting the uplink transmission to the base station if the uplink message priority does not satisfy the priority threshold. The example apparatus 2102 also includes means for applying the relay strategy including: transmitting the uplink transmission including the uplink message to the base station if a slot number corresponding to a candidate transmission of the uplink message to the base station satisfies a condition; and refraining from transmitting the uplink transmission including the uplink message to the base station if the slot number corresponding to a candidate transmission of the uplink message to the base station does not satisfy the condition. The example apparatus 2102 also includes means for transmitting the uplink transmission including the uplink message to the base station based on an uplink grant of different resources than resources from the second UE to transmit a retransmission of the uplink message to the base station. The example apparatus 2102 also includes means for encoding an uplink message for a base station as a base layer of a MUST transmission. The example apparatus 2102 also includes means for encoding a sidelink message for a second UE as an enhancement layer of the MUST transmission. The example apparatus 2102 also includes means for transmitting the MUST transmission including the base layer and the enhancement layer. The example apparatus 2102 also includes means for transmitting a MUST relay request to the second UE requesting that the second UE serve as a relay for uplink messages of MUST transmissions from the first UE. The example apparatus 2102 also includes means for receiving a MUST relay confirmation message from the second UE signaling a confirmation of the second UE to serve as a relay for uplink messages of MUST transmissions from the first UE. The example apparatus 2102 also includes means for transmitting a UE MUST relay request to the base station signaling that the second UE is configured to serve as a relay for uplink messages of MUST transmissions from the first UE. The example apparatus 2102 also includes means for monitoring for feedback messages from the second UE and the base station during a monitoring window. The example apparatus 2102 also includes means for adjusting at least one transmission parameter associated with a subsequent MUST transmission based on at least one feedback message received during the monitoring window. The example apparatus 2102 also includes means for adjusting at least one transmission parameter associated with the subsequent MUST transmission including one or more of: decreasing a base layer code rate or modulation associated with the subsequent MUST transmission, or increasing a base layer power allocation associated with the subsequent MUST transmission. The example apparatus 2102 also includes means for adjusting at least one transmission parameter associated with the subsequent MUST transmission including one or more of: increasing a base layer code rate or modulation associated with the subsequent MUST transmission, decreasing a base layer power allocation associated with the subsequent MUST transmission, decreasing an enhancement layer code rate or modulation associated with the subsequent MUST transmission, or increasing an enhancement layer power allocation associated with the subsequent MUST transmission. The example apparatus 2102 also includes means for adjusting at least one transmission parameter associated with the subsequent MUST transmission including one or more of: increasing a base layer code rate or modulation associated with the subsequent MUST transmission, decreasing a base layer power allocation associated with the subsequent MUST transmission, increasing an enhancement layer code rate or modulation associated with the subsequent MUST transmission, or decreasing an enhancement layer power allocation associated with the subsequent MUST transmission.

The aforementioned means may be one or more of the aforementioned components of the apparatus 2102 configured to perform the functions recited by the aforementioned means. As described supra, the apparatus 2102 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Figure 22:
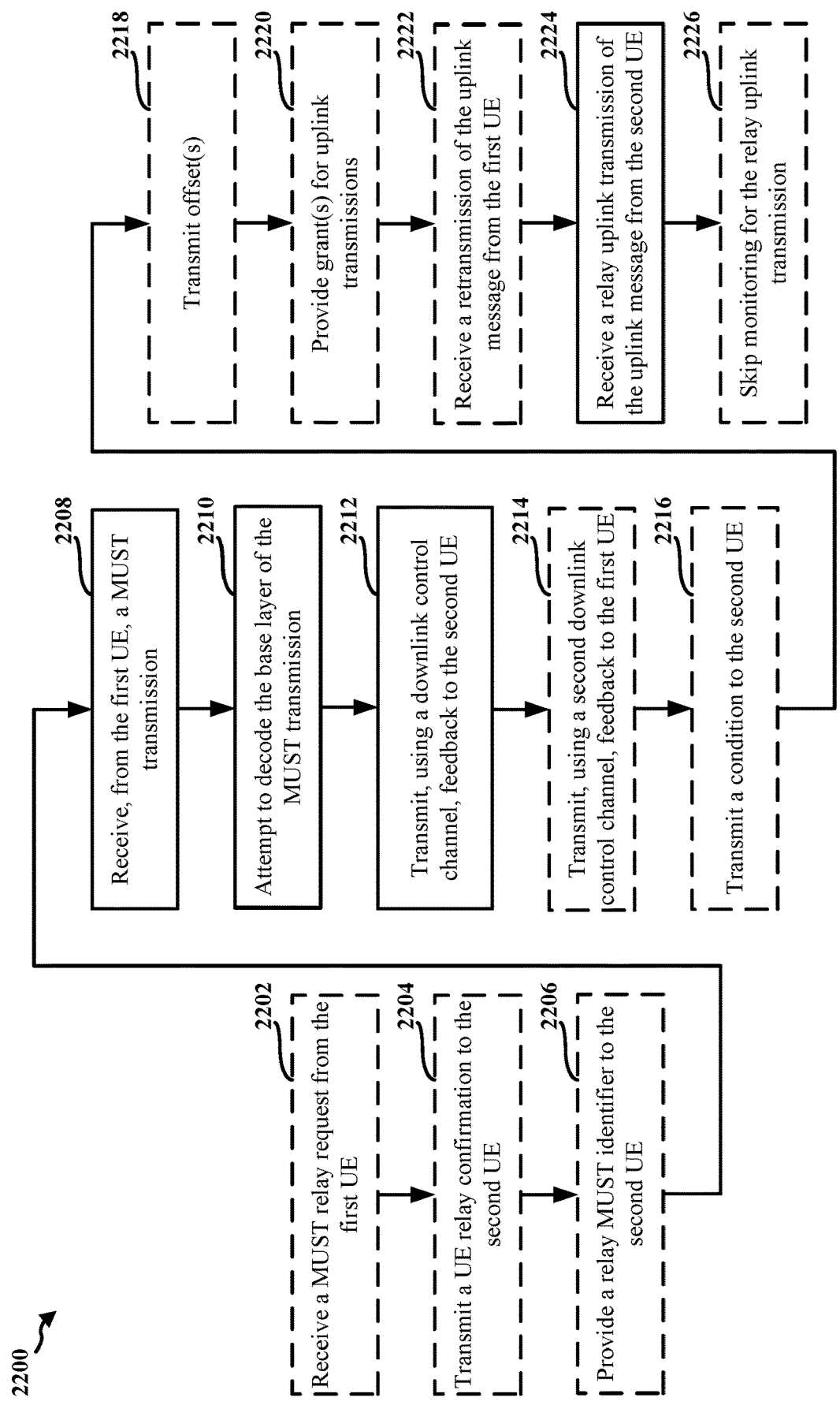
FIG. 22 is a flowchart of a method of wireless communication at a base station, in accordance with the teachings disclosed herein.

FIG. 22 is a flowchart 2200 of a method of wireless communication. The method may be performed by a UE or a component of a UE (e.g., the UE 104, the wireless communication device 310, the base station 1602; the apparatus 2302). Optional aspects are illustrated with a dashed line. The method may facilitate improving uplink communications by enabling a sidelink UE to serve as a relay for uplink messages of superposition transmissions.

In some examples, at 2202, the base station may receive a MUST relay request from the first UE signaling that the second UE is configured to serve as a relay of uplink messages for MUST transmissions generated by the first UE, as described in connection with the UE MUST relay request 1820 of FIG. 18. For example, 2202 may be performed by a relay setup component 2350 of the apparatus 2302 of FIG. 23.

At 2204, the base station may transmit a UE relay confirmation to the second UE, as described in connection with the UE relay confirmation 1830 of FIG. 18. For example, 2204 may be performed by the relay setup component 2250 of the apparatus 2302 of FIG. 23. The UE relay confirmation may include a relay MUST identifier to facilitate decoding downlink control channels transmitted by the base station to detect downlink feedback associated with a MUST transmission. For example, at 2206, the base station may provide a relay MUST identifier to the second UE, as described in connection with the UE relay confirmation 1830 and the relay-MUST-RNTI 1880 of FIG. 18. For example, 2206 may be performed by a relay MUST identifier component 2348 of the apparatus 2302 of FIG. 23. In some examples, the base station may encode a NACK comprised in the feedback using the relay MUST identifier, as described in connection with 1844 of FIG. 18.

In some examples, the base station may transmit a confirmation to the first UE acknowledging that the second UE is configured to serve as the relay for uplink messages of MUST transmission generated by the first UE, as described in connection with the UE MUST relay confirmation 1822 of FIG. 18.

In some examples, the relay MUST identifier may be valid for N slots, and where N is an integer number. In some examples, the relay MUST identifier may be valid for N slots after the second UE receives the relay MUST identifier, and where N is an integer number. In some examples, the base station may transmit signaling to the second UE to activate or deactivate the relay MUST identifier.

At 2208, the base station receives, from the first UE, a MUST transmission including a base layer and an enhancement layer, as described in connection with the MUST transmission 1710 of FIG. 17 and/or the MUST transmission 1840 of FIG. 18. For example, 2208 may be performed by a MUST transmission component 2340 of the apparatus 2302 of FIG. 23. The base layer of the MUST transmission may comprise an uplink message for the base station and the enhancement layer of the MUST transmission may comprise a sidelink message for the second UE.

At 2210, the base station attempts to decode the base layer of the MUST transmission to obtain the uplink message, as described in connection with 1712 of FIGS. 17 and/or 1842 of FIG. 18. For example, 2210 may be performed by a decoding component 2342 of the apparatus 2302 of FIG. 23.

At 2212, the base station transmits feedback indicating that the base station did not successfully decode the base layer, as described in connection with the second base station feedback message 1718 of FIG. 17 and/or the relay base layer NACK message 1860 of FIG. 18. For example, 2212 may be performed by a feedback component 2344 of the apparatus 2302 of FIG. 23. The base station may transmit the feedback to the second UE using a downlink control channel (e.g., a PDCCH).

In some examples, at 2214, the base station may transmit, using a second downlink control channel, an additional feedback message to the first UE indicating that the base station did not successfully receive the base layer, as described in connection with first base station feedback message 1716 of FIG. 17 and/or the UE base layer NACK message 1850 of FIG. 18. For example, 2214 may be performed by the feedback component 2344 of the apparatus 2302 of FIG. 23.

In some examples, at 2222, the base station may receive a retransmission of the uplink message from the first UE, as described in connection with the transmission message 1722 of FIG. 17 and/or the retransmission message 1874 of FIG. 18. For example, 2222 may be performed by a retransmission component 2346 of the apparatus 2302 of FIG. 23.

At 2224, the base station receives a relay uplink transmission of the uplink message from the second UE in response to the feedback, as described in connection with the relay uplink transmission 1720 of FIG. 17 and/or the relay uplink transmission 1872 of FIG. 18. For example, 2224 may be performed by the retransmission component 2346 of the apparatus 2302 of FIG. 23.

In some examples, the base station may receive the relay uplink transmission of the uplink message from the second UE (e.g., at 2224) and the retransmission of the uplink message from the first UE (e.g., at 2222) at a same time slot, as described in connection with a first relay strategy (e.g., the relay strategy 1724 of FIG. 17 and/or the relay strategy 1870 of FIG. 18). In some such examples, the base station may combine the relay uplink transmission of the uplink message from the second UE and the retransmission of the uplink message from the first UE to obtain the uplink message, as described in connection with 1890 of FIG. 18.

In some examples, the base station may determine an uplink message priority based on UCI of the uplink message. In some such examples, the base station may receive (e.g., at 2224) the relay uplink transmission of the uplink message from the second UE when the uplink message priority satisfies a priority threshold. In some examples, the base station may skip, at 2226, monitoring for the relay uplink transmission when the uplink message priority does not satisfy the priority threshold. For example, 2226 may be performed by the retransmission component 2346 of the apparatus 2302 of FIG. 23. The base station may determine the uplink message priority as described in connection with a second relay strategy (e.g., the relay strategy 1724 of FIG. 17 and/or the relay strategy 1870 of FIG. 18).

In some examples, at 2216, the base station may transmit a condition to the second UE for transmitting the relay uplink transmission, as described in connection with a third relay strategy (e.g., the relay strategy 1724 of FIG. 17 and/or the relay strategy 1870 of FIG. 18). For example, 2216 may be performed by a condition component 2356 of the apparatus 2302 of FIG. 23.

For example, the base station may receive (e.g., at 2224) the relay uplink transmission of the uplink message from the second UE when a slot number corresponding to a candidate transmission of the uplink message satisfies the condition. The base station may skip monitoring (e.g., at 2226) for the relay uplink transmission when the slot number corresponding to the candidate transmission of the uplink message does not satisfy the condition. In some examples, the base station may apply Equation 2 (above) to determine if the slot number corresponding to the candidate transmission of the uplink message satisfies the condition S. In some examples, the base station may transmit the parameter for the condition S via at least one of RRC signaling, a MAC-CE, or DCI.

In some examples, at 2218, the base station may transmit offset(s) to the first UE and/or the second UE, as described in connection with the fourth relay strategy (e.g., the relay strategy 1724 of FIG. 17 and/or the relay strategy 1870 of FIG. 18). For example, 2218 may be performed by an offset component 2352 of the apparatus 2302 of FIG. 23.

In some examples, the base station may transmit a first offset $m_1$ to the first UE and a second offset $m_2$ to the second UE. In some such examples, the base station may receive (e.g., at 2222) a retransmission of the uplink message from the first UE at a slot (n+$m_1$) based on a slot n used to transmit the MUST transmission and the offset $m_1$. The base station may also receive (e.g., at 2224) the relay uplink transmission of the uplink message from the second UE at a slot (n+$m_2$) based on the slot n and the offset $m_2$.

In some examples, at 2220, the base station may provide grant-free scheduling to the second UE to transmit the relay uplink transmission including the uplink message to the base station when decode failures satisfy a failure threshold, as described in connection with the fifth relay strategy (e.g., the relay strategy 1724 of FIG. 17 and/or the relay strategy 1870 of FIG. 18). For example, 2220 may be performed by a grants component 2354 of the apparatus 2302 of FIG. 23. In some examples, a decode failure may occur when the base station signals unsuccessful receipt of the base layer (e.g., via the relay base layer NACK message 1860 of FIG. 18).

In some examples, the failure threshold may be based on a quantity of decode failures, a rate of decode failures, or a percentage of decode failures. In some examples, the grant-free scheduling may include a resource allocation for the second UE to transmit the relay uplink transmission at a slot (n−m) based on a slot n used to transmit the MUST transmission and an offset m. The base station may transmit the offset m via radio resource control (RRC) signaling. In some examples, the offset m may be set to zero.

In some examples, the grant-free scheduling may include a resource allocation to transmit the relay uplink transmission to the base station. In some such examples, the base station may transmit a downlink control channel to the second UE activating or deactivating the resource allocation.

Figure 23:
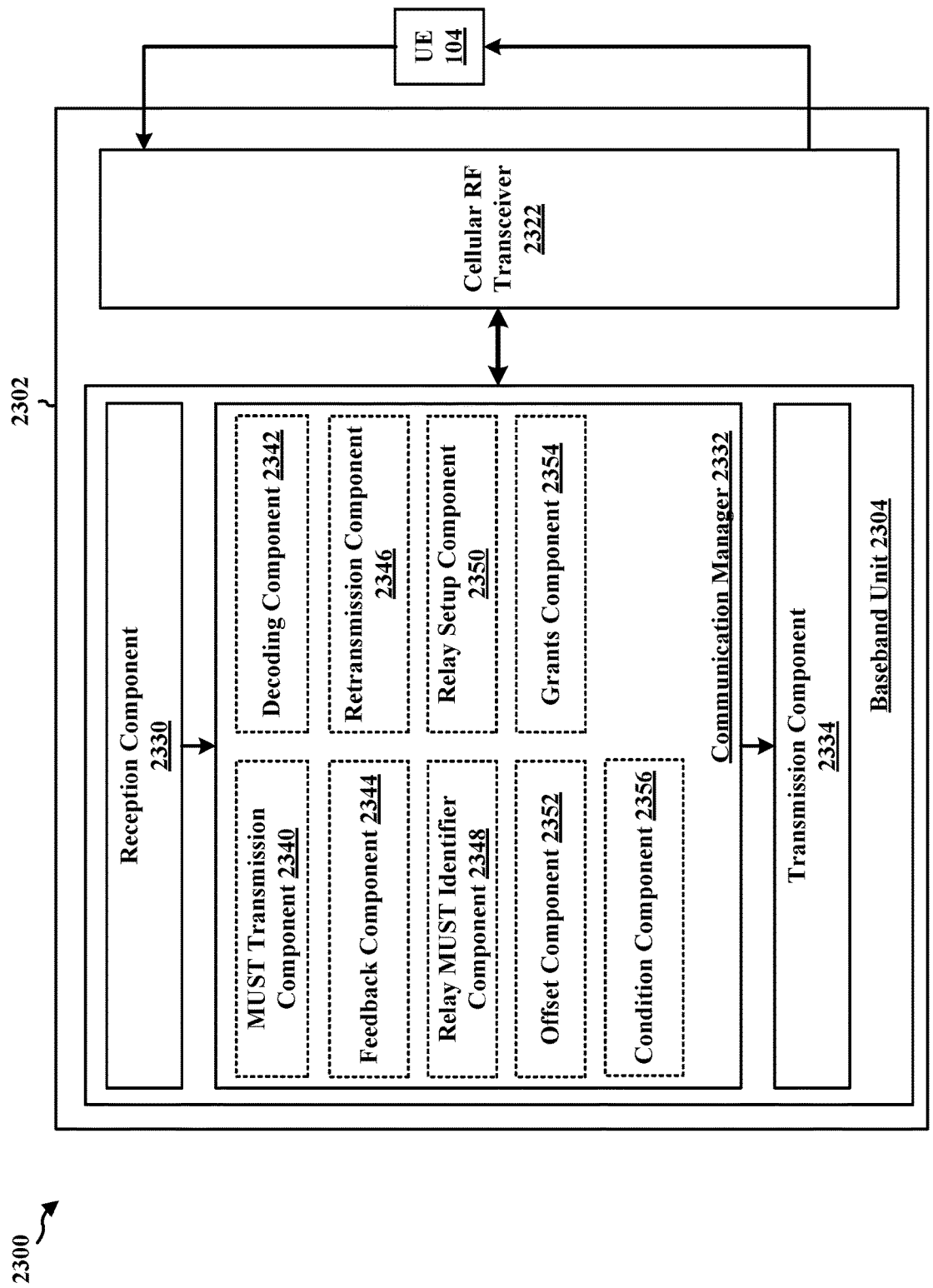
FIG. 23 is a diagram illustrating an example of a hardware implementation for an example apparatus, in accordance with the teachings disclosed herein.

FIG. 23 is a diagram 2300 illustrating an example of a hardware implementation for an apparatus 2302. The apparatus 2302 is a wireless communication device and includes a baseband unit 2304. The baseband unit 2304 may communicate through a cellular RF transceiver 2322 with the UE 104. The baseband unit 2304 may include a computer-readable medium/memory. The baseband unit 2304 is responsible for general processing, including the execution of software stored on the computer-readable medium/memory. The software, when executed by the baseband unit 2304, causes the baseband unit 2304 to perform the various functions described supra. The computer-readable medium/memory may also be used for storing data that is manipulated by the baseband unit 2304 when executing software. The baseband unit 2304 further includes a reception component 2330, a communication manager 2332, and a transmission component 2334. The communication manager 2332 includes the one or more illustrated components. The components within the communication manager 2332 may be stored in the computer-readable medium/memory and/or configured as hardware within the baseband unit 2304. The baseband unit 2304 may be a component of the first communication device 310 and may include the memory 376 and/or at least one of the TX processor 316, the RX processor 370, and the controller/processor 375.

The communication manager 2332 includes a MUST transmission component 2340 that is configured to receive, from the first UE, a MUST transmission, for example, as described in connection with 2208 of FIG. 22. The communication manager 2332 also includes a decoding component 2342 that is configured to attempt to decode the base layer of the MUST transmission, for example, as described in connection with 2210 of FIG. 22. The communication manager 2332 also includes a feedback component 2344 that is configured to transmit, using a downlink control channel, feedback to the second UE and/or transmit, using a second downlink control channel, feedback to the first UE, for example, as described in connection with 2212 and 2214 of FIG. 22. The communication manager 2332 also includes a retransmission component 2346 that is configured to receive a retransmission of the uplink message from the first UE, receive a relay uplink transmission of the uplink message from the second UE, and/or skip monitoring for the relay uplink message, for example, as described in connection with 2222, 2224, and 2226 of FIG. 22. The communication manager 2332 also includes a relay MUST identifier component 2348 that is configured to provide a relay MUST identifier to the second UE, for example, as described in connection with 2206 of FIG. 22.

The communication manager 2332 also includes a relay setup component 2350 that is configured to receive a MUST relay request from the first UE and transmit a UE relay confirmation to the second UE, for example, as described in connection with 2202 and 2204 of FIG. 22. The communication manager 2332 also includes an offset component 2352 that is configured to transmit offset(s) to the first UE and/or the second UE, for example, as described in connection with 2218 of FIG. 22. The communication manager 2332 also includes a grants component 2354 that is configured to provide grant(s) for uplink transmission, for example, as described in connection with 2220 of FIG. 22. The communication manager 2332 also includes a condition component 2356 that is configured to transmit a condition to the second UE, for example, as described in connection with 2216 of FIG. 22.

The apparatus may include additional components that perform each of the blocks of the algorithm in the aforementioned flowchart of FIG. 22. As such, each block in the aforementioned flowchart of FIG. 22 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2302, and in particular the baseband unit 2304, includes means for receiving, from the first UE, a MUST transmission including a base layer and an enhancement layer, the base layer comprising an uplink message for the base station and the enhancement layer comprising a sidelink message for a second UE. The example apparatus 2302 also includes means for attempting to decode the base layer of the MUST transmission to obtain the uplink message. The example apparatus 2302 also includes means for transmitting, using a downlink control channel, feedback indicating that the base station did not successfully decode the base layer. The example apparatus 2302 also includes means for receiving a relay uplink transmission of the uplink message from the second UE in response to the feedback. The example apparatus 2302 also includes means for providing a relay MUST identifier to the second UE, wherein the base station encodes a NACK comprised in the feedback using the relay MUST identifier. The example apparatus 2302 also includes means for receiving a MUST relay request from the first UE signaling that the second UE is configured to serve as a relay of uplink messages for MUST transmissions generated by the first UE. The example apparatus 2302 also includes means for transmitting a UE relay confirmation to the second UE, the UE relay confirmation including a relay MUST identifier to facilitate decoding downlink control channels transmitted by the base station to detect downlink feedback associated with a MUST transmission.

The aforementioned means may be one or more of the aforementioned components of the apparatus 2302 configured to perform the functions recited by the aforementioned means. As described supra, the apparatus 2302 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Figure 24:
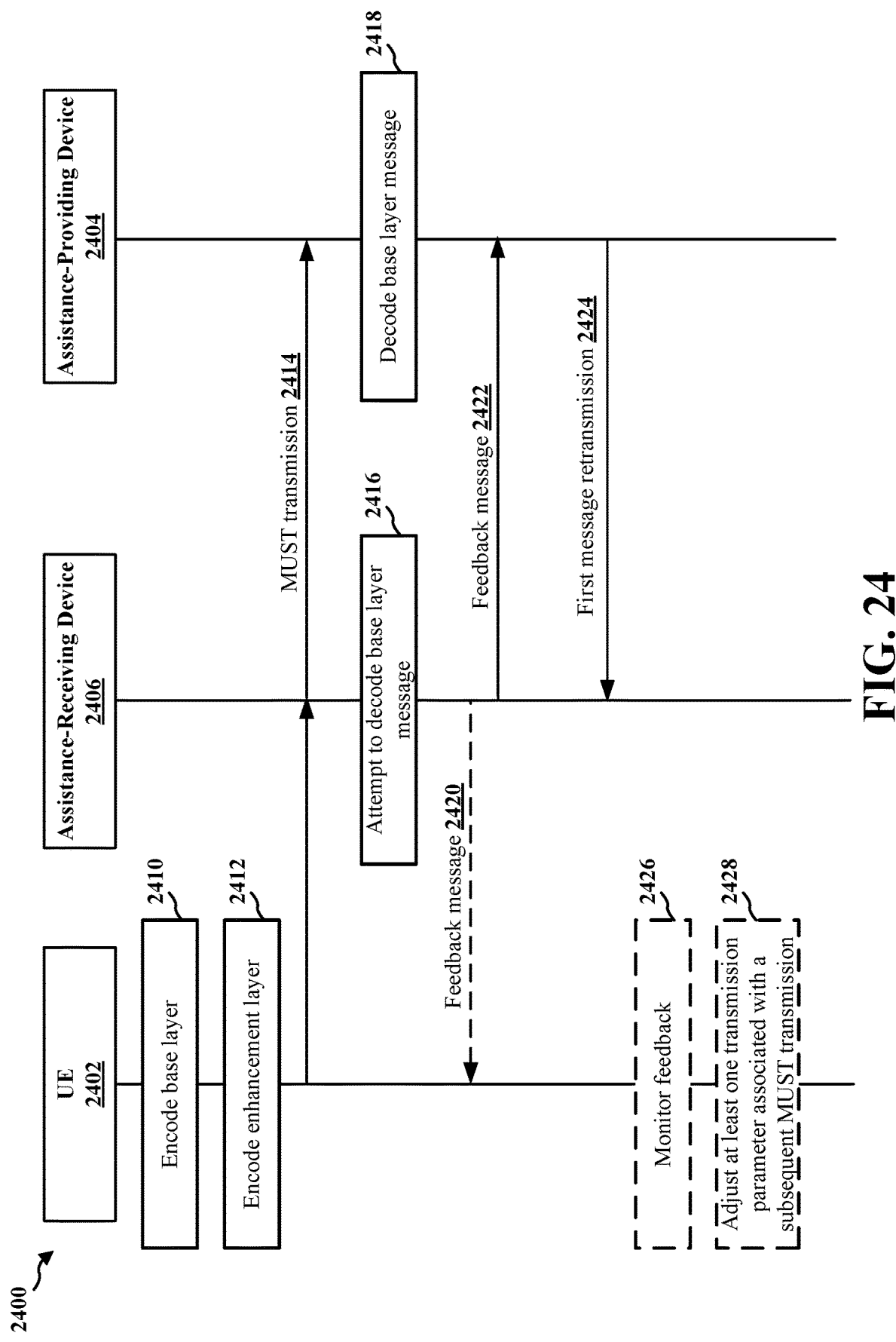
FIG. 24 illustrates an example communication flow between a UE, an assistance-providing device, and an assistance-receiving device, in accordance with the teachings disclosed herein.

Superposition Transmission of Sidelink and Uplink with a Communication Device as Relay FIG. 24 illustrates an example communication flow 2400 between a UE 2402, an assistance-providing device 2404, and an assistance-receiving device 2606, as presented herein. In the illustrated example, the communication flow 2400 facilitates the UE 2402 transmitting a MUST transmission comprising a first message and a second message, and the assistance-providing device 2404 acting as a relay for the first message to the assistance-receiving device 2406 of the MUST transmission. Aspects of the UE 2402 may be implemented by the first UE 704 of FIGS. 7 to 9 and/or the first UE 1604 of FIGS. 16 to 18. Aspects of the assistance-providing device 2404 may be implemented by the base station 702 of FIGS. 7 to 9 and/or the second UE 1606 of FIGS. 16 to 18. Aspects of the assistance-receiving device 2406 may be implemented by the second UE 706 of FIGS. 7 to 9 and/or the base station 1602 of FIGS. 16 to 18.

At 2410, the UE 2402 encodes a first message as a base layer of a MUST transmission.

At 2412, the UE 2402 encodes a second message as an enhancement layer of the MUST transmission.

In the illustrated example, the UE 2402 transmits a MUST transmission 2414 that is received by the assistance-receiving device 2406 and the assistance-providing device 2404. The MUST transmission 2414 may comprise the base layer including the encoded first message and the enhancement layer including the encoded second message.

At 2416, the assistance-receiving device 2406 attempts to decode the base layer message. For example, the assistance-receiving device 2406 may attempt to decode the first message encoded in the base layer of the MUST transmission 2414. In some examples, the assistance-receiving device 2406 may be capable of decoding the control information of first message encoded in the base layer, but be unable to decode the data portion of the first message.

At 2418, the assistance-providing device 2404 decodes the base layer message. For example, the assistance-providing device 2404 may decode the first message encoded in the base layer of the MUST transmission 2414. The assistance-providing device 2404 may also decode the enhancement layer message. For example, the assistance-providing device 2402 may decode the second message encoded in the enhancement layer of the MUST transmission 2414.

In the illustrated example, the assistance-receiving device 2406 transmits feedback signaling that the assistance-receiving device 2406 did not receive the base layer message. In some examples, the assistance-receiving device 2406 may broadcast the feedback that is received by the UE 2402 and the assistance-providing device 2404. In some examples, the assistance-receiving device 2406 may unicast the feedback that is received by the UE 2402 and the feedback that is received by the assistance-providing device 2404. As shown in FIG. 24, the assistance-receiving device 2406 may transmit a first feedback message 2420 that is received by the UE and may transmit a second feedback message 2422 that is received by the assistance-providing device. Although shown as separate messages that are transmit at different times, it may be appreciated that the feedback messages 2420, 2422 may be the same feedback and may be transmit at the same time.

In the illustrated example of FIG. 24, the assistance-providing device 2424 transmits a first message retransmission 2424 that is received by the assistance-receiving device 2406. The first message retransmission 2424 may comprise the first message encoded in the base layer of the MUST transmission 2414. Thus, the assistance-providing device 2404 may act as a relay of the first message to the UE 2402 by transmitting the first message to the assistance-receiving device 2406.

In some examples, at 2426, the UE 2402 may monitor feedback received from the assistance-receiving device 2406 and/or the assistance-providing device 2404. For example, the UE 2402 may monitor for feedback message during a monitoring window after transmission of the MUST transmission 2424.

At 2428, the UE 2402 may adjust at least one transmission parameter associated with a subsequent MUST transmission. For example, the UE 2402 may adjust at least one transmission parameter associated with subsequent MUST transmission based on at least one feedback message received during the monitoring window.

In some examples, the at least one feedback message received during the monitoring window may include a threshold quantity of one or more negative acknowledgement messages indicating unsuccessful receipt of the base layer. In some such examples, the UE may adjust (e.g., at 2428) the at least one transmission parameter associated with the subsequent MUST transmission by decreasing a base layer code rate or modulation associated with the subsequent MUST transmission, increasing a base layer power allocation associated with the subsequent MUST transmission, increasing an enhancement layer code rate or modulation associated with the subsequent MUST transmission, and/or decreasing an enhancement layer power allocation associated with the subsequent MUST transmission.

In some examples, the at least one feedback message received during the monitoring window may include a threshold quantity of one or more base layer acknowledgement messages indicating successful receipt of the base layer and a threshold quantity of one or more enhancement layer negative acknowledgement messages indicating unsuccessful receipt of the enhancement layer. In some such examples, the UE may adjust (e.g., at 2428) the at least one transmission parameter associated with the subsequent MUST transmission by increasing a base layer code rate or modulation associated with the subsequent MUST transmission, decreasing a base layer power allocation associated with the subsequent MUST transmission, decreasing an enhancement layer code rate or modulation associated with the subsequent MUST transmission, and/or increasing an enhancement layer power allocation associated with the subsequent MUST transmission.

In some examples, the at least one feedback message received during the monitoring window may include a threshold quantity of one or more base layer ACK messages indicating successful receipt of the base layer and a threshold quantity of one or more enhancement layer ACK messages indicating successful receipt of the enhancement layer. In some such examples, the UE may adjust (e.g., at 2428) the at least one transmission parameter associated with the subsequent MUST transmission by increasing a base layer code rate or modulation associated with the subsequent MUST transmission, decreasing a base layer power allocation associated with the subsequent MUST transmission, increasing an enhancement layer code rate or modulation associated with the subsequent MUST transmission, and/or decreasing an enhancement layer power allocation associated with the subsequent MUST transmission.

In some examples, the UE 2402 may encode a sidelink message as a base layer of the MUST transmission 2414 and may encode an uplink message as an enhancement layer of the MUST transmission 2414, for example, as described in connection with FIGS. 7 to 9. For example, at 2410, the UE 2402 may encode a sidelink message (e.g., the sidelink message 610 (message A) of FIG. 6) as a base layer of a MUST transmission. At 2412, the UE 2402 may encode an uplink message (e.g., the uplink message 620 (message B) of FIG. 6) as an enhancement layer of the MUST transmission.

The MUST transmission 2414 may correspond to the MUST transmissions 710, 720 of FIG. 7. For example, the MUST transmission 2414 may facilitate the concurrent transmission of a sidelink message (message A) and an uplink message (message B). The UE 2402 may encode the sidelink message (message A) as the base layer of the MUST transmission 2414 (at 2410) and may encode the uplink message (message B) as the enhancement layer of the MUST transmission 2414 (at 2114). In this manner, the UE 2402 may improve spectral efficiency by using one resource for transmitting the sidelink message and the uplink message.

At 2416, the assistance-receiving device 2406 (e.g., the second UE 706) attempts to decode the base layer message (e.g., message A) of the received MUST transmission 2414. The assistance-receiving device 2406 may or may not be able to decode the base layer message of the MUST transmission 2414. The assistance-receiving device 2406 may decode the control information of the MUST transmission 2414. For example, the UE 2402 may encode the SCI 612 using an encoding rate that is low and, thus, allows additional redundancy in the control information.

As shown in FIG. 24, the assistance-receiving device 2406 transmits feedback messages 2420, 2422. For example, the assistance-receiving device 2406 may transmit the feedback messages 2420, 2422 using sidelink. The feedback messages 2420, 2422 may be broadcast and received by the UE 2402 and the assistance-providing device 2404. The feedback messages 2420, 2422 may comprise an ACK message when the assistance-receiving device 2406 successfully decodes the base layer message (at 2416). The feedback messages 2420, 2422 may comprise a NACK message when the assistance-receiving device 2406 is not able to decode the base layer message (at 2416).

At 2418, the assistance-providing device 2404 decodes the base layer message and the enhancement layer message of the received MUST transmission 2414. For example, the assistance-providing device 2404 may be configured to decode the base layer of the MUST transmission 2414 to receive the base layer message (e.g., the SCI 612 and the PSSCH 614 of the message A). The assistance-providing device 2404 may also be configured to decode the enhancement layer of the MUST transmission 2414 to receive the enhancement layer message (e.g., the UCI 622 and the PUSCH 624 of the message B). In some examples, the assistance-providing device 2404 may be configured to decode the base layer of the MUST transmission 2414 before attempting to decode the enhancement layer of the MUST transmission 2414.

As shown in FIG. 24, based on whether the assistance-receiving device 2406 successfully decoded the base layer message of the MUST transmission 2414, the assistance-providing device 2404 relays the decoded base layer message (message A) to the assistance-receiving device 2406. For example, the feedback message 2422 may comprise a NACK message. In some such examples, the assistance-providing device 2404 may transmit the decoded base layer message (message A) to the assistance-receiving device 2406 as the first message retransmission 2424.

In some examples, the UE 2402 may encode an uplink message as a base layer of the MUST transmission 2414 and may encode a sidelink message as an enhancement layer of the MUST transmission 2414, for example, as described in connection with FIGS. 16 to 18. For example, at 2410, the UE 2402 may encode an uplink message (e.g., the uplink message 620 (message B) of FIG. 6) as a base layer of a MUST transmission. For example, the first UE 1604 may encode as the base layer. At 2412, the UE 2402 may encode a sidelink message (e.g., the sidelink message 610 (message A) of FIG. 6) as an enhancement layer of the MUST transmission. For example, the first UE 1604 may encode as the enhancement layer.

The MUST transmission 2414 may correspond to the MUST transmissions 1610, 1620 of FIG. 16. For example, the MUST transmission 2414 may facilitate the concurrent transmission of a sidelink message (message A) and an uplink message (message B). The UE 2402 may encode the uplink message (message B) as the base layer of the MUST transmission 2414 and may encode the sidelink message (message A) as the enhancement layer of the MUST transmission 2414. In this manner, the UE 2402 may improve spectral efficiency by using one resource for transmitting the sidelink message and the uplink message.

At 2416, the assistance-receiving device 2406 (e.g., the base station 1602) attempts to decode the base layer message (e.g., message B) of the received MUST transmission 2414. The assistance-receiving device 2406 may or may not be able to decode the base layer message of the MUST transmission 2414. The assistance-receiving device 2406 may decode the control information of the MUST transmission 2414. For example, the UE 2402 may encode the UCI 622 using an encoding rate that is low and, thus, allows additional redundancy in the control information.

As shown in FIG. 24, the assistance-receiving device 2406 transmits feedback messages 2420, 2422. For example, the assistance-receiving device 2406 may transmit the feedback messages 2420, 2422 using downlink transmissions. The assistance-receiving device 2406 may transmit a first base station feedback message (e.g., the feedback message 2420) that is received by the UE 2402. The assistance-receiving device 2406 may also transmit a second base station feedback message (e.g., the feedback message 2422) that is received by the assistance-providing device 2404. The feedback messages 2420, 2422 may comprise an ACK message when the assistance-receiving device 2406 successfully decodes the base layer message (at 248). The feedback messages 2420, 24220 may comprise a NACK message when the assistance-receiving device 2406 is not able to decode the base layer message (at 2418).

At 2418, the assistance-providing device 2404 decodes the base layer message and the enhancement layer message of the received MUST transmission 2414. For example, the assistance-providing device 2404 may be configured to decode the base layer of the MUST transmission 2414 to receive the base layer message (e.g., the UCI 622 and the PUSCH 624 of the message B). The assistance-providing device 2404 may also be configured to decode the enhancement layer of the MUST transmission 2414 to receive the enhancement layer message (e.g., the SCI 612 and the PSSCH 614 of the message A). In some examples, the assistance-providing device 2404 may be configured to decode the base layer of the MUST transmission 2414 before attempting to decode the enhancement layer of the MUST transmission 2414.

As shown in FIG. 24, based on whether the assistance-receiving device 2406 successfully decoded the base layer message of the MUST transmission 2414, the assistance-providing device 2404 relays the decoded base layer message (message B) to the assistance-receiving device 2406. For example, the feedback message 2422 may comprise a NACK message. In some such examples, the assistance-providing device 2404 may transmit the decoded base layer message (message B) to the assistance-receiving device 2406 as the first message retransmission 2424.

Figure 25:
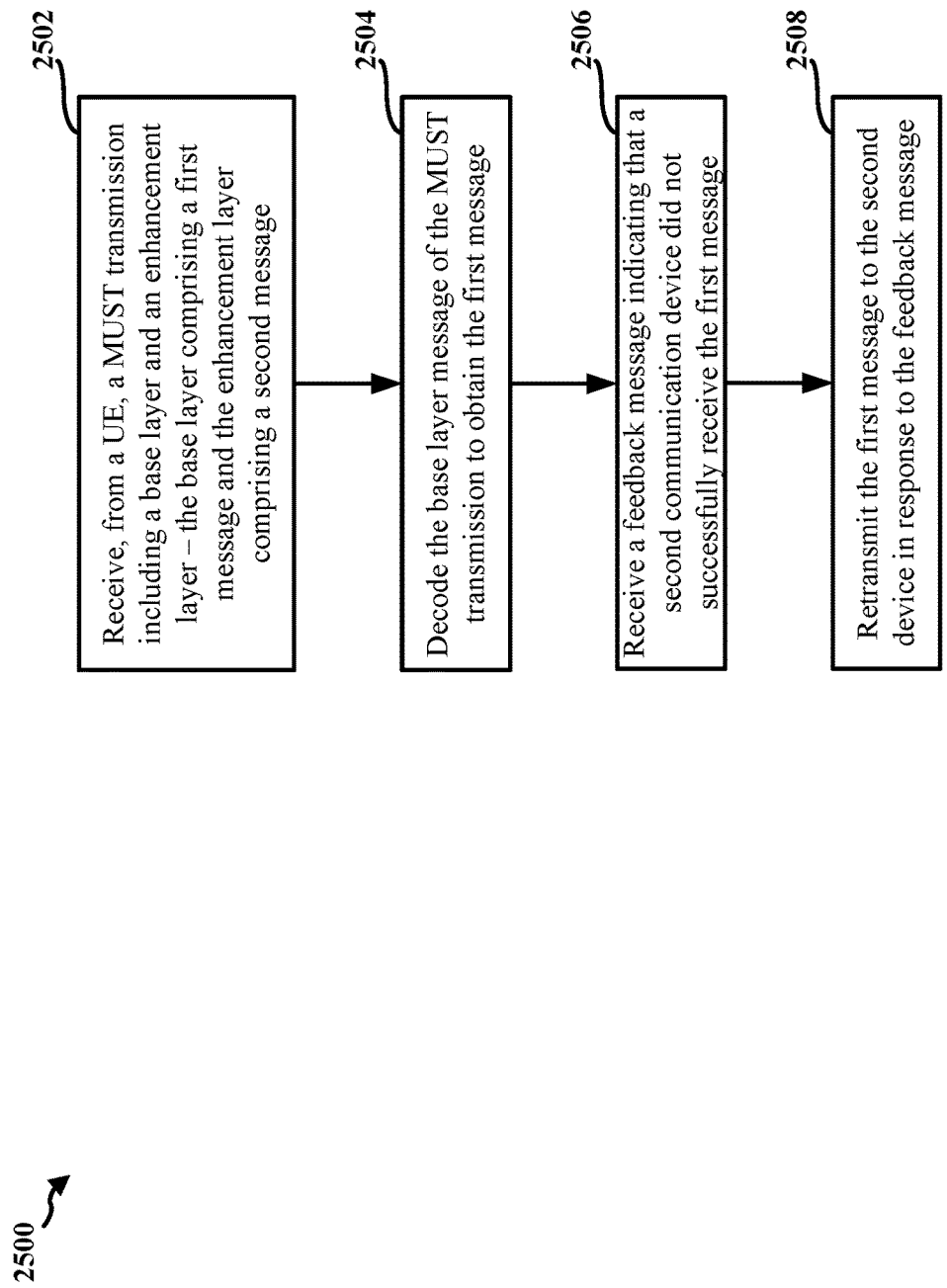
FIG. 25 is a flowchart of a method of wireless communication at a wireless device, in accordance with the teachings disclosed herein.

FIG. 25 is a flowchart 2500 of a method of wireless communication. The method may be performed by a first communication device (e.g., an assistance-providing device, such as the UE 104, the UE 310, the base station 702 of FIGS. 7, 8, and/or 9, the base station 1002 of FIG. 10, the second UE 1606 of FIGS. 16, 17, and/or 18, the assistance-providing device 2404 of FIG. 24, and/or an apparatus 2602 of FIG. 26). Optional aspects are illustrated with a dashed line. The method may facilitate improving communications by enabling an assistance-providing device to serve as a relay for messages of superposition transmissions to an assistance-receiving device.

At 2502, the first communication device receives, from a UE, a MUST transmission including a base layer and an enhancement layer, as described in connection with the MUST transmission 2414 of FIG. 24. The base layer may comprise a first message for a second communication device and the enhancement layer may comprise a second message for the first communication device. For example, 2502 may be performed by a MUST transmission component 2640 of the apparatus 2602 of FIG. 26.

At 2504, the first communication device decodes the base layer of the MUST transmission to obtain the first message, as described in connection with 2418 of FIG. 24. For example, 2504 may be performed by a decode component 2642 of the apparatus 2602 of FIG. 26.

At 2506, the first communication device receives a feedback message from the second communication indicating that the second communication device did not successfully receive the first message, as described in connection with the feedback message 2422 of FIG. 24. For example, 2506 may be performed by a feedback component 2644 of the apparatus 2602 of FIG. 26.

At 2508, the first communication device retransmits the first message to the second communication device in response to the feedback message from the second communication device, as described in connection with the first message retransmission 2424 of FIG. 24. For example, 2508 may be performed by a retransmission component 2646 of the apparatus 2602 of FIG. 26.

In some examples, the first communication device may comprise a base station and the second communication device may comprise a sidelink UE, as described in connection with FIGS. 7 to 10. In some such examples, the first message may comprise a sidelink message, the second message may comprise an uplink message, and the feedback message may comprise a sidelink feedback message.

In some examples in which the first communication device comprises the base station, aspects of 2502 may be similar to 1410 of FIG. 14. In some examples in which the first communication device comprises the base station, aspects of 2504 may be similar to 1412 of FIG. 14. In some examples in which the first communication device comprises the base station, aspects of 2506 may be similar to 1418 of FIG. 14. In some examples in which the first communication device comprises the base station, aspects of 2508 may be similar to 1426 of FIG. 14.

In some examples in which the first communication device comprises the base station, the first communication device may receive a MUST relay request from the second communication device requesting that the first communication device serve as a relay of sidelink messages for MUST transmissions generated by a first set of source communication devices, as described in connection with the MUST relay request 910 of FIG. 9. The first set of source communication devices may include at least the UE. The first communication device may transmit a confirmation message to the second communication device signaling a confirmation of the first communication device to serve as a relay for MUST transmissions generated by a second set of source communication devices, as described in connection with the confirmation message 920 of FIG. 9. The second set of source communication devices may include at least the UE.

In some examples in which the first communication device comprises the base station, the sidelink message may include SCI and sidelink data. The first communication device may determine at least one transmission parameter associated with transmission of the sidelink message from the UE to the second communication device based on the SCI, as described above in connection with 814 of FIG. 8 and/or 960 of FIG. 9. In some examples, the at least one transmission parameter may include a resource reservation and an MCS.

In some examples in which the first communication device comprises the base station, the first communication device may determine source identifier associated with the sidelink feedback message based on a sidelink feedback channel resource used by the second communication device to transmit the sidelink feedback message, as described in connection with 970 of FIG. 9. The source identifier may indicate a source communication device to which the sidelink feedback message is directed. The first communication device may determine the sidelink message to transmit to the second communication device based at least in part on the determined source identifier, as described in connection with 972 of FIG. 9.

In some examples in which the first communication device comprises the base station, the first communication device may determine a resource to use to transmit a sidelink transmission to the second communication device based on SCI of the sidelink message, as described in connection with 980, 990 of FIG. 9, and/or 1054, 1064 of FIG. 10. In some examples, the first communication device may transmit the sidelink transmission to the second communication device at a same time slot when the SCI indicates that the UE transmits a retransmission of the sidelink message to the second communication device. In some examples, the first communication device may determine the resource to use to transmit the sidelink transmission based on one or more of a transmission resource associated with transmission of the sidelink message from the UE to the second communication device, a source identifier associated with the UE, and a destination identifier associated with the second communication device.

In some examples in which the first communication device comprises the base station, the first communication device may determine at least one transmission parameter associated with transmission of the sidelink message from the UE to the second communication device based on SCI of the sidelink message. The first communication device may transmit a sidelink transmission to the second communication device using at least one same transmission parameter as the transmission of the base layer from the UE, and the at least one transmission parameter may include a coding rate or an MCS.

In some examples in which the first communication device comprises the base station, the first communication device may transmit a sidelink transmission to the second communication device using at least one different transmission parameter as a transmission of the sidelink message from the UE to the second communication device. In some examples, the first communication device may transmit the sidelink transmission using at least one of a lower MSC and a lower code rate than an MCS and a code rate associated with the transmission of the sidelink message from the UE to the second communication device. The first communication device may transmit a control message to the second communication device signaling the at least one of the lower MCS and the lower code.

In some examples, the first communication device may comprise a sidelink UE and the second communication device may comprise a base station, as described in connection with FIGS. 16 to 18. In some such examples, the first message may comprise an uplink message, the second message may comprise a sidelink message, and the feedback message may comprise downlink feedback. The first communication device may apply a relay strategy to determine whether to transmit the base layer as an uplink transmission to the second communication device in response to the downlink feedback from the second communication device, as described in connection with 1922 of FIG. 19.

In some examples in which the first communication device comprises the sidelink UE, aspects of 2502 may be similar to 1908 of FIG. 19. In some examples in which the first communication device comprises the base station, aspects of 2504 may be similar to 1910 of FIG. 19. In some examples in which the first communication device comprises the base station, aspects of 2506 may be similar to 1916 of FIG. 19. In some examples in which the first communication device comprises the base station, aspects of 2508 may be similar to 1925 of FIG. 19.

In some examples in which the first communication device comprises a sidelink UE, the first communication device may receive a MUST relay request from the UE requesting that the first communication device serve as a relay for uplink messages of MUST transmissions from the UE, as described in connection with the MUST relay request 1810 of FIG. 18. The first communication device may transmit a MUST relay confirmation message to the UE signaling a confirmation of the first communication device to serve as a relay for uplink messages of MUST transmissions from the UE, as described in connection with the MUST relay confirmation 1812 of FIG. 18.

In some examples in which the first communication device comprises a sidelink UE, the first communication device may receive a relay MUST identifier from the second communication device, as described in connection with the relay-MUST-RNTI 1880 of FIG. 18. In some examples, the first communication device may receive the downlink feedback from the second communication device using the relay MUST identifier. In some examples, the relay MUST identifier may be valid for N slots, N being an integer number. In some examples, the relay MUST identifier may be valid for N slots after the first communication device receives the relay MUST identifier, N being an integer number. In some examples, the first communication device may receive signaling from the second communication device to activate or deactivate the relay MUST identifier.

In some examples in which the first communication device comprises a sidelink UE, the first communication device may receive an uplink grant from the second communication device for an uplink transmission of the uplink message to the second communication device, as described in connection with the second base station feedback message 1718 of FIG. 17 and/or the relay bae station NACK message

1860 of FIG. 18. In some examples, the first communication device may apply the relay strategy including transmitting the uplink transmission including the uplink message to the second communication device based on the uplink grant, as described in connection with the relay uplink transmission 1720 of FIG. 17 and and/or 1870 and the relay uplink transmission 1872 of FIG. 18. In some examples, the uplink grant may indicate resources that may be used by the first communication device to transmit the uplink transmission and for the UE to transmit a retransmission of the uplink message to the second communication device. In some examples, the first communication device may transmit the uplink transmission to the second communication device using one or more transmission parameters of the MUST transmission based on UCI of the uplink message. The one or more transmission parameters may include a same MCS or a same code rate.

In some examples in which the first communication device comprises a sidelink UE, the first communication may apply the relay strategy including transmitting the uplink transmission including the uplink message to the second communication device if an uplink message priority satisfies a priority threshold, and may refrain from transmitting the uplink transmission to the second communication device if the uplink message priority does not satisfy the priority threshold.

In some examples in which the first communication device comprises a sidelink UE, the first communication device may apply the relay strategy including transmitting the uplink transmission including the uplink message to the second communication device if a slot number corresponding to a candidate transmission of the uplink message to the second communication device satisfies a condition, and may refrain from transmitting the uplink transmission including the uplink message to the second communication device if the slot number corresponding to a candidate transmission of the uplink message to the second communication device does not satisfy the condition. In some examples, the first communication device may receive a parameter for the condition via at least one of RRC signaling, a MAC-CE, or DCI.

In some examples in which the first communication device comprises a sidelink UE, the first communication device may transmit the uplink transmission including the uplink message to the second communication device based on an uplink grant of different resources than resources for the UE to transmit a retransmission of the uplink message to the second communication device. The first communication device may transmit the uplink transmission including the uplink message to the second communication device at slot (n+m) based on a slot n used to transmit the MUST transmission and an offset m. The first communication device may receive the offset m via a UE relay confirmation or the downlink feedback.

In some examples in which the first communication device comprises a sidelink UE, the first communication device may receive grant-free scheduling to transmit the uplink transmission including the uplink message to the second communication device, as described in connection with the second base station feedback message 1718 of FIG. 17, the UE relay confirmation 1830 of FIG. 18, and/or the relay base layer NACK message 1860 of FIG. 18. In some examples, the grant-free scheduling may include a resource allocation to transmit the uplink transmission at a slot (n−m) based on a slot n used to transmit the MUST transmission and an offset m, wherein the first communication device receives the offset m via RRC signaling. In some examples, the grant-free scheduling may include a resource allocation to transmit the uplink transmission to the second communication device. The first communication device may receive a downlink control channel from the second communication device activating or deactivating the resource allocation.

Figure 26:
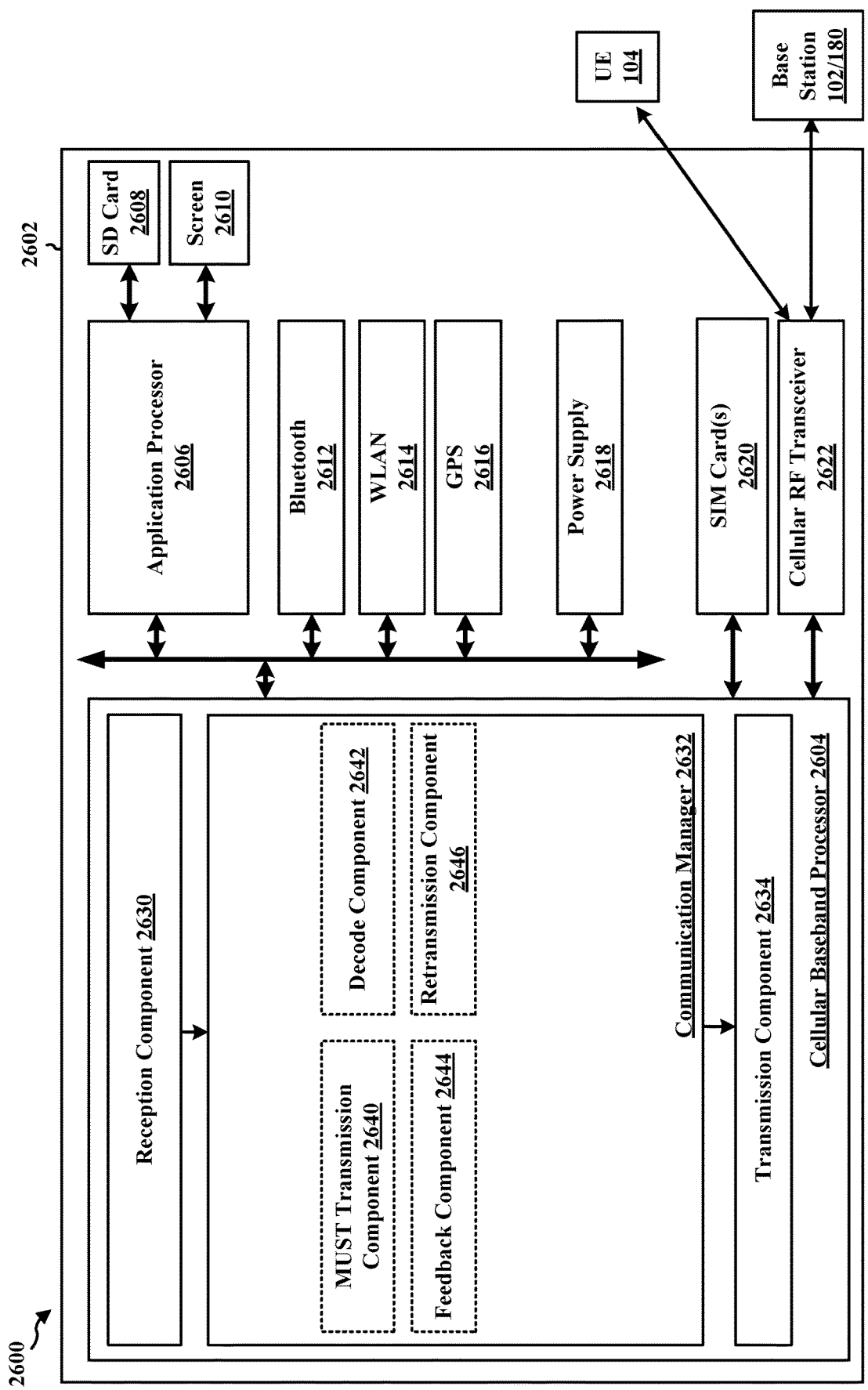
FIG. 26 is a diagram illustrating an example of a hardware implementation for an example apparatus, in accordance with the teachings disclosed herein.

FIG. 26 is a diagram 2600 illustrating an example of a hardware implementation for an apparatus 2602. The apparatus 2602 may comprise a base station or a UE. In the illustrated example, the apparatus 2602 includes a cellular baseband processor 2604 (also referred to as a modem) coupled to a cellular RF transceiver 2622 and one or more subscriber identity modules (SIM) cards 2620, an application processor 2606 coupled to a secure digital (SD) card 2608 and a screen 2610, a Bluetooth module 2612, a wireless local area network (WLAN) module 2614, a Global Positioning System (GPS) module 2616, and a power supply 2618. The cellular baseband processor 2604 communicates through the cellular RF transceiver 2622 with the UE 104 and/or base station 102/180. The cellular baseband processor 2604 may include a computer-readable medium/memory. The computer-readable medium/memory may be non-transitory. The cellular baseband processor 2604 is responsible for general processing, including the execution of software stored on the computer-readable medium/memory. The software, when executed by the cellular baseband processor 2604, causes the cellular baseband processor 2604 to perform the various functions described supra. The computer-readable medium/memory may also be used for storing data that is manipulated by the cellular baseband processor 2604 when executing software. The cellular baseband processor 2604 further includes a reception component 2630, a communication manager 2632, and a transmission component 2634. The communication manager 2632 includes the one or more illustrated components. The components within the communication manager 2632 may be stored in the computer-readable medium/memory and/or configured as hardware within the cellular baseband processor 2604.

In one configuration, the cellular baseband processor 2604 may be a component of the UE 350 and may include the memory 360 and/or at least one of the TX processor 368, the RX processor 356, and the controller/processor 359. In one configuration, the apparatus 2602 may be a modem chip and include just the baseband processor 2604, and in another configuration, the apparatus 2602 may be the entire UE (e.g., see the UE 350 of FIG. 3) and include the aforediscussed additional modules of the apparatus 2602.

In one configuration, the baseband unit 2604 may be a component of the base station 310 and may include the memory 376 and/or at least one of the TX processor 316, the RX processor 370, and the controller/processor 375.

The communication manager 2632 includes a MUST transmission component 2640 that is configured to receive, from a UE, a MUST transmission including a base layer and an enhancement layer, the base layer comprising a first message for a second communication device and the enhancement layer comprising a second message for the first communication device, for example, as described in connection with 2502 of FIG. 25. The communication manager 2632 also includes a decode component 2642 that is configured to decode the base layer of the MUST transmission to obtain the first message, for example, as described in connection with 2504 of FIG. 25. The communication manager 2632 also includes a feedback component 2644 that is configured to receive a feedback message from the second communication device indicating that the second communication device did not successfully receive the first message, for example, as described in connection with 2506 of FIG. 25. The communication manager 2632 also includes a retransmission component 2646 that is configured to retransmit the first message to the second communication device in response to the feedback message from the second communication device, for example, as described in connection with 2508 of FIG. 25.

The apparatus may include additional components that perform each of the blocks of the algorithm in the aforementioned flowchart of FIG. 25. As such, each block in the aforementioned flowchart of FIG. 25 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2602, and in particular the cellular baseband processor 2604, includes means for receiving, from a UE, a MUST transmission including a base layer and an enhancement layer, the base layer comprising a first message for a second communication device and the enhancement layer comprising a second message for the first communication device. The example apparatus 2602 also includes means for decoding the base layer of the MUST transmission to obtain the first message. The example apparatus 2602 also includes means for receiving a feedback message from the second communication device indicating that the second communication device did not successfully receive the first message. The example apparatus 2602 also includes means for retransmitting the first message to the second communication device in response to the feedback message from the second communication device.

In one configuration, the aforementioned means may be one or more of the aforementioned components of the apparatus 2602 configured to perform the functions recited by the aforementioned means. As described supra, the apparatus 2602 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

In another configuration, the aforementioned means may be one or more of the aforementioned components of the apparatus 2602 configured to perform the functions recited by the aforementioned means. As described supra, the apparatus 2602 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Figure 27:
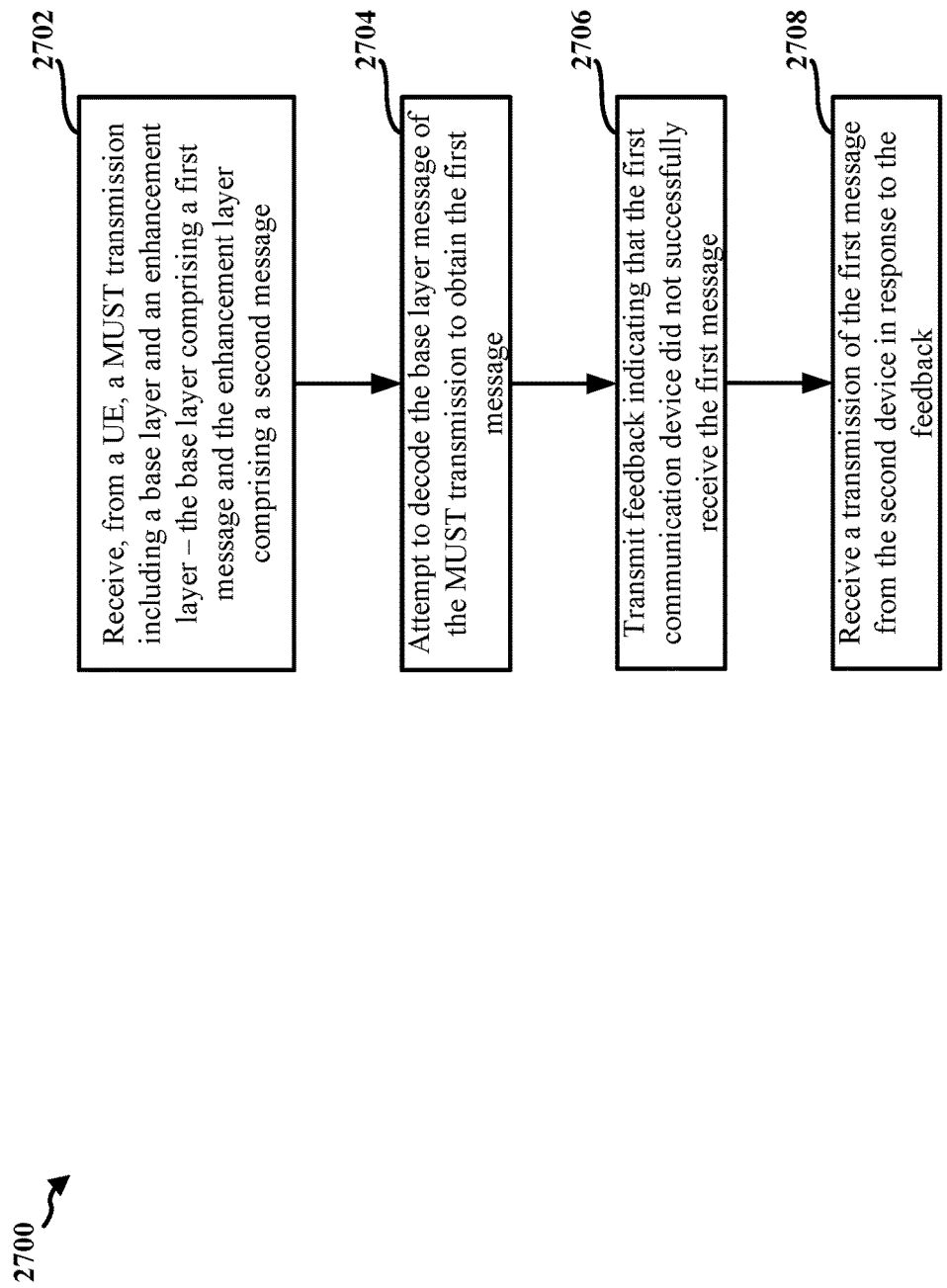
FIG. 27 is a flowchart of a method of wireless communication at a wireless device, in accordance with the teachings disclosed herein.

FIG. 27 is a flowchart 2700 of a method of wireless communication. The method may be performed by a first communication device (e.g., an assistance-receiving device, such as the UE 104, the UE 310, the UE 706 of FIGS. 7 to 9, the base station 1602 of FIGS. 16 to 18, and/or an apparatus 2802 of FIG. 28). Optional aspects are illustrated with a dashed line. The method may facilitate improving communications by enabling an assistance-providing device to serve as a relay for messages of superposition transmissions to an assistance-receiving device.

At 2702, the first communication device receives, from a UE, a MUST transmission including a base layer and an enhancement layer, as described in connection with the MUST transmission 2414 of FIG. 24. For example, 2702 may be performed by a MUST transmission component 2840 of the apparatus 2802 of FIG. 28. The base layer may comprise a first message for the first communication device and the enhancement layer may comprise a second message for a second communication device.

At 2704, the first communication device attempts to decode the base layer of the MUST transmission to obtain the first message, as described in connection with 2416 of FIG. 24. For example, 2704 may be performed by a decode component 2842 of the apparatus 2802 of FIG. 28.

At 2706, the first communication device transmits feedback indicating that the first communication device did not successfully receive the first message, as described in connection with feedback message 2422 of FIG. 24. For example, 2706 may be performed by a feedback component 2844 of the apparatus 2802 of FIG. 28.

At 2708, the first communication device receives a transmission of the first message from the second communication device in response to the feedback, as described in connection with the first message retransmission 2424 of FIG. 24. For example, 2708 may be performed by a retransmission component 2846 of the apparatus 2802 of FIG. 28.

In some examples, the first communication device may comprise a sidelink UE and the second communication device may comprise a base station, as described in connection with FIGS. 7 to 10. In some such examples, the first message may comprise a sidelink message, the second message may comprise an uplink message, the feedback may comprise a sidelink feedback message, and the transmission of the first message from the second communication device may comprise a sidelink transmission of the first message.

In some examples in which the first communication device comprises the sidelink UE, aspects of 2702 may be similar to 1210 of FIG. 12. In some examples in which the first communication device comprises the sidelink UE, aspects of 2704 may be similar to 1212 of FIG. 12. In some examples in which the first communication device comprises the sidelink UE, aspects of 2706 may be similar to 1214 of FIG. 12. In some examples in which the first communication device comprises the sidelink UE, aspects of 2708 may be similar to 1216 of FIG. 12.

In some examples in which the first communication device comprises the sidelink UE, the first communication device may transmit the feedback using a sidelink feedback channel resource.

In some examples in which the first communication device comprises the sidelink UE, the first communication may transmit a MUST relay request to the second communication device requesting that the second communication device serve as a relay of sidelink messages for MUST transmissions generated by a first set of source communication devices, as described in connection with the MUST relay request 910 of FIG. 9. The first set of source communication devices may include at least the UE. The first communication device may receive a confirmation message from the second communication device signaling a confirmation of the second communication device to serve as a relay for MUST transmissions generated by a second set of source communication devices, as described in connection with the confirmation message 920 of FIG. 9. The second set of source communication devices may include at least the UE.

In some examples in which the first communication device comprises the sidelink UE, the first communication device may transmit a relay confirmation message to the UE indicating that the second communication device is serving as a relay of sidelink messages for MUST transmissions generated by the UE, as described in connection with the relay confirmation message 922 of FIG. 9.

In some examples in which the first communication device comprises the sidelink UE, the first communication device may receive a retransmission of the first message from the UE when the feedback signals an inability of the first communication device to obtain the first message from decoding of the base layer, as described in connection with the UE retransmission 984, 994 of FIG. 9.

In some examples in which the first communication device comprises the sidelink UE, the first communication device may receive the sidelink transmission of the first message from the second communication device and the retransmission of the first message from the UE at a same time slot, as described in connection with the first relay strategy 980 of FIG. 9.

In some examples in which the first communication device comprises the sidelink UE, the first communication device may receive the sidelink transmission of the first message from the second communication device at a different time than the retransmission of the first message from the UE, as described in connection with the second relay strategy 990 of FIG. 9.

In some examples in which the first communication device comprises the sidelink UE, the first communication device may combine the sidelink transmission of the first message and the retransmission of the first message to obtain the first message, as described in connection with 998 of FIG. 9.

In some examples in which the first communication device comprises the sidelink UE, the first communication device may receive the sidelink transmission from the second communication device using a configured resource for retransmission of sidelink messages by the second communication device, as described in connection with the base station sidelink message 982, 992 of FIG. 9. The configured resource may be based on one or more of a transmission resource associated with transmission of the first message from the UE to the first communication device, a source identifier associated with the UE, or a destination identifier associated with the first communication device.

In some examples, the first communication device may comprise a base station and the second communication device may comprise a sidelink UE, as described in connection with FIGS. 16 to 18. In some such examples, the first message may comprise an uplink message and the second message may comprise a sidelink message. The first communication device may transmit the feedback using a downlink control channel, and the transmission of the first message from the second communication device may comprise a relay uplink transmission of the first message.

In some examples in which the first communication device comprises the base station, the first communication device may provide a relay MUST identifier to the second communication device, as described in connection with the relay-MUST-RNTI 1880 of FIG. 18. The first communication device may encode a NACK comprised in the feedback using the relay MUST identifier, as described in connection with the relay base layer NACK message 1860 of FIG. 18.

In some examples in which the first communication device comprises the base station, the feedback may be directed to the second communication device, as described in connection with the relay base layer NACK message 1860 of FIG. 18. The first communication device may transmit, using a second downlink control channel, an additional feedback message to the UE indicating that the first communication device did not successfully receive the base layer, as described in connection with the UE base layer NACK message 1850 of FIG. 18.

In some examples in which the first communication device comprises the base station, the first communication device receives, from the UE, a MUST relay request signaling that the second communication device is configured to serve as a relay of uplink messages for MUST transmissions generated by the UE, as described in connection with the UE relay request 1830 of FIG. 18. The first communication device may transmit a UE relay confirmation to the second communication device, as described in connection with the UE MUST relay confirmation 1822 of FIG. 18. The UE relay confirmation may include a relay MUST identifier to facilitate decoding downlink control channels transmitted by the first communication device to detect downlink feedback associated with a MUST transmission, as described in connection with the relay-MUST-RNTI 1880 of FIG. 18. The first communication device may transmit, to the UE, a UE MUST relay confirmation acknowledging that the second communication device is configured to serve as the relay for uplink messages of MUST transmission generated by the UE, as described in connection with the UE MUST relay confirmation 1822 of FIG. 18.

In some examples, the relay MUST identifier may be valid for N slots, N being an integer number. In some examples, the relay MUST identifier may be valid for N slots after the second communication device receives the relay MUST identifier, N being an integer number. In some examples, the first communication device may transmit signaling to the second communication device to activate or deactivate the relay MUST identifier.

In some examples in which the first communication device comprises the base station, the first communication device may receive the relay uplink transmission of the uplink message from the second communication device and a retransmission of the uplink message from the UE at a same time slot, as described in connection with a first example relay strategy of the relay strategies 1870 of FIG. 18. The first communication device may combine the relay uplink transmission of the uplink message from the second communication device and the retransmission of the uplink message from the UE to obtain the uplink message, as described in connection with 1890 of FIG. 18.

In some examples in which the first communication device comprises the base station, the first communication device may determine an uplink message priority based on UCI of the uplink message, as described in connection with 1712 of FIG. 17. In some examples, the first communication device may receive the relay uplink transmission of the uplink message from the second communication device when the uplink message priority satisfies a priority threshold, or may skip monitoring for the relay uplink transmission when the uplink message priority does not satisfy the priority threshold, as described in connection with the second example relay strategy of the relay strategies 1870 of FIG. 18.

In some examples in which the first communication device comprises the base station, the first communication device may transmit a condition to the second communication device for transmitting the relay uplink transmission, as described in connection with the third example relay strategy of the relay strategies 1870 of FIG. 18. The first communication device may receive the relay uplink transmission of the uplink message from the second communication device when a slot number corresponding to a candidate transmission of the uplink message satisfies the condition, or may skip monitoring for the relay uplink transmission when the slot number corresponding to the candidate transmission of the uplink message does not satisfy the condition.

In some examples in which the first communication device comprises the base station, the first communication device may transmit a first offset $m_1$ to the UE and a second offset $m_2$ to the second communication device, as described in connection with the fourth example relay strategy of the relay strategies 1870 of FIG. 18. The first communication device may receive a retransmission of the uplink message from the UE at a slot $(n+m_1)$ based on a slot n used to transmit the MUST transmission and the first offset $m_1$, and may receive the relay uplink transmission of the uplink message from the second communication device at a slot $(n+m_2)$ based on the slot n and the second offset $m_2$.

In some examples in which the first communication device comprises the base station, the first communication device may provide grant-free scheduling to the second communication device to transmit the relay uplink transmission including the uplink message to the first communication device when decode failures satisfy a failure threshold, as described in connection with the fifth example relay strategy of the relay strategies 1870 of FIG. 18. A decode failure may occur when unsuccessful receipt of the base layer is signaled by the first communication device (e.g., when the first communication device transmits a NACK). The failure threshold may be based on a quantity of decode failures, a rate of decode failures, or a percentage of decode failures.

In some examples, the grant-free scheduling may include a resource allocation to transmit the relay uplink transmission at a slot (n–m) based on a slot n used to transmit the MUST transmission and an offset m. The first communication device may transmit the offset m via RRC signaling. In some examples, the grant-free scheduling may include a resource allocation to transmit the relay uplink transmission to the first communication device. The first communication device may transmit a downlink control channel to the second communication device activating or deactivating the resource allocation.

Figure 28:
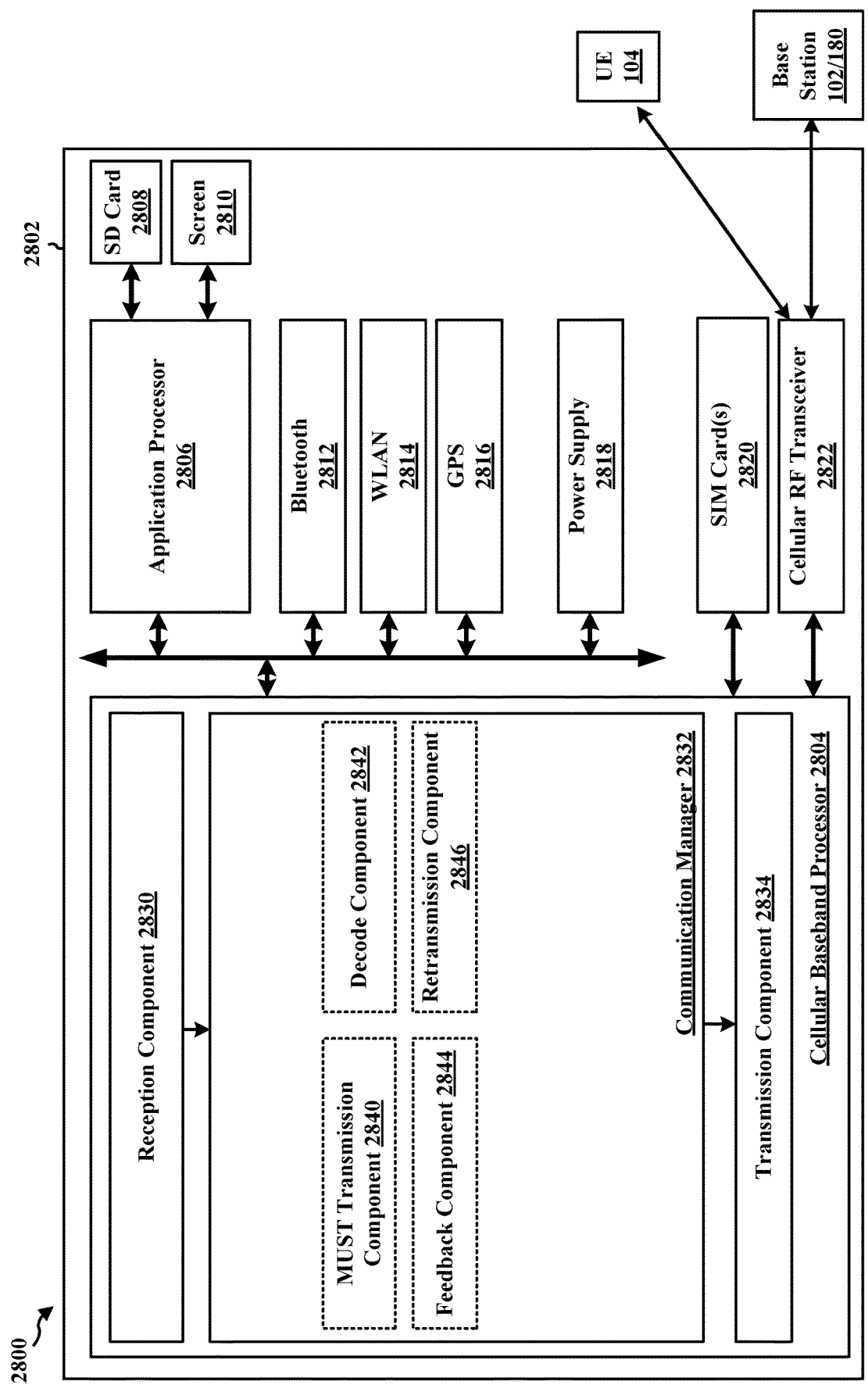
FIG. 28 is a diagram illustrating an example of a hardware implementation for an example apparatus, in accordance with the teachings disclosed herein.

FIG. 28 is a diagram 2800 illustrating an example of a hardware implementation for an apparatus 2802. The apparatus 2802 may comprise a UE or a base station. In the illustrated example, the apparatus 2802 includes a cellular baseband processor 2804 (also referred to as a modem) coupled to a cellular RF transceiver 2822 and one or more subscriber identity modules (SIM) cards 2820, an application processor 2806 coupled to a secure digital (SD) card 2808 and a screen 2810, a Bluetooth module 2812, a wireless local area network (WLAN) module 2814, a Global Positioning System (GPS) module 2816, and a power supply 2818. The cellular baseband processor 2804 communicates through the cellular RF transceiver 2822 with the UE 104 and/or base station 102/180. The cellular baseband processor 2804 may include a computer-readable medium/memory. The computer-readable medium/memory may be non-transitory. The cellular baseband processor 2804 is responsible for general processing, including the execution of software stored on the computer-readable medium/memory. The software, when executed by the cellular baseband processor 2804, causes the cellular baseband processor 2804 to perform the various functions described supra. The computer-readable medium/memory may also be used for storing data that is manipulated by the cellular baseband processor 2804 when executing software. The cellular baseband processor 2804 further includes a reception component 2830, a communication manager 2832, and a transmission component 2834. The communication manager 2832 includes the one or more illustrated components. The components within the communication manager 2832 may be stored in the computer-readable medium/memory and/or configured as hardware within the cellular baseband processor 2804.

In one configuration, the cellular baseband processor 2804 may be a component of the UE 350 and may include the memory 360 and/or at least one of the TX processor 368, the RX processor 356, and the controller/processor 359. In one configuration, the apparatus 2802 may be a modem chip and include just the baseband processor 2804, and in another configuration, the apparatus 2802 may be the entire UE (e.g., see the UE 350 of FIG. 3) and include the aforediscussed additional modules of the apparatus 2802.

In one configuration, the baseband unit 2804 may be a component of the base station 310 and may include the memory 376 and/or at least one of the TX processor 316, the RX processor 370, and the controller/processor 375.

The communication manager 2832 includes a MUST transmission component 2840 that is configured to receive, from a UE, a MUST transmission including a base layer and an enhancement layer, for example, as described in connection with 2702 of FIG. 27. The communication manager 2832 also includes a decode component 2842 that is configured to attempt to decode the base layer of the MUST transmission to obtain the first message, for example, as described in connection with 2704 of FIG. 27. The communication manager 2832 also includes a feedback component 2844 that is configured to transmit feedback indicating that the first communication device did not successfully receive the first message, for example, as described in connection with 2706 of FIG. 27. The communication manager 2832 also includes a retransmission component 2846 that is configured to receive a transmission of the first message from the second communication device in response to the feedback, for example, as described in connection with 2708 of FIG. 27.

The apparatus may include additional components that perform each of the blocks of the algorithm in the aforementioned flowchart of FIG. 27. As such, each block in the aforementioned flowchart of FIG. 27 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 2802, and in particular the cellular baseband processor 2804, includes means for receiving, from a UE, a MUST transmission including a base layer and an enhancement layer, the base layer comprising a first message for the first communication device and the enhancement layer comprising a second message for a second communication device. The example apparatus 2802 also includes means for attempting to decode the base layer of the MUST transmission to obtain the first message. The example apparatus 2802 also includes means for transmitting feedback indicating that the first communication device did not successfully receive the first message. The example apparatus 2802 also includes means for receiving a transmission of the first message from the second communication device in response to the feedback.

In one configuration, the aforementioned means may be one or more of the aforementioned components of the apparatus 2802 configured to perform the functions recited by the aforementioned means. As described supra, the apparatus 2802 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

In another configuration, the aforementioned means may be one or more of the aforementioned components of the apparatus 2802 configured to perform the functions recited by the aforementioned means. As described supra, the apparatus 2802 may include the TX processor 316, the RX processor 370, and the controller/processor 375. As such, in one configuration, the aforementioned means may be the TX processor 316, the RX processor 370, and the controller/processor 375 configured to perform the functions recited by the aforementioned means.

Figure 29:
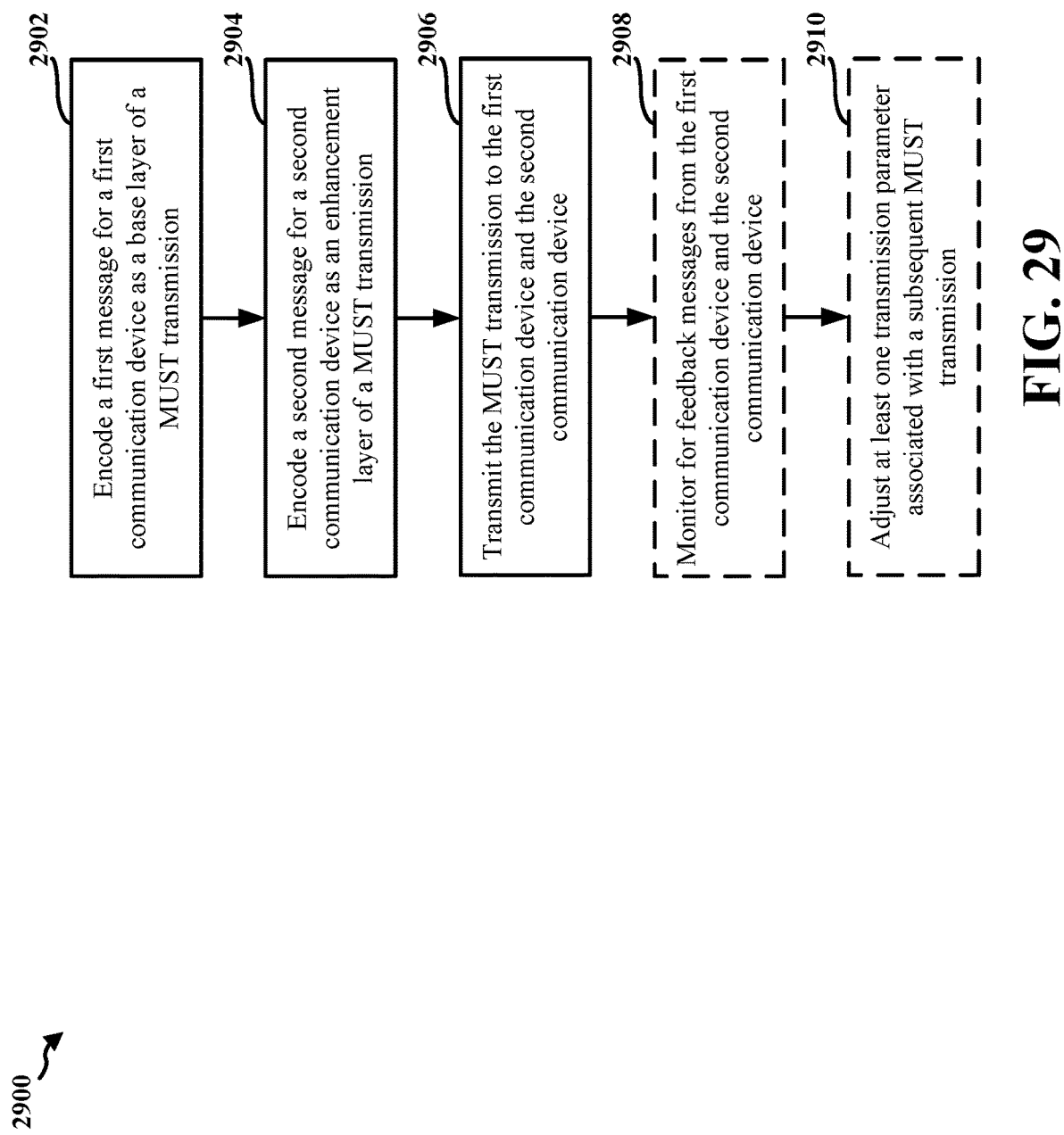
FIG. 29 is a flowchart of a method of wireless communication at a base station, in accordance with the teachings disclosed herein.

FIG. 29 is a flowchart 2900 of a method of wireless communication. The method may be performed by a UE (e.g., the UE 104, the UE 310, the first UE 704 of FIGS. 7 to 9, the first UE 1604 of FIGS. 16 to 18, and/or an apparatus 3002 of FIG. 30). Optional aspects are illustrated with a dashed line. The method may facilitate improving communications by enabling an assistance-providing device to serve as a relay for messages of superposition transmissions from the UE to an assistance-receiving device.

At 2902, the UE encodes a first message for a first communication device as a base layer of a MUST transmission, as described in connection with 2410 of FIG. 24. For example, 2902 may be performed by a base layer encode component 3040 of the apparatus 3002 of FIG. 30.

At 2904, the UE encodes a second message for a second communication device as an enhancement layer of the MUST transmission, as described in connection with 2412 of FIG. 24. For example, 2904 may be performed by an enhancement layer encode component 3042 of the apparatus 3002 of FIG. 30.

At 2906, the UE transmits the MUST transmission to the first communication device and the second communication device, as described in connection with the MUST transmission 2414 of FIG. 24. For example, 2906 may be performed by a MUST transmission component 3044 of the apparatus 3002 of FIG. 30.

At 2908, the UE may monitor for feedback messages from the first communication device and the second communication device during a monitoring window, as described in connection with 2426 of FIG. 24. For example, 2908 may be performed by a monitor component 3046 of the apparatus 3002 of FIG. 30.

At 2910, the UE may adjust at least one transmission parameter associated with a subsequent MUST transmission based on at least one feedback message received during the monitoring window, as described in connection with 2428 of FIG. 24. For example, 2910 may be performed by an adjustment component 3048 of the apparatus 3002 of FIG. 30.

In some examples, the at least one feedback message received during the monitoring window (e.g., at 2908) may include a threshold quantity of one or more negative acknowledgement messages indicating unsuccessful receipt of the base layer. In some such examples, the UE may adjust (e.g., at 2910) the at least one transmission parameter associated with the subsequent MUST transmission by decreasing a base layer code rate or modulation associated with the subsequent MUST transmission, increasing a base layer power allocation associated with the subsequent MUST transmission, increasing an enhancement layer code rate or modulation associated with the subsequent MUST transmission, and/or decreasing an enhancement layer power allocation associated with the subsequent MUST transmission.

In some examples, the at least one feedback message received during the monitoring window (e.g., at 2908) may include a threshold quantity of one or more base layer acknowledgement messages indicating successful receipt of the base layer and a threshold quantity of one or more enhancement layer negative acknowledgement messages indicating unsuccessful receipt of the enhancement layer. In some such examples, the UE may adjust (e.g., at 2910) the at least one transmission parameter associated with the subsequent MUST transmission by increasing a base layer code rate or modulation associated with the subsequent MUST transmission, decreasing a base layer power allocation associated with the subsequent MUST transmission, decreasing an enhancement layer code rate or modulation associated with the subsequent MUST transmission, and/or increasing an enhancement layer power allocation associated with the subsequent MUST transmission.

In some examples, the at least one feedback message received during the monitoring window (e.g., at 2908) may include a threshold quantity of one or more base layer ACK messages indicating successful receipt of the base layer and a threshold quantity of one or more enhancement layer ACK messages indicating successful receipt of the enhancement layer. In some such examples, the UE may adjust (e.g., at 2910) the at least one transmission parameter associated with the subsequent MUST transmission by increasing a base layer code rate or modulation associated with the subsequent MUST transmission, decreasing a base layer power allocation associated with the subsequent MUST transmission, increasing an enhancement layer code rate or modulation associated with the subsequent MUST transmission, and/or decreasing an enhancement layer power allocation associated with the subsequent MUST transmission.

In some examples, the first communication device may comprise a sidelink UE and the second communication device may comprise a base station, as described in connection with FIGS. 7 to 9. In some such examples, the first message may comprise a sidelink message, the second message may comprise an uplink message, the feedback may comprise a sidelink feedback message, and the transmission of the first message from the second communication device may comprise a sidelink transmission of the first message.

In some examples in which the first communication device comprises the sidelink UE and the second communication device comprises the base station, aspects of 2902 may be similar to 1108 of FIG. 11. In some examples in which the first communication device comprises the sidelink UE and the second communication device comprises the base station, aspects of 2904 may be similar to 1110 of FIG. 11. In some examples in which the first communication device comprises the sidelink UE and the second communication device comprises the base station, aspects of 2906 may be similar to 1112 of FIG. 11. In some examples in which the first communication device comprises the sidelink UE and the second communication device comprises the base station, aspects of 2908 may be similar to 1122 of FIG. 11. In some examples in which the first communication device comprises the sidelink UE and the second communication device comprises the base station, aspects of 2910 may be similar to 1124 of FIG. 11.

In some examples in which the first communication device comprises the sidelink UE and the second communication device comprises the base station, the sidelink message may include SCI and sidelink data, and the uplink message may comprise at least one of UCI and uplink data. At least the SCI may be superposition encoded with the UCI in the MUST transmission.

In some examples in which the first communication device comprises the sidelink UE and the second communication device comprises the base station, the UE may receive a relay confirmation message from the first communication device indicating that the second communication device is serving as a relay for sidelink messages of MUST transmissions generated by the UE, as described in connection with the relay confirmation message 922 of FIG. 9. In some such examples, the UE may refrain from transmitting a retransmission of the sidelink message to the first communication device based at least in part on the relay confirmation message.

In some examples in which the first communication device comprises the sidelink UE and the second communication device comprises the base station, the UE may receive a sidelink feedback message from the first communication device indicating whether the first communication device obtained the sidelink message from the base layer of the MUST transmission, as described in connection with the NACK message 950 of FIG. 9. In some examples, the UE may transmit a retransmission of the sidelink message to the first communication device based on the sidelink feedback message, as described in connection with the UE retransmission 984, 994 of FIG. 9.

In some examples in which the first communication device comprises the sidelink UE and the second communication device comprises the base station, the UE may receive a second communication device feedback message from the second communication device indicating whether the second communication device decoded at least one of the base layer or the enhancement layer, as described in connection with the base station feedback message 830 of FIG. 8. In some examples, the second communication device feedback message may include a first indicator corresponding to decoding of the sidelink message (e.g., the first bit 830*a* of FIG. 8) and a second indicator corresponding to decoding of the uplink message (e.g., the second bit 830*b* of FIG. 8).

In some examples, the first communication device may comprise a base station and the second communication device may comprise a sidelink UE, as described in connection with FIGS. 16 to 18. In some such examples, the first message may comprise an uplink message and the second message may comprise a sidelink message.

In some examples in which the first communication device comprises the base station and the second communication device comprises the sidelink UE, aspects of 2902 may be similar to 2010 of FIG. 20. In some examples in which the first communication device comprises the base station and the second communication device comprises the sidelink UE, aspects of 2904 may be similar to 2012 of FIG. 20. In some examples in which the first communication device comprises the base station and the second communication device comprises the sidelink UE, aspects of 2906 may be similar to 2014 of FIG. 20. In some examples in which the first communication device comprises the base station and the second communication device comprises the sidelink UE, aspects of 2908 may be similar to 2024 of FIG. 20. In some examples in which the first communication device comprises the base station and the second communication device comprises the sidelink UE, aspects of 2910 may be similar to 2026 of FIG. 20.

In some examples in which the first communication device comprises the base station and the second communication device comprises the sidelink UE, the UE may receive downlink feedback from the second communication device indicating that the second communication device did not successfully receive the base layer of the MUST transmission, as described in connection with the UE base layer NACK message 1850 of FIG. 18. The UE may transmit a retransmission of the uplink message to the second communication device in response to the downlink feedback, as described in connection with the retransmission message 1874 of FIG. 18.

In some examples, the UE may transmit the retransmission of the uplink message to the second communication device at a slot (n+m) based on a slot n used to transmit the MUST transmission and an offset m. The UE may receive the offset m via a UE MUST relay confirmation from the second communication device or the downlink feedback, as described in connection with the UE MUST relay confirmation 1822 and/or the UE base layer NACK message 1850 of FIG. 18.

In some examples in which the first communication device comprises the base station and the second communication device comprises the sidelink UE, the UE may transmit a MUST relay request to the first communication device requesting that the first communication device serve as a relay for uplink messages of MUST transmissions from the UE, as described in connection with the MUST relay request 1810 of FIG. 18. The UE may receive, from the first communication device, a MUST relay confirmation message signaling a confirmation of the first communication device to serve as a relay for uplink messages of MUST transmissions from the UE, as described in connection with the MUST relay confirmation 1812 of FIG. 18. The UE may transmit, to the second communication device, a UE MUST relay request signaling that the first communication device is configured to serve as a relay for uplink messages of MUST transmissions from the UE, as described in connection with the UE MUST relay request 1820 of FIG. 18. In some examples, the UE may receive, from the second communication device, a UE MUST relay confirmation acknowledging that the first communication device is configured to serve as the relay for uplink messages of MUST transmission from the UE, as described in connection with the UE MUST relay confirmation 1822 of FIG. 18.

In some examples in which the first communication device comprises the base station and the second communication device comprises the sidelink UE, the UE may decode downlink control channels received from the second communication device to detect an occurrence of a negative acknowledgement message signaling that the second communication device did not successfully receive the base layer of the MUST transmission, as described in connection with 1832 of FIG. 18.

In some examples in which the first communication device comprises the base station and the second communication device comprises the sidelink UE, the UE may receive a sidelink feedback message from the first communication device indicating whether the first communication device obtained at least one of the uplink message and the sidelink message, as described in connection with the sidelink feedback message 1730 of FIG. 17. In some examples, the sidelink feedback message may include a first indicator corresponding to decoding of the base layer (e.g., the first bit 1730*a* of FIG. 17) and a second indicator corresponding to decoding of the enhancement layer (e.g., the second bit 1730*b* of FIG. 17).

Figure 30:
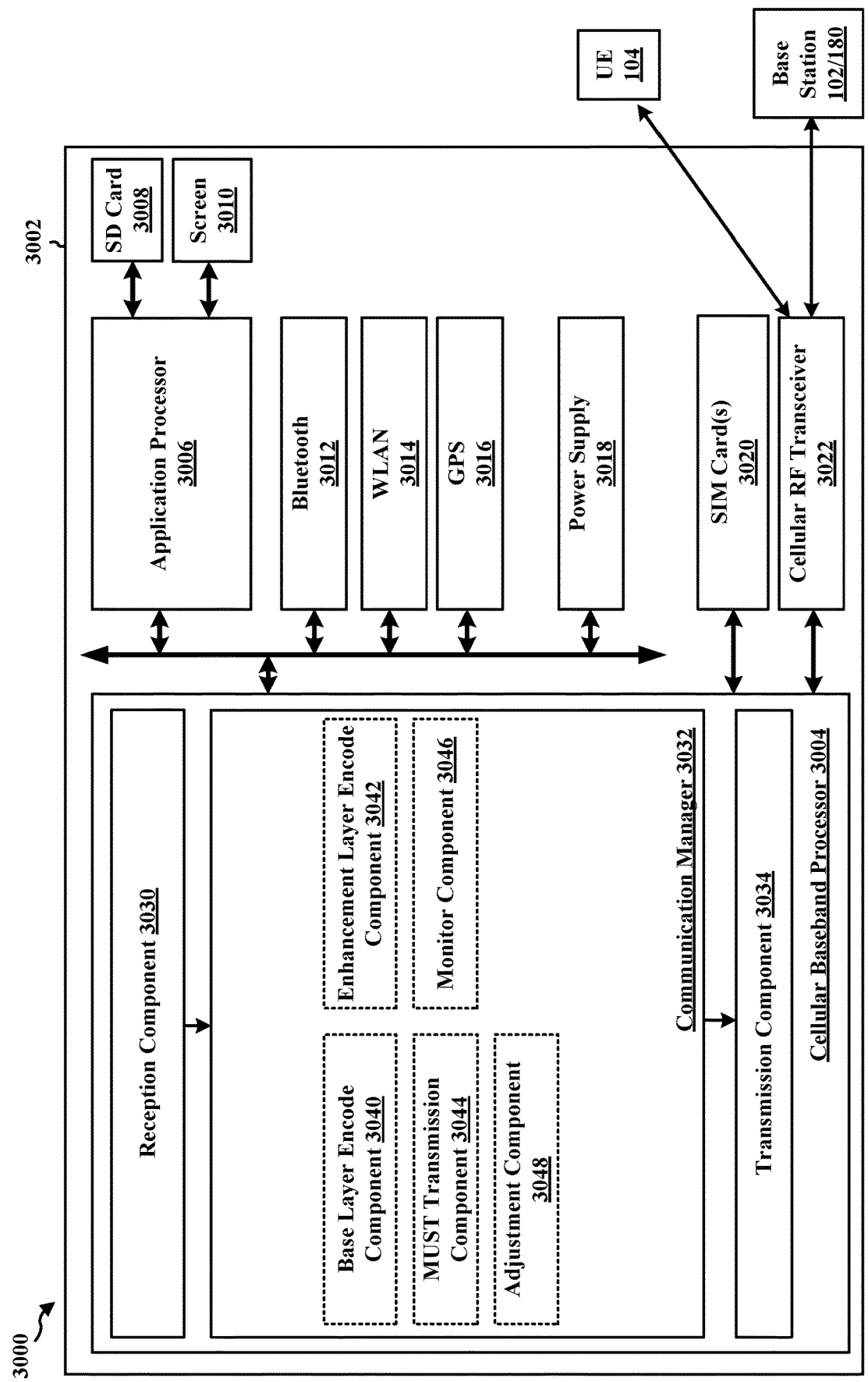
FIG. 30 is a diagram illustrating an example of a hardware implementation for an example apparatus, in accordance with the teachings disclosed herein.

FIG. 30 is a diagram 3000 illustrating an example of a hardware implementation for an apparatus 3002. The apparatus 3002 is a UE and includes a cellular baseband processor 3004 (also referred to as a modem) coupled to a cellular RF transceiver 3022 and one or more subscriber identity modules (SIM) cards 3020, an application processor 3006 coupled to a secure digital (SD) card 3008 and a screen 3010, a Bluetooth module 3012, a wireless local area network (WLAN) module 3014, a Global Positioning System (GPS) module 3016, and a power supply 3018. The cellular baseband processor 3004 communicates through the cellular RF transceiver 3022 with the UE 104 and/or base station 102/180. The cellular baseband processor 3004 may include a computer-readable medium/memory. The computer-readable medium/memory may be non-transitory. The cellular baseband processor 3004 is responsible for general processing, including the execution of software stored on the computer-readable medium/memory. The software, when executed by the cellular baseband processor 3004, causes the cellular baseband processor 3004 to perform the various functions described supra. The computer-readable medium/memory may also be used for storing data that is manipulated by the cellular baseband processor 3004 when executing software. The cellular baseband processor 3004 further includes a reception component 3030, a communication manager 3032, and a transmission component 3034. The communication manager 3032 includes the one or more illustrated components. The components within the communication manager 3032 may be stored in the computer-readable medium/memory and/or configured as hardware within the cellular baseband processor 3004. The cellular baseband processor 3004 may be a component of the UE 350 and may include the memory 360 and/or at least one of the TX processor 368, the RX processor 356, and the controller/processor 359. In one configuration, the apparatus 3002 may be a modem chip and include just the baseband processor 3004, and in another configuration, the apparatus 3002 may be the entire UE (e.g., see the UE 350 of FIG. 3) and include the aforediscussed additional modules of the apparatus 3002.

The communication manager 3032 includes a base layer encode component 3040 that is configured to encode a first message for a first communication device as a base layer of a MUST transmission, for example, as described in connection with 2902 of FIG. 29. The communication manager 3032 also includes an enhancement layer encode component 3042 that is configured to encode a second message for a second communication device as an enhancement layer of the MUST transmission, for example, as described in connection with 2904 of FIG. 29. The communication manager 3032 also includes a MUST transmission component 3044 that is configured to transmit the MUST transmission to the first communication device and the second communication device, for example, as described in connection with 2906 of FIG. 29. The communication manager 3032 also includes a monitor component 3046 that is configured to monitor for feedback messages from the first communication device and the second communication device during a monitoring window, for example, as described in connection with 2908 of FIG. 29. The communication manager 3032 also includes an adjustment component 3048 that is configured to adjust at least one transmission parameter associated with a subsequent MUST transmission based on at least one feedback message received during the monitoring window, for example, as described in connection with 2910 of FIG. 29.

The apparatus may include additional components that perform each of the blocks of the algorithm in the aforementioned flowchart of FIG. 29. As such, each block in the aforementioned flowchart of FIG. 29 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 3002, and in particular the cellular baseband processor 3004, includes means for encoding a first message for a first communication device as a base layer of a MUST transmission. The example apparatus 3002 also includes means for encoding a second message for a second communication device as an enhancement layer of the MUST transmission. The example apparatus 3002 also includes means for transmitting the MUST transmission to the first communication device and the second communication device. The example apparatus 3002 also includes means for monitoring for feedback messages from the first communication device and the second communication device during a monitoring window. The example apparatus 3002 also includes means for adjusting at least one transmission parameter associated with a subsequent MUST transmission based on at least one feedback message received during the monitoring window.

The aforementioned means may be one or more of the aforementioned components of the apparatus 3002 configured to perform the functions recited by the aforementioned means. As described supra, the apparatus 3002 may include the TX processor 368, the RX processor 356, and the controller/processor 359. As such, in one configuration, the aforementioned means may be the TX processor 368, the RX processor 356, and the controller/processor 359 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a first communication device, comprising: receiving, from a user equipment (UE), a multi-user simultaneous transmission (MUST) transmission including a base layer and an enhancement layer, the base layer comprising a first message for a second communication device and the enhancement layer comprising a second message for the first communication device; decoding the base layer of the MUST transmission to obtain the first message; receiving a feedback message from the second communication device indicating that the second communication device did not successfully receive the first message; and retransmitting the first message to the second communication device in response to the feedback message from the second communication device.

Aspect 2 is the method of aspect 1, further including that the first communication device comprises a base station and the second message comprises an uplink message, and wherein the second communication device comprises a sidelink UE, the first message comprises a sidelink message, and the feedback message comprises a sidelink feedback message.

Aspect 3 is the method of any of aspect 1 or aspect 2, further including: receiving a MUST relay request from the second communication device requesting that the first communication device serve as a relay of sidelink messages for MUST transmissions generated by a first set of source communication devices, wherein the first set of source communication devices includes at least the UE; and transmitting a confirmation message to the second communication device signaling a confirmation of the first communication device to serve as a relay for MUST transmissions generated by a second set of source communication devices, wherein the second set of source communication devices includes at least the UE.

Aspect 4 is the method of any of aspects 1 to 3, further including that the sidelink message includes sidelink control information (SCI) and sidelink data, and the method further comprises determining at least one transmission parameter associated with transmission of the sidelink message from the UE to the second communication device based on the SCI, and wherein the at least one transmission parameter includes a resource reservation and a modulation and coding scheme (MC S).

Aspect 5 is the method of any of aspects 1 to 4, further including: determining a source identifier associated with the sidelink feedback message based on a sidelink feedback channel resource used by the second communication device to transmit the sidelink feedback message, wherein the source identifier indicates a source communication device to which the sidelink feedback message is directed; and determining the sidelink message to transmit to the second communication device based at least in part on the determined source identifier.

Aspect 6 is the method of any of aspects 1 to 5, further including that the first communication device determines a resource to use to transmit a sidelink transmission to the second communication device based on sidelink control information (SCI) of the sidelink message.

Aspect 7 is the method of any of aspects 1 to 6, further including that the first communication device transmits the sidelink transmission to the second communication device at a same time slot when the SCI indicates that the UE transmits a retransmission of the sidelink message to the second communication device.

Aspect 8 is the method of any of aspects 1 to 7, further including that the first communication device determines the resource to use to transmit the sidelink transmission based on one or more of: a transmission resource associated with transmission of the sidelink message from the UE to the second communication device, a source identifier associated with the UE, and a destination identifier associated with the second communication device.

Aspect 9 is the method of any of aspects 1 to 8, further including that the first communication device determines at least one transmission parameter associated with transmission of the sidelink message from the UE to the second communication device based on sidelink control information (SCI) of the sidelink message, and wherein the first communication device transmits a sidelink transmission to the second communication device using at least one same transmission parameter as the transmission of the base layer from the UE, and the at least one transmission parameter including a coding rate or a modulation and coding scheme (MCS).

Aspect 10 is the method of any of aspects 1 to 9, further including that the first communication device transmits a sidelink transmission to the second communication device using at least one different transmission parameter as a transmission of the sidelink message from the UE to the second communication device.

Aspect 11 is the method of any of aspects 1 to 10, further including that the first communication device transmits the sidelink transmission using at least one of a lower modulation and coding scheme (MSC) and a lower code rate than an MCS and a code rate associated with the transmission of the sidelink message from the UE to the second communication device, and wherein the first communication device transmits a control message to the second communication device signaling the at least one of the lower MCS and the lower code.

Aspect 12 is the method of any of aspects 1 to 11, further including that the first communication device comprises a sidelink UE and the second message comprises a sidelink message, and wherein the second communication device comprises a base station, the first message comprises an uplink message, and the feedback message comprises downlink feedback, and the method further comprises: applying a relay strategy to determine whether to transmit the base layer as an uplink transmission to the second communication device in response to the downlink feedback from the second communication device.

Aspect 13 is the method of any of aspects 1 to 12, further including: receiving a MUST relay request from the UE requesting that the first communication device serve as a relay for uplink messages of MUST transmissions from the UE; and transmitting a MUST relay confirmation message to the UE signaling a confirmation of the first communication device to serve as a relay for uplink messages of MUST transmissions from the UE.

Aspect 14 is the method of any of aspects 1 to 13, further including receiving a relay MUST identifier from the second communication device, wherein the first communication device receives the downlink feedback from the second communication device using the relay MUST identifier.

Aspect 15 is the method of any of aspects 1 to 14, further including that the relay MUST identifier is valid for N slots, N being an integer number.

Aspect 16 is the method of any of aspects 1 to 14, further including that the relay MUST identifier is valid for N slots after the first communication device receives the relay MUST identifier, N being an integer number.

Aspect 17 is the method of any of aspects 1 to 14, further including that the first communication device receives signaling from the second communication device to activate or deactivate the relay MUST identifier.

Aspect 18 is the method of any of aspects 1 to 17, further including receiving an uplink grant from the second communication device for an uplink transmission of the uplink message to the second communication device, wherein applying the relay strategy includes transmitting the uplink transmission including the uplink message to the second communication device based on the uplink grant.

Aspect 19 is the method of any of aspects 1 to 18, further including that the uplink grant indicates resources that may be used by the first communication device to transmit the uplink transmission and for the UE to transmit a retransmission of the uplink message to the second communication device.

Aspect 20 is the method of any of aspects 1 to 19, further including that the first communication device transmits the uplink transmission to the second communication device using one or more transmission parameters of the MUST transmission based on uplink control information (UCI) of the uplink message, and wherein the one or more transmission parameters include a same modulation and coding scheme (MCS) or a same code rate.

Aspect 21 is the method of any of aspects 1 to 20, further including that applying the relay strategy includes: transmitting the uplink transmission including the uplink message to the second communication device if an uplink message priority satisfies a priority threshold, and refraining from transmitting the uplink transmission to the second communication device if the uplink message priority does not satisfy the priority threshold.

Aspect 22 is the method of any of aspects 1 to 21, further including that applying the relay strategy includes: transmitting the uplink transmission including the uplink message to the second communication device if a slot number corresponding to a candidate transmission of the uplink message to the second communication device satisfies a condition; and refraining from transmitting the uplink transmission including the uplink message to the second communication device if the slot number corresponding to a candidate transmission of the uplink message to the second communication device does not satisfy the condition, and wherein the first communication device receives a parameter for the condition via at least one of radio resource control (RRC) signaling, a medium access control-control element (MAC-CE), or downlink control information (DCI).

Aspect 23 is the method of any of aspects 1 to 22, further including: transmitting the uplink transmission including the uplink message to the second communication device based on an uplink grant of different resources than resources for the UE to transmit a retransmission of the uplink message to the second communication device, and wherein the first communication device transmits the uplink transmission including the uplink message to the second communication device at slot (n+m) based on a slot n used to transmit the MUST transmission and an offset m, wherein the first communication device receives the offset m via a UE relay confirmation or the downlink feedback.

Aspect 24 is the method of any of aspects 1 to 23, further including that the first communication device receives grant-free scheduling to transmit the uplink transmission including the uplink message to the second communication device.

Aspect 25 is the method of any of aspects 1 to 24, further including that the grant-free scheduling includes a resource allocation to transmit the uplink transmission at a slot (n−m) based on a slot n used to transmit the MUST transmission and an offset m, wherein the first communication device receives the offset m via radio resource control (RRC) signaling.

Aspect 26 is the method of any of aspects 1 to 25, further including that the grant-free scheduling includes a resource allocation to transmit the uplink transmission to the second communication device, and wherein the first communication device receives a downlink control channel from the second communication device activating or deactivating the resource allocation.

Aspect 27 is an apparatus for wireless communication including at least one processor coupled to a memory and configured to implement a method as in any of aspects 1 to 26.

Aspect 28 is an apparatus for wireless communication including means for implementing a method as in any of aspects 1 to 26.

Aspect 29 is a computer-readable medium storing computer executable code, where the code, when executed, causes a processor to implement a method as in any of aspects 1 to 26.

Aspect 30 is a method of wireless communication of a first communication device, comprising: receiving, from a user equipment (UE), a multi-user simultaneous transmission (MUST) transmission including a base layer and an enhancement layer, the base layer comprising a first message for the first communication device and the enhancement layer comprising a second message for a second communication device; attempting to decode the base layer of the MUST transmission to obtain the first message; transmitting feedback indicating that the first communication device did not successfully receive the first message; and receiving a transmission of the first message from the second communication device in response to the feedback.

Aspect 31 is the method of aspect 30, further including that the first communication device comprises a sidelink UE and the second communication device comprises a base station, and wherein the first message comprises a sidelink message, the second message comprises an uplink message, the feedback comprises a sidelink feedback message, and the transmission of the first message from the second communication device comprises a sidelink transmission of the first message.

Aspect 32 is the method of any of aspect 30 or aspect 31, further including that the first communication device transmits the feedback using a sidelink feedback channel resource.

Aspect 33 is the method of any of aspects 30 to 32, further including: transmitting a MUST relay request to the second communication device requesting that the second communication device serve as a relay of sidelink messages for MUST transmissions generated by a first set of source communication devices, wherein the first set of source communication devices includes at least the UE; and receiving a confirmation message from the second communication device signaling a confirmation of the second communication device to serve as a relay for MUST transmissions generated by a second set of source communication devices, wherein the second set of source communication devices includes at least the UE.

Aspect 34 is the method of any of aspects 30 to 33, further including that the first communication device transmits a relay confirmation message to the UE indicating that the second communication device is serving as a relay of sidelink messages for MUST transmissions generated by the UE.

Aspect 35 is the method of any of aspects 30 to 34, further including receiving a retransmission of the first message from the UE when the feedback signals an inability of the first communication device to obtain the first message from decoding of the base layer.

Aspect 36 is the method of any of aspects 30 to 35, further including that the first communication device receives the sidelink transmission of the first message from the second communication device and the retransmission of the first message from the UE at a same time slot.

Aspect 37 is the method of any of aspects 30 to 36, further including that the first communication device receives the sidelink transmission of the first message from the second communication device at a different time than the retransmission of the first message from the UE.

Aspect 38 is the method of any of aspects 30 to 37, further including that the first communication device combines the sidelink transmission of the first message and the retransmission of the first message to obtain the first message.

Aspect 39 is the method of any of aspects 30 to 38, further including that the first communication device receives the sidelink transmission from the second communication device using a configured resource for retransmission of sidelink messages by the second communication device, and wherein the configured resource is based on one or more of: a transmission resource associated with transmission of the first message from the UE to the first communication device, a source identifier associated with the UE, or a destination identifier associated with the first communication device.

Aspect 40 is the method of any of aspects 30 to 39, further including that the first communication device comprises a base station and the second communication device comprises a sidelink UE, wherein the first message comprises an uplink message and the second message comprises a sidelink message, and wherein the first communication device transmits the feedback using a downlink control channel, and the transmission of the first message from the second communication device comprises a relay uplink transmission of the first message.

Aspect 41 is the method of any of aspects 30 to 40, further including providing a relay MUST identifier to the second communication device, wherein the first communication device encodes a negative acknowledgement (NACK) comprised in the feedback using the relay MUST identifier.

Aspect 42 is the method of any of aspects 30 to 41, further including that the feedback is directed to the second communication device, and wherein the first communication device transmits, using a second downlink control channel, an additional feedback message to the UE indicating that the first communication device did not successfully receive the base layer.

Aspect 43 is the method of any of aspects 30 to 42, further including: receiving, from the UE, a MUST relay request signaling that the second communication device is configured to serve as a relay of uplink messages for MUST transmissions generated by the UE; transmitting a UE relay confirmation to the second communication device, the UE relay confirmation including a relay MUST identifier to facilitate decoding downlink control channels transmitted by the first communication device to detect downlink feedback associated with a MUST transmission, and wherein the second communication device transmits, to the UE, a UE MUST relay confirmation acknowledging that the second communication device is configured to serve as the relay for uplink messages of MUST transmission generated by the UE.

Aspect 44 is the method of any of aspects 30 to 43, further including that the relay MUST identifier is valid for N slots, N being an integer number.

Aspect 45 is the method of any of aspects 30 to 44, further including that the relay MUST identifier is valid for N slots after the second communication device receives the relay MUST identifier, N being an integer number.

Aspect 46 is the method of any of aspects 30 to 45, further including that the first communication device transmits signaling to the second communication device to activate or deactivate the relay MUST identifier.

Aspect 47 is the method of any of aspects 30 to 46, further including that the first communication device receives the relay uplink transmission of the uplink message from the second communication device and a retransmission of the uplink message from the UE at a same time slot.

Aspect 48 is the method of any of aspects 30 to 47, further including that the first communication device combines the relay uplink transmission of the uplink message from the second communication device and the retransmission of the uplink message from the UE to obtain the uplink message.

Aspect 49 is the method of any of aspects 30 to 48, further including that the first communication device determines an uplink message priority based on uplink control information (UCI) of the uplink message, and wherein the first communication device performs one of: receiving the relay uplink transmission of the uplink message from the second communication device when the uplink message priority satisfies a priority threshold, or skipping monitoring for the relay uplink transmission when the uplink message priority does not satisfy the priority threshold.

Aspect 50 is the method of any of aspects 30 to 49, further including that the first communication device transmits a condition to the second communication device for transmitting the relay uplink transmission, and wherein the first communication device performs one of: receiving the relay uplink transmission of the uplink message from the second communication device when a slot number corresponding to a candidate transmission of the uplink message satisfies the condition, or skipping monitoring for the relay uplink transmission when the slot number corresponding to the candidate transmission of the uplink message does not satisfy the condition.

Aspect 51 is the method of any of aspects 30 to 50, further including that the first communication device transmits a first offset $m_1$ to the UE and a second offset $m_2$ to the second communication device, and wherein the first communication device receives a retransmission of the uplink message from the UE at a slot $(n+m_1)$ based on a slot n used to transmit the MUST transmission and the first offset $m_1$, and receives the relay uplink transmission of the uplink message from the second communication device at a slot $(n+m_2)$ based on the slot n and the second offset $m_2$.

Aspect 52 is the method of any of aspects 30 to 51, further including that the first communication device provides grant-free scheduling to the second communication device to transmit the relay uplink transmission including the uplink message to the first communication device when decode failures satisfy a failure threshold, a decode failure occurring when unsuccessful receipt of the base layer is signaled by the first communication device, and wherein the failure threshold is based on a quantity of decode failures, a rate of decode failures, or a percentage of decode failures.

Aspect 53 is the method of any of aspects 30 to 52, further including that the grant-free scheduling includes a resource allocation to transmit the relay uplink transmission at a slot (n−m) based on a slot n used to transmit the MUST transmission and an offset m, and wherein the first communication device transmits the offset m via radio resource control (RRC) signaling.

Aspect 54 is the method of any of aspects 30 to 53, further including that the grant-free scheduling includes a resource allocation to transmit the relay uplink transmission to the first communication device, and wherein the first communication device transmits a downlink control channel to the second communication device activating or deactivating the resource allocation.

Aspect 55 is an apparatus for wireless communication including at least one processor coupled to a memory and configured to implement a method as in any of aspects 30 to 54.

Aspect 56 is an apparatus for wireless communication including means for implementing a method as in any of aspects 30 to 54.

Aspect 57 is a computer-readable medium storing computer executable code, where the code, when executed, causes a processor to implement a method as in any of aspects 30 to 54.

Aspect 58 is a method of wireless communication of a user equipment (UE), comprising: encoding a first message for a first communication device as a base layer of a multi-user simultaneous transmission (MUST) transmission; encoding a second message for a second communication device as an enhancement layer of the MUST transmission; and transmitting the MUST transmission to the first communication device and the second communication device.

Aspect 59 is the method of aspect 58, further including that the first communication device comprises a sidelink UE and the second communication device comprises a base station, and wherein the first message comprises a sidelink message and the second message comprises an uplink message.

Aspect 60 is the method of any of aspect 58 or aspect 59, further including that the sidelink message includes sidelink control information (SCI) and sidelink data, and wherein the uplink message comprises at least one of uplink control information (UCI) and uplink data, and wherein the SCI is superposition encoded with the UCI in the MUST transmission.

Aspect 61 is the method of any of aspects 58 to 60, further including: receiving a relay confirmation message from the first communication device indicating that the second communication device is serving as a relay for sidelink messages of MUST transmissions generated by the UE; and refraining from transmitting a retransmission of the sidelink message to the first communication device based at least in part on the relay confirmation message.

Aspect 62 is the method of any of aspects 58 to 61, further including receiving a sidelink feedback message from the first communication device indicating whether the first communication device obtained the sidelink message from the base layer of the MUST transmission.

Aspect 63 is the method of any of aspects 58 to 62, further including transmitting a retransmission of the sidelink message to the first communication device based on the sidelink feedback message.

Aspect 64 is the method of any of aspects 58 to 63, further including that the UE receives a second communication device feedback message from the second communication device indicating whether the second communication device decoded at least one of the base layer or the enhancement layer.

Aspect 65 is the method of any of aspects 58 to 64, further including that the second communication device feedback message includes a first indicator corresponding to decoding of the sidelink message and a second indicator corresponding to decoding of the uplink message.

Aspect 66 is the method of any of aspects 58 to 65, further including that the first communication device comprises a base station and the second communication device comprises a sidelink UE, and wherein the first message comprises an uplink message and the second message comprises a sidelink message.

Aspect 67 is the method of any of aspects 58 to 66, further including: receiving downlink feedback from the second communication device indicating that the second communication device did not successfully receive the base layer of the MUST transmission; and transmitting a retransmission of the uplink message to the second communication device in response to the downlink feedback.

Aspect 68 is the method of any of aspects 58 to 67, further including that the UE transmits the retransmission of the uplink message to the second communication device at a slot (n+m) based on a slot n used to transmit the MUST transmission and an offset m, wherein the UE receives the offset m via a UE MUST relay confirmation from the second communication device or the downlink feedback.

Aspect 69 is the method of any of aspects 58 to 68, further including: transmitting a MUST relay request to the first communication device requesting that the first communication device serve as a relay for uplink messages of MUST transmissions from the UE; receiving, from the first communication device, a MUST relay confirmation message signaling a confirmation of the first communication device to serve as a relay for uplink messages of MUST transmissions from the UE; and transmitting, to the second communication device, a UE MUST relay request signaling that the first communication device is configured to serve as a relay for uplink messages of MUST transmissions from the UE.

Aspect 70 is the method of any of aspects 58 to 69, further including that the UE receives, from the second communication device, a UE MUST relay confirmation acknowledging that the first communication device is configured to serve as the relay for uplink messages of MUST transmission from the UE.

Aspect 71 is the method of any of aspects 58 to 70, further including that the UE decodes downlink control channels received from the second communication device to detect an occurrence of a negative acknowledgement message signaling that the second communication device did not successfully receive the base layer of the MUST transmission.

Aspect 72 is the method of any of aspects 58 to 71, further including that the UE receives a sidelink feedback message from the first communication device indicating whether the first communication device obtained at least one of the uplink message and the sidelink message.

Aspect 73 is the method of any of aspects 58 to 72, further including that the sidelink feedback message includes a first indicator corresponding to decoding of the base layer and a second indicator corresponding to decoding of the enhancement layer.

Aspect 74 is the method of any of aspects 58 to 73, further including: monitoring for feedback messages from the first communication device and the second communication device during a monitoring window; and adjusting at least one transmission parameter associated with a subsequent MUST transmission based on at least one feedback message received during the monitoring window.

Aspect 75 is the method of any of aspects 58 to 74, further including that the at least one feedback message received during the monitoring window includes a threshold quantity of one or more negative acknowledgement messages indicating unsuccessful receipt of the base layer, and wherein adjusting of the at least one transmission parameter associated with the subsequent MUST transmission includes one or more of: decreasing a base layer code rate or modulation associated with the subsequent MUST transmission, increasing a base layer power allocation associated with the subsequent MUST transmission, increasing an enhancement layer code rate or modulation associated with the subsequent MUST transmission, or decreasing an enhancement layer power allocation associated with the subsequent MUST transmission.

Aspect 76 is the method of any of aspects 58 to 75, further including that the at least one feedback message received during the monitoring window includes a threshold quantity of one or more base layer acknowledgement messages indicating successful receipt of the base layer and a threshold quantity of one or more enhancement layer negative acknowledgement messages indicating unsuccessful receipt of the enhancement layer, and wherein adjusting of the at least one transmission parameter associated with the subsequent MUST transmission includes one or more of: increasing a base layer code rate or modulation associated with the subsequent MUST transmission, decreasing a base layer power allocation associated with the subsequent MUST transmission, decreasing an enhancement layer code rate or modulation associated with the subsequent MUST transmission, or increasing an enhancement layer power allocation associated with the subsequent MUST transmission.

Aspect 77 is the method of any of aspects 58 to 76, further including that the at least one feedback message received during the monitoring window includes a threshold quantity of one or more base layer acknowledgement (ACK) messages indicating successful receipt of the base layer and a threshold quantity of one or more enhancement layer ACK messages indicating successful receipt of the enhancement layer, and wherein adjusting of the at least one transmission parameter associated with the subsequent MUST transmission includes one or more of: increasing a base layer code rate or modulation associated with the subsequent MUST transmission, decreasing a base layer power allocation associated with the subsequent MUST transmission, increasing an enhancement layer code rate or modulation associated with the subsequent MUST transmission, or decreasing an enhancement layer power allocation associated with the subsequent MUST transmission.

Aspect 78 is an apparatus for wireless communication including at least one processor coupled to a memory and configured to implement a method as in any of aspects 58 to 77.

Aspect 79 is an apparatus for wireless communication including means for implementing a method as in any of aspects 58 to 77.

Aspect 80 is a computer-readable medium storing computer executable code, where the code, when executed, causes a processor to implement a method as in any of aspects 58 to 77.

Aspect 81 is a method of wireless communication of a first user equipment (UE), comprising: encoding a sidelink message for a second UE as base layer of a multi-user simultaneous transmission (MUST) transmission; encoding an uplink message for a base station as an enhancement layer of the MUST transmission; and transmitting the MUST transmission to the second UE and the base station.

Aspect 82 is the method of aspect 81, further including: receiving a relay confirmation message from the second UE indicating that the base station is serving as a relay for sidelink messages of MUST transmissions generated by the first UE; and refraining from transmitting a retransmission of the sidelink message to the second UE based at least in part on the relay confirmation message.

Aspect 83 is the method of any of aspect 81 or aspect 82, further including receiving a sidelink feedback message from the second UE indicating whether the second UE obtained the sidelink message from the base layer of the MUST transmission.

Aspect 84 is the method of any of aspects 81 to 83, further including transmitting a retransmission of the sidelink message to the second UE based on the sidelink feedback message.

Aspect 85 is the method of any of aspects 81 to 84, further including: monitoring for feedback messages from the second UE and the base station during a monitoring window; and adjusting at least one transmission parameter associated with a subsequent MUST transmission based on at least one feedback message received during the monitoring window.

Aspect 86 is the method of any of aspects 81 to 85, further including that the at least one feedback message received during the monitoring window include a threshold quantity of one or more ACK messages indicating successful receipt of the base layer, and wherein the adjusting of the at least one transmission parameter associated with the subsequent MUST transmission includes one or more of: increasing a base layer code rate or modulation associated with the subsequent MUST transmission, decreasing a base layer power allocation associated with the subsequent MUST transmission, decreasing an enhancement layer code rate or modulation associated with the subsequent MUST transmission, or increasing an enhancement layer power allocation associated with the subsequent MUST transmission.

Aspect 87 is the method of any of aspects 81 to 86, further including that the at least one feedback message received during the monitoring window includes a threshold quantity of one or more NACK messages indicating unsuccessful receipt of the base layer, and wherein the adjusting of the at least one transmission parameter associated with the subsequent MUST transmission includes one or more of: decreasing a base layer code rate or modulation associated with the subsequent MUST transmission, increasing a base layer power allocation associated with the subsequent MUST transmission, increasing an enhancement layer code rate or modulation associated with the subsequent MUST transmission, or decreasing an enhancement layer power allocation associated with the subsequent MUST transmission.

Aspect 88 is the method of any of aspects 81 to 87, further including that the sidelink feedback message includes a first indicator corresponding to decoding of the sidelink message and a second indicator corresponding to decoding of the uplink message.

Aspect 89 is the method of any of aspects 81 to 88, further including that the first UE receives a base station feedback message from the base station indicating whether the base station decoded at least one of the base layer or the enhancement layer.

Aspect 90 is the method of any of aspects 81 to 89, further including that the base station feedback message includes a first indicator corresponding to decoding of the sidelink message and a second indicator corresponding to decoding of the uplink message.

Aspect 91 is the method of any of aspects 81 to 90, further including that the sidelink message comprises a groupcast message that is directed to a group of UEs including the second UE.

Aspect 92 is the method of any of aspects 81 to 91, further including that the first UE is configured as a cluster head of a cluster of UEs communicating based on sidelink, and the first UE transmits a cluster MUST relay request to the base station, the cluster MUST relay request requesting that the base station serve as a relay for member UEs of the cluster, and wherein the cluster MUST relay request identifies a groupcast identifier associated with the cluster and the member UEs of the cluster, the member UEs including at least the first UE and the second UE.

Aspect 93 is the method of any of aspects 81 to 92, further including that the first UE receives a cluster confirmation message from the base station indicating that the base station is serving as a relay for sidelink messages of MUST transmissions generated by UEs of the cluster.

Aspect 94 is an apparatus for wireless communication including at least one processor coupled to a memory and configured to implement a method as in any of aspects 81 to 93.

Aspect 95 is an apparatus for wireless communication including means for implementing a method as in any of aspects 81 to 93.

Aspect 96 is a computer-readable medium storing computer executable code, where the code, when executed, causes a processor to implement a method as in any of aspects 81 to 93.

Aspect 97 is a method of wireless communication of a base station, comprising: receiving, from a first UE, a multi-user simultaneous transmission (MUST) transmission including a base layer and an enhancement layer, the base layer comprising a sidelink message for a second UE and the enhancement layer comprising an uplink message for the base station; decoding the base layer of the MUST transmission to obtain the sidelink message; receiving a sidelink feedback message from the second UE indicating that the second UE did not successfully receive the sidelink message; and transmitting the sidelink message to the second UE in a sidelink transmission in response to the sidelink feedback message signals from the second UE.

Aspect 98 is the method of aspect 97, further including: receiving a MUST relay request from the second UE requesting that the base station serve as a relay of sidelink messages for MUST transmissions generated by a first set of source UEs, wherein the set of source UEs includes at least the first UE; and transmitting a confirmation message to the second UE signaling a confirmation of the base station to serve as a relay for MUST transmissions generated by a second set of source UEs, wherein the second set of source UEs includes at least the second UE.

Aspect 99 is the method of any of aspect 97 or aspect 98, further including that the first set of source UEs and the second set of source UEs include the same UEs.

Aspect 100 is the method of any of aspects 97 to 99, further including that the second set of source UEs comprises a subset of UEs of the first set of source UEs.

Aspect 101 is the method of any of aspects 97 to 100, further including that the sidelink message includes sidelink control information (SCI) and sidelink data, and the method further comprises determining at least one transmission parameter associated with transmission of the sidelink message from the first UE to the second UE based on the SCI.

Aspect 102 is the method of any of aspects 97 to 101, further including that the at least one transmission parameter includes a resource reservation and a modulation and coding scheme (MCS).

Aspect 103 is the method of any of aspects 97 to 102, further including decoding the enhancement layer of the MUST transmission to obtain the uplink message, and wherein the base station decodes the enhancement layer after obtaining the sidelink message.

Aspect 104 is the method of any of aspects 97 to 103, further including: determining a source identifier associated with the sidelink feedback message based on a sidelink feedback channel resource used by the second UE to transmit the sidelink feedback message, wherein the source identifier indicates a source UE to which the sidelink feedback message is directed; and determining the sidelink message to transmit to the second UE based at least in part on the determined source identifier.

Aspect 105 is the method of any of aspects 97 to 104, further including that the base station determines a resource to use to transmit the sidelink transmission to the second UE based on sidelink control information (SCI) of the sidelink message.

Aspect 106 is the method of any of aspects 97 to 105, further including that the base station transmits the sidelink transmission to the second UE at a same time slot when the SCI indicates that the second UE transmits a retransmission of the sidelink message to the second UE.

Aspect 107 is the method of any of aspects 97 to 106, further including that the base station determines the resource to use to transmit the sidelink transmission based on one or more of: a transmission resource associated with transmission of the sidelink message from the first UE to the second UE, a source identifier associated with the first UE, and a destination identifier associated with the second UE.

Aspect 108 is the method of any of aspects 97 to 107, further including that the base station determines at least one transmission parameter associated with transmission of the sidelink message from the first UE to the second UE based on sidelink control information (SCI) of the sidelink message, and wherein the base station transmits the sidelink transmission to the second UE using at least one same transmission parameter as the transmission of the base layer from the first UE.

Aspect 109 is the method of any of aspects 97 to 108, further including that the at least one transmission parameter includes a coding rate or a modulation and coding scheme (MCS).

Aspect 110 is the method of any of aspects 97 to 109, further including that the base station transmits the sidelink transmission using at least one different transmission parameter as the transmission of the sidelink message from the first UE to the second UE.

Aspect 111 is the method of any of aspects 97 to 110, further including that the base station transmits the sidelink transmission using at least one of a lower modulation and coding scheme (MSC) and a lower code rate than an MCS and a code rate associated with the transmission of the sidelink message from the first UE to the second UE, and wherein the base station transmits a control message to the second UE signaling the at least one of the lower MCS and the lower code.

Aspect 112 is the method of any of aspects 97 to 111, further including that the base station receives a cluster MUST relay request from the first UE or the second UE, the cluster MUST relay request requesting that the base station serve as a relay for member UEs of a cluster communicating using sidelink, wherein the cluster MUST relay request identifies a groupcast identifier associated with the cluster and the member UEs of the cluster, the member UEs including at least the first UE and the second UE.

Aspect 113 is the method of any of aspects 97 to 112, further including that the base station transmits a cluster confirmation message indicating that the base station is serving as a relay for sidelink messages of MUST transmissions generated by member UEs of the cluster.

Aspect 114 is the method of any of aspects 97 to 113, further including that the MUST transmission comprises a cluster MUST transmission and the base layer comprises a groupcast sidelink message, and wherein the base station transmits the sidelink message in response to a NACK message from any UE in the cluster.

Aspect 115 is the method of any of aspects 97 to 114, further including determining a resource common to the cluster to use to transmit the sidelink message to the second UE, wherein the base station transmits the sidelink message to the second UE using the resource that is common to the cluster.

Aspect 116 is the method of any of aspects 97 to 115, further including that determining the resource common to the cluster includes: determining a MUST transmission resource used to transmit the cluster MUST transmission, mapping the MUST transmission resource and the groupcast identifier of the cluster to a common resource set, and selecting the common resource from the common resource set based on the mapping.

Aspect 117 is an apparatus for wireless communication including at least one processor coupled to a memory and configured to implement a method as in any of aspects 97 to 116.

Aspect 118 is an apparatus for wireless communication including means for implementing a method as in any of aspects 97 to 116.

Aspect 119 is a computer-readable medium storing computer executable code, where the code, when executed, causes a processor to implement a method as in any of aspects 97 to 116.

Aspect 120 is a method of wireless communication of a first user equipment (UE), comprising: receiving, from a second UE, a multi-user simultaneous transmission (MUST) transmission including a base layer and an enhancement layer, the base layer comprising a sidelink message for the first UE and the enhancement layer comprising an uplink message for a base station; attempting to decode the base layer of the MUST transmission to obtain the sidelink message; transmitting feedback indicating that the first UE did not successfully receive the sidelink message; and receiving a sidelink transmission from a base station comprising a retransmission of the sidelink message in response to the feedback.

Aspect 121 is the method of aspect 120, further including that the first UE transmits the feedback using a sidelink feedback channel resource.

Aspect 122 is the method of any of aspect 120 or aspect 121, further including that the sidelink message includes sidelink control information (SCI) and sidelink data.

Aspect 123 is the method of any of aspects 120 to 122, further including: transmitting a MUST relay request to the base station requesting that the base station serve as a relay of sidelink messages for MUST transmissions generated by a first set of source UEs, wherein the set of source UEs includes at least the second UE; and receiving a confirmation message from the base station signaling a confirmation of the base station to serve as a relay for MUST transmissions generated by a second set of source UEs, wherein the second set of source UEs includes at least the second UE.

Aspect 124 is the method of any of aspects 120 to 123, further including that the first set of source UEs and the second set of source UEs include the same UEs.

Aspect 125 is the method of any of aspects 120 to 124, further including that the second set of source UEs comprises a subset of UEs of the first set of source UEs.

Aspect 126 is the method of any of aspects 120 to 125, further including that the first UE transmits a relay confirmation message to the second UE indicating that the base station is serving as a relay of sidelink messages for MUST transmissions generated by the second UE.

Aspect 127 is the method of any of aspects 120 to 126, further including receiving a retransmission of the sidelink message from the second UE when the sidelink feedback message signals an inability of the first UE to obtain the sidelink message from the decoding of the base layer.

Aspect 128 is the method of any of aspects 120 to 127, further including that the first UE receives the sidelink transmission of the sidelink message from the base station and the retransmission of the sidelink message from the second UE at a same time slot.

Aspect 129 is the method of any of aspects 120 to 128, further including that the first UE receives the sidelink transmission of the sidelink message from the base station at a different time than the retransmission of the sidelink message from the second UE.

Aspect 130 is the method of any of aspects 120 to 129, further including that the first UE combines the sidelink transmission of the sidelink message and the retransmission of the sidelink message to obtain the sidelink message.

Aspect 131 is the method of any of aspects 120 to 130, further including that the first UE receives the sidelink transmission from the base station using a configured resource for retransmission of sidelink messages by the base station.

Aspect 132 is the method of any of aspects 120 to 131, further including that the configured resource is based on one or more of: a transmission resource associated with transmission of the sidelink message from the second UE to the first UE, a source identifier associated with the second UE, or a destination identifier associated with the first UE.

Aspect 133 is the method of any of aspects 120 to 132, further including that the first UE is configured as a cluster head of a cluster of UEs, and the first UE transmits a cluster MUST relay request to the base station, the cluster MUST relay request requesting that the base station serve as a relay for member UEs of the cluster, and wherein the cluster MUST relay request identifies a groupcast identifier associated with the cluster and the member UEs of the cluster, the member UEs including at least the first UE and the second UE.

Aspect 134 is the method of any of aspects 120 to 133, further including that the first UE receives a cluster confirmation message from the base station indicating that the base station is serving as a relay for sidelink messages of MUST transmissions generated by UEs of the cluster.

Aspect 135 is an apparatus for wireless communication including at least one processor coupled to a memory and configured to implement a method as in any of aspects 120 to 134.

Aspect 136 is an apparatus for wireless communication including means for implementing a method as in any of aspects 120 to 134.

Aspect 137 is a computer-readable medium storing computer executable code, where the code, when executed, causes a processor to implement a method as in any of aspects 120 to 134.

Aspect 138 is a method of wireless communication of a first user equipment (UE), comprising: receiving, from a second UE, a multi-user simultaneous transmission (MUST) transmission including a base layer and an enhancement layer, the base layer comprising an uplink message for a base station and the enhancement layer comprising a sidelink message for the first UE; decoding the base layer of the MUST transmission to obtain the uplink message; receiving downlink feedback from the base station indicating unsuccessful receipt of the base layer; and applying a relay strategy to determine whether to transmit the base layer as an uplink transmission to the base station in response to the feedback from the base station.

Aspect 139 is the method of aspect 138, further including decoding the enhancement layer to obtain the sidelink message.

Aspect 140 is the method of any of aspect 138 or aspect 139, further including: receiving a MUST relay request from the second UE requesting that the first UE serve as a relay for uplink messages of MUST transmissions from the second UE; and transmitting a MUST relay confirmation message to the second UE signaling a confirmation of the first UE to serve as a relay for uplink messages of MUST transmissions from the second UE.

Aspect 141 is the method of any of aspects 138 to 140, further including receiving a relay MUST identifier from the base station, wherein the first UE receives the downlink feedback from the base station using the relay MUST identifier.

Aspect 142 is the method of any of aspects 138 to 141, further including that the relay MUST identifier is valid for N slots, N being an integer number.

Aspect 143 is the method of any of aspects 138 to 142, further including that the relay MUST identifier is valid for N slots after the first UE receives the relay MUST identifier, N being an integer number.

Aspect 144 is the method of any of aspects 138 to 143, further including that the first UE receives signaling from the base station to activate or deactivate the relay MUST identifier.

Aspect 145 is the method of any of aspects 138 to 144, further including that the first UE transmits a sidelink feedback message to the second UE indicating whether the first UE obtained at least one of the uplink message and the sidelink message.

Aspect 146 is the method of any of aspects 138 to 145, further including that the sidelink feedback message includes a first indicator corresponding to decoding of the base layer and a second indicator corresponding to decoding of the enhancement layer.

Aspect 147 is the method of any of aspects 138 to 146, further including that the downlink feedback includes a relay uplink grant.

Aspect 148 is the method of any of aspects 138 to 147, further including receiving an uplink grant from the base station for the transmission of the uplink message to the base station, wherein applying the relay strategy includes transmitting the uplink transmission including the uplink message to the base station based on the uplink grant.

Aspect 149 is the method of any of aspects 138 to 148, further including that the uplink grant indicates resources that may be used by the first UE to transmit the uplink transmission and for the second UE to transmit a retransmission of the uplink message to the base station.

Aspect 150 is the method of any of aspects 138 to 149, further including that the first UE transmits the uplink transmission to the base station using one or more transmission parameters of the MUST transmission based on uplink control information (UCI) of the uplink message.

Aspect 151 is the method of any of aspects 138 to 150, further including that the one or more transmission parameters include a same modulation and coding scheme (MCS) or a same code rate.

Aspect 152 is the method of any of aspects 138 to 151, further including that applying the relay strategy includes: transmitting the uplink transmission including the uplink message to the base station if an uplink message priority satisfies a priority threshold, and refraining from transmitting the uplink transmission to the base station if the uplink message priority does not satisfy the priority threshold.

Aspect 153 is the method of any of aspects 138 to 152, further including that applying the relay strategy includes: transmitting the uplink transmission including the uplink message to the base station if a slot number corresponding to a candidate transmission of the uplink message to the base station satisfies a condition; and refraining from transmitting the uplink transmission including the uplink message to the base station if the slot number corresponding to a candidate transmission of the uplink message to the base station does not satisfy the condition.

Aspect 154 is the method of any of aspects 138 to 153, further including that the first UE receives a parameter for the condition via at least one of radio resource control (RRC) signaling, a medium access control-control element (MAC-CE), or downlink control information (DCI).

Aspect 155 is the method of any of aspects 138 to 154, further including transmitting the uplink transmission including the uplink message to the base station based on an uplink grant of different resources than resources for the second UE to transmit a retransmission of the uplink message to the base station.

Aspect 156 is the method of any of aspects 138 to 155, further including that the first UE transmits the uplink transmission including the uplink message to the base station at slot (n+m) based on a slot n used to transmit the MUST transmission and an offset m, wherein the first UE receives the offset m via a UE relay confirmation or the downlink feedback.

Aspect 157 is the method of any of aspects 138 to 156, further including that the first UE receives grant-free scheduling to transmit the uplink transmission including the uplink message to the base station.

Aspect 158 is the method of any of aspects 138 to 157, further including that the grant-free scheduling includes a resource allocation to transmit the uplink transmission at a slot (n–m) based on a slot n used to transmit the MUST transmission and an offset m, wherein the first UE receives the offset m via radio resource control (RRC) signaling.

Aspect 159 is the method of any of aspects 138 to 158, further including that the offset m is set to zero.

Aspect 160 is the method of any of aspects 138 to 159, further including that the grant-free scheduling includes a resource allocation to transmit the uplink transmission to the base station, and wherein the first UE receives a downlink control channel from the base station activating or deactivating the resource allocation.

Aspect 161 is an apparatus for wireless communication including at least one processor coupled to a memory and configured to implement a method as in any of aspects 138 to 160.

Aspect 162 is an apparatus for wireless communication including means for implementing a method as in any of aspects 138 to 160.

Aspect 163 is a computer-readable medium storing computer executable code, where the code, when executed, causes a processor to implement a method as in any of aspects 138 to 160.

Aspect 164 is a method of wireless communication of a first user equipment (UE), comprising: encoding an uplink message for a base station as a base layer of a multi-user simultaneous transmission (MUST) transmission; encoding a sidelink message for a second UE as an enhancement layer of the MUST transmission; and transmitting the MUST transmission including the base layer and the enhancement layer.

Aspect 165 is the method of aspect 164, further including: receiving downlink feedback from the base station indicating that the base station did not successfully receive the base layer of the MUST transmission; and transmitting a retransmission of the uplink message to the base station in response to the feedback.

Aspect 166 is the method of any of aspect 164 or aspect 165, further including: transmitting a MUST relay request to the second UE requesting that the second UE serve as a relay for uplink messages of MUST transmissions from the first UE; receiving a MUST relay confirmation message from the second UE signaling a confirmation of the second UE to serve as a relay for uplink messages of MUST transmissions from the first UE; and transmitting a UE MUST relay request to the base station signaling that the second UE is configured to serve as a relay for uplink messages of MUST transmissions from the first UE.

Aspect 167 is the method of any of aspects 164 to 166, further including that the first UE receives a UE MUST relay confirmation from the base station acknowledging that the second UE is configured to serve as the relay for uplink messages of MUST transmissions from the first UE.

Aspect 168 is the method of any of aspects 164 to 167, further including that the first UE decodes downlink control channels received from the base station to detect an occurrence of a NACK message signaling that the base station did not successfully receive the base layer of the MUST transmission.

Aspect 169 is the method of any of aspects 164 to 168, further including that the first UE transmits the retransmission of the uplink message to the base station at a slot (n+m) based on a slot n used to transmit the MUST transmission and an offset m, wherein the first UE receives the offset m via a UE MUST relay confirmation from the base station or the downlink feedback.

Aspect 170 is the method of any of aspects 164 to 169, further including that the first UE receives a sidelink feedback message from the second UE indicating whether the second UE obtained at least one of the uplink message and the sidelink message.

Aspect 171 is the method of any of aspects 164 to 170, further including that the sidelink feedback message includes a first indicator corresponding to decoding of the base layer and a second indicator corresponding to decoding of the enhancement layer.

Aspect 172 is the method of any of aspects 164 to 171, further including: monitoring for feedback messages from the second UE and the base station during a monitoring window; and adjusting at least one transmission parameter associated with a subsequent MUST transmission based on at least one feedback message received during the monitoring window.

Aspect 173 is the method of any of aspects 164 to 172, further including that the at least one feedback message received during the monitoring window include a threshold quantity of one or more base layer NACK messages indicating successful receipt of the base layer, and wherein the adjusting of the at least one transmission parameter associated with the subsequent MUST transmission includes one or more of: decreasing a base layer code rate or modulation associated with the subsequent MUST transmission, or increasing a base layer power allocation associated with the subsequent MUST transmission.

Aspect 174 is the method of any of aspects 164 to 173, further including that the at least one feedback message received during the monitoring window include a threshold quantity of one or more base layer ACK messages indicating successful receipt of the base layer and a threshold quantity of one or more enhancement layer NACK messages indicating unsuccessful receipt of the enhancement layer, and wherein the adjusting of the at least one transmission parameter associated with the subsequent MUST transmission includes one or more of: increasing a base layer code rate or modulation associated with the subsequent MUST transmission, decreasing a base layer power allocation associated with the subsequent MUST transmission, decreasing an enhancement layer code rate or modulation associated with the subsequent MUST transmission, or increasing an enhancement layer power allocation associated with the subsequent MUST transmission.

Aspect 175 is the method of any of aspects 164 to 174, further including that the at least one feedback message received during the monitoring window include a threshold quantity of one or more base layer ACK messages indicating successful receipt of the base layer and a threshold quantity of one or more enhancement layer ACK messages indicating successful receipt of the enhancement layer, and wherein the adjusting of the at least one transmission parameter associated with the subsequent MUST transmission includes one or more of: increasing a base layer code rate or modulation associated with the subsequent MUST transmission, decreasing a base layer power allocation associated with the subsequent MUST transmission, increasing an enhancement layer code rate or modulation associated with the subsequent MUST transmission, or decreasing an enhancement layer power allocation associated with the subsequent MUST transmission.

Aspect 176 is an apparatus for wireless communication including at least one processor coupled to a memory and configured to implement a method as in any of aspects 164 to 175.

Aspect 177 is an apparatus for wireless communication including means for implementing a method as in any of aspects 164 to 175.

Aspect 178 is a computer-readable medium storing computer executable code, where the code, when executed, causes a processor to implement a method as in any of aspects 1 to 175.

Aspect 179 is a method of wireless communication of a base station, comprising: receiving, from the first UE, a multi-user simultaneous transmission (MUST) transmission including a base layer and an enhancement layer, the base layer comprising an uplink message for the base station and the enhancement layer comprising a sidelink message for a second UE; attempting to decode the base layer of the MUST transmission to obtain the uplink message; transmitting, using a downlink control channel, feedback indicating that the base station did not successfully decode the base layer; and receiving a relay uplink transmission of the uplink message from the second UE in response to the feedback.

Aspect 180 is the method of aspect 179, further including providing a relay MUST identifier to the second UE, wherein the base station encodes a negative acknowledgement (NACK) comprised in the feedback using the relay MUST identifier.

Aspect 181 is the method of any of aspect 179 or aspect 180, further including that the feedback is directed to the second UE, and wherein the base station transmits, using a second downlink control channel, an additional feedback message to the first UE indicating that the base station did not successfully receive the base layer.

Aspect 182 is the method of any of aspects 179 to 181, further including: receiving a MUST relay request from the first UE signaling that the second UE is configured to serve as a relay of uplink messages for MUST transmissions generated by the first UE; transmitting a UE relay confirmation to the second UE, the UE relay confirmation including a relay MUST identifier to facilitate decoding downlink control channels transmitted by the base station to detect downlink feedback associated with a MUST transmission, and wherein the base station transmits a UE MUST relay confirmation to the first UE acknowledging that the second UE is configured to serve as the relay for uplink messages of MUST transmission generated by the first UE.

Aspect 183 is the method of any of aspects 179 to 182, further including that the relay MUST identifier is valid for N slots, N being an integer number.

Aspect 184 is the method of any of aspects 179 to 183, further including that the relay MUST identifier is valid for N slots after the second UE receives the relay MUST identifier, N being an integer number.

Aspect 185 is the method of any of aspects 179 to 184, further including that the base station transmits signaling to the second UE to activate or deactivate the relay MUST identifier.

Aspect 186 is the method of any of aspects 179 to 185, further including that the base station receives the relay uplink transmission of the uplink message from the second UE and a retransmission of the uplink message from the first UE at a same time slot.

Aspect 187 is the method of any of aspects 179 to 186, further including that the base station combines the relay uplink transmission of the uplink message from the second UE and the retransmission of the uplink message from the first UE to obtain the uplink message.

Aspect 188 is the method of any of aspects 179 to 187, further including that the base station determines an uplink message priority based on uplink control information (UCI) of the uplink message, and one of receives the relay uplink transmission of the uplink message from the second UE when the uplink message priority satisfies a priority threshold, or skips monitoring for the relay uplink transmission when the uplink message priority does not satisfy the priority threshold.

Aspect 189 is the method of any of aspects 179 to 188, further including that the base station transmits a condition to the second UE for transmitting the relay uplink transmission, and wherein the base station one of receives the relay uplink transmission of the uplink message from the second UE when a slot number corresponding to a candidate transmission of the uplink message satisfies the condition, or skips monitoring for the relay uplink transmission when the slot number corresponding to the candidate transmission of the uplink message does not satisfy the condition.

Aspect 190 is the method of any of aspects 179 to 189, further including that the base station transmits a first offset $m_1$ to the first UE and a second offset $m_2$ to the second UE, and wherein the base station receives a retransmission of the uplink message from the first UE at a slot $(n+m_1)$ based on a slot n used to transmit the MUST transmission and the offset $m_1$, and receives the relay uplink transmission of the uplink message from the second UE at a slot $(n+m_2)$ based on the slot n and the offset $m_2$.

Aspect 191 is the method of any of aspects 179 to 190, further including that the base station provides grant-free scheduling to the second UE to transmit the relay uplink transmission including the uplink message to the base station when decode failures satisfy a failure threshold, wherein a decode failure occurs when the base station signals unsuccessful receipt of the base layer.

Aspect 192 is the method of any of aspects 179 to 191, further including that the failure threshold is based on a quantity of decode failures, a rate of decode failures, or a percentage of decode failures.

Aspect 193 is the method of any of aspects 179 to 192, further including that the grant-free scheduling includes a resource allocation to transmit the relay uplink transmission at a slot (n−m) based on a slot n used to transmit the MUST transmission and an offset m, wherein the base station transmits the offset m via radio resource control (RRC) signaling.

Aspect 194 is the method of any of aspects 179 to 193, further including that the offset m is set to zero.

Aspect 195 is the method of any of aspects 179 to 194, further including that the grant-free scheduling includes a resource allocation to transmit the relay uplink transmission to the base station, and wherein the base station transmits a downlink control channel to the second UE activating or deactivating the resource allocation.

Aspect 196 is an apparatus for wireless communication including at least one processor coupled to a memory and configured to implement a method as in any of aspects 179 to 195.

Aspect 197 is an apparatus for wireless communication including means for implementing a method as in any of aspects 179 to 195.

Aspect 198 is a computer-readable medium storing computer executable code, where the code, when executed, causes a processor to implement a method as in any of aspects 179 to 195.

What is claimed is:

1. A method of wireless communication of a first communication device, comprising:
   receiving, by the first communication device and from a user equipment (UE), a multi-user simultaneous transmission (MUST) transmission including a base layer and an enhancement layer, the base layer comprising a first message for a second communication device and the enhancement layer comprising a second message for the first communication device;
   decoding, by the first communication device, the base layer of the MUST transmission to obtain the first message;
   receiving, by the first communication device, a feedback message from the second communication device indicating that the second communication device did not successfully receive the first message; and
   retransmitting, by the first communication device, the first message to the second communication device in response to the feedback message from the second communication device.

2. The method of claim 1, wherein the first communication device comprises a base station and the second message comprises an uplink message, and
   wherein the second communication device comprises a sidelink UE, the first message comprises a sidelink message, and the feedback message comprises a sidelink feedback message.

3. The method of claim 2, further comprising:
   receiving a MUST relay request from the second communication device requesting that the first communication device serve as a relay of sidelink messages for MUST transmissions generated by a first set of source communication devices, wherein the first set of source communication devices includes at least the UE; and
   transmitting a confirmation message to the second communication device signaling a confirmation of the first communication device to serve as a relay for MUST transmissions generated by a second set of source communication devices, wherein the second set of source communication devices includes at least the UE.

4. The method of claim 2, wherein the sidelink message includes sidelink control information (SCI) and sidelink data, and the method further comprises determining at least one transmission parameter associated with transmission of the sidelink message from the UE to the second communication device based on the SCI, and wherein the at least one transmission parameter includes a resource reservation and a modulation and coding scheme (MCS).

5. The method of claim 2, further comprising:
   determining a source identifier associated with the sidelink feedback message based on a sidelink feedback channel resource used by the second communication device to transmit the sidelink feedback message, wherein the source identifier indicates a source communication device to which the sidelink feedback message is directed; and
   determining the sidelink message to transmit to the second communication device based at least in part on the determined source identifier.

6. The method of claim 2, wherein the first communication device determines a resource to use to transmit a sidelink transmission to the second communication device based on sidelink control information (SCI) of the sidelink message.

7. The method of claim 6, wherein the first communication device transmits the sidelink transmission to the second communication device at a same time slot when the SCI indicates that the UE transmits a retransmission of the sidelink message to the second communication device.

8. The method of claim 7, wherein the first communication device determines the resource to use to transmit the sidelink transmission based on one or more of:
   a transmission resource associated with transmission of the sidelink message from the UE to the second communication device,
   a source identifier associated with the UE, and
   a destination identifier associated with the second communication device.

9. The method of claim 2, wherein the first communication device determines at least one transmission parameter associated with transmission of the sidelink message from the UE to the second communication device based on sidelink control information (SCI) of the sidelink message, and
   wherein the first communication device transmits a sidelink transmission to the second communication device using at least one same transmission parameter as the transmission of the base layer from the UE, and the at least one transmission parameter including a coding rate or a modulation and coding scheme (MCS).

10. The method of claim 2, wherein the first communication device transmits a sidelink transmission to the second communication device using at least one different transmission parameter as a transmission of the sidelink message from the UE to the second communication device.

11. The method of claim 10, wherein the first communication device transmits the sidelink transmission using at least one of a lower modulation and coding scheme (MCS) and a lower code rate than an MCS and a code rate associated with the transmission of the sidelink message from the UE to the second communication device, and
   wherein the first communication device transmits a control message to the second communication device signaling at least one of the lower MCS and the lower code rate.

12. The method of claim 1, wherein the first communication device comprises a sidelink UE and the second message comprises a sidelink message, and
   wherein the second communication device comprises a base station, the first message comprises an uplink message, and the feedback message comprises downlink feedback, and the method further comprises:
   applying a relay strategy to determine whether to transmit the base layer as an uplink transmission to the second communication device in response to the downlink feedback from the second communication device.

13. The method of claim 12, further comprising:
   receiving a MUST relay request from the UE requesting that the first communication device serve as a relay for uplink messages of MUST transmissions from the UE; and
   transmitting a MUST relay confirmation message to the UE signaling a confirmation of the first communication device to serve as the relay for the uplink messages of the MUST transmissions from the UE.

14. The method of claim 12, further comprising receiving a relay MUST identifier from the second communication device, wherein the first communication device receives the downlink feedback from the second communication device using the relay MUST identifier.

15. The method of claim 14, wherein the relay MUST identifier is valid for N slots, N being an integer number.

16. The method of claim 14, wherein the relay MUST identifier is valid for N slots after the first communication device receives the relay MUST identifier, N being an integer number.

17. The method of claim 14, wherein the first communication device receives signaling from the second communication device to activate or deactivate the relay MUST identifier.

18. The method of claim 12, further comprising receiving an uplink grant from the second communication device for the uplink transmission of the uplink message to the second communication device,
wherein applying the relay strategy includes transmitting the uplink transmission including the uplink message to the second communication device based on the uplink grant.

19. The method of claim 18, wherein the uplink grant indicates resources that may be used by the first communication device to transmit the uplink transmission and for the UE to transmit a retransmission of the uplink message to the second communication device.

20. The method of claim 18, wherein the first communication device transmits the uplink transmission to the second communication device using one or more transmission parameters of the MUST transmission based on uplink control information (UCI) of the uplink message, and wherein the one or more transmission parameters include a same modulation and coding scheme (MCS) or a same code rate.

21. The method of claim 12, wherein applying the relay strategy includes:
transmitting the uplink transmission including the uplink message to the second communication device if an uplink message priority satisfies a priority threshold, and
refraining from transmitting the uplink transmission to the second communication device if the uplink message priority does not satisfy the priority threshold.

22. The method of claim 12, wherein applying the relay strategy includes:
transmitting the uplink transmission including the uplink message to the second communication device if a slot number corresponding to a candidate transmission of the uplink message to the second communication device satisfies a condition; and
refraining from transmitting the uplink transmission including the uplink message to the second communication device if the slot number corresponding to the candidate transmission of the uplink message to the second communication device does not satisfy the condition, and
wherein the first communication device receives a parameter for the condition via at least one of radio resource control (RRC) signaling, a medium access control-control element (MAC-CE), or downlink control information (DCI).

23. The method of claim 12, further comprising:
transmitting the uplink transmission including the uplink message to the second communication device based on an uplink grant of different resources than resources for the UE to transmit a retransmission of the uplink message to the second communication device, and
wherein the first communication device transmits the uplink transmission including the uplink message to the second communication device at slot (n+m) based on a slot n used to transmit the MUST transmission and an offset m,
wherein the first communication device receives the offset m via a UE relay confirmation or the downlink feedback.

24. The method of claim 12, wherein the first communication device receives grant-free scheduling to transmit the uplink transmission including the uplink message to the second communication device.

25. The method of claim 24, wherein the grant-free scheduling includes a resource allocation to transmit the uplink transmission at a slot (n–m) based on a slot n used to transmit the MUST transmission and an offset m, wherein the first communication device receives the offset m via radio resource control (RRC) signaling.

26. The method of claim 24, wherein the grant-free scheduling includes a resource allocation to transmit the uplink transmission to the second communication device, and wherein the first communication device receives a downlink control channel from the second communication device activating or deactivating the resource allocation.

27. A method of wireless communication of a first communication device, comprising:
receiving, by the first communication device and from a user equipment (UE), a multi-user simultaneous transmission (MUST) transmission including a base layer and an enhancement layer, the base layer comprising a first message for the first communication device and the enhancement layer comprising a second message for a second communication device;
attempting to decode, by the first communication device, the base layer of the MUST transmission to obtain the first message;
transmitting, by the first communication device, feedback indicating that the first communication device did not successfully receive the first message; and
receiving, by the first communication device, a transmission of the first message from the second communication device in response to the feedback.

28. The method of claim 27, wherein the first communication device comprises a sidelink UE and the second communication device comprises a base station, and wherein the first message comprises a sidelink message, the second message comprises an uplink message, the feedback comprises a sidelink feedback message, and the transmission of the first message from the second communication device comprises a sidelink transmission of the first message.

29. The method of claim 28, wherein the first communication device transmits the feedback using a sidelink feedback channel resource.

30. The method of claim 29, further comprising:
transmitting a MUST relay request to the second communication device requesting that the second communication device serve as a relay of sidelink messages for MUST transmissions generated by a first set of source communication devices, wherein the first set of source communication devices includes at least the UE; and
receiving a confirmation message from the second communication device signaling a confirmation of the second communication device to serve as a relay for MUST transmissions generated by a second set of source communication devices, wherein the second set of source communication devices includes at least the UE.

31. The method of claim 30, wherein the first communication device transmits a relay confirmation message to the UE indicating that the second communication device is serving as the relay of the sidelink messages for the MUST transmissions generated by the UE.

32. The method of claim 29, further including receiving a retransmission of the first message from the UE when the feedback signals an inability of the first communication device to obtain the first message from decoding of the base layer.

33. The method of claim 32, wherein the first communication device receives the sidelink transmission of the first message from the second communication device and the retransmission of the first message from the UE at a same time slot.

34. The method of claim 32, wherein the first communication device receives the sidelink transmission of the first message from the second communication device at a different time than the retransmission of the first message from the UE.

35. The method of claim 32, wherein the first communication device combines the sidelink transmission of the first message and the retransmission of the first message to obtain the first message.

36. The method of claim 29, wherein the first communication device receives the sidelink transmission from the second communication device using a configured resource for retransmission of sidelink messages by the second communication device, and wherein the configured resource is based on one or more of:
 a transmission resource associated with transmission of the first message from the UE to the first communication device,
 a source identifier associated with the UE, or
 a destination identifier associated with the first communication device.

37. The method of claim 27, wherein the first communication device comprises a base station and the second communication device comprises a sidelink UE,
 wherein the first message comprises an uplink message and the second message comprises a sidelink message, and
 wherein the first communication device transmits the feedback using a downlink control channel, and the transmission of the first message from the second communication device comprises a relay uplink transmission of the first message.

38. The method of claim 37, further comprising providing a relay MUST identifier to the second communication device, wherein the first communication device encodes a negative acknowledgement (NACK) comprised in the feedback using the relay MUST identifier.

39. The method of claim 37, wherein the feedback is directed to the second communication device, and wherein the first communication device transmits, using a second downlink control channel, an additional feedback message to the UE indicating that the first communication device did not successfully receive the base layer.

40. The method of claim 37, further comprising:
 receiving, from the UE, a MUST relay request signaling that the second communication device is configured to serve as a relay of uplink messages for MUST transmissions generated by the UE;
 transmitting a UE relay confirmation to the second communication device, the UE relay confirmation including a relay MUST identifier to facilitate decoding downlink control channels transmitted by the first communication device to detect downlink feedback associated with a MUST transmission, and
 wherein the second communication device transmits, to the UE, a UE MUST relay confirmation acknowledging that the second communication device is configured to serve as the relay of the uplink messages for the MUST transmissions generated by the UE.

41. The method of claim 40, wherein the relay MUST identifier is valid for N slots, N being an integer number.

42. The method of claim 40, wherein the relay MUST identifier is valid for N slots after the second communication device receives the relay MUST identifier, N being an integer number.

43. The method of claim 40, wherein the first communication device transmits signaling to the second communication device to activate or deactivate the relay MUST identifier.

44. The method of claim 37, wherein the first communication device receives the relay uplink transmission of the uplink message from the second communication device and a retransmission of the uplink message from the UE at a same time slot.

45. The method of claim 44, wherein the first communication device combines the relay uplink transmission of the uplink message from the second communication device and the retransmission of the uplink message from the UE to obtain the uplink message.

46. The method of claim 37, wherein the first communication device determines an uplink message priority based on uplink control information (UCI) of the uplink message, and wherein the first communication device performs one of:
 receiving the relay uplink transmission of the uplink message from the second communication device when the uplink message priority satisfies a priority threshold, or
 skipping monitoring for the relay uplink transmission when the uplink message priority does not satisfy the priority threshold.

47. The method of claim 37, wherein the first communication device transmits a condition to the second communication device for transmitting the relay uplink transmission, and wherein the first communication device performs one of:
 receiving the relay uplink transmission of the uplink message from the second communication device when a slot number corresponding to a candidate transmission of the uplink message satisfies the condition, or
 skipping monitoring for the relay uplink transmission when the slot number corresponding to the candidate transmission of the uplink message does not satisfy the condition.

48. The method of claim 37, wherein the first communication device transmits a first offset $m_1$ to the UE and a second offset $m_2$ to the second communication device, and
 wherein the first communication device receives a retransmission of the uplink message from the UE at a slot $(n+m_1)$ based on a slot n used to transmit the MUST transmission and the first offset $m_1$, and
 receives the relay uplink transmission of the uplink message from the second communication device at a slot $(n+m_2)$ based on the slot n and the second offset $m_2$.

49. The method of claim 37, wherein the first communication device provides grant-free scheduling to the second communication device to transmit the relay uplink transmission including the uplink message to the first communication device when decode failures satisfy a failure threshold, a decode failure occurring when unsuccessful receipt of the base layer is signaled by the first communication device, and
   wherein the failure threshold is based on a quantity of decode failures, a rate of decode failures, or a percentage of decode failures.

50. The method of claim 49, wherein the grant-free scheduling includes a resource allocation to transmit the relay uplink transmission at a slot (n–m) based on a slot n used to transmit the MUST transmission and an offset m, and
   wherein the first communication device transmits the offset m via radio resource control (RRC) signaling.

51. The method of claim 49, wherein the grant-free scheduling includes a resource allocation to transmit the relay uplink transmission to the first communication device, and
   wherein the first communication device transmits a downlink control channel to the second communication device activating or deactivating the resource allocation.

52. A method of wireless communication of a user equipment (UE), comprising:
   encoding, by the UE, a first message for a first communication device as a base layer of a multi-user simultaneous transmission (MUST) transmission;
   encoding, by the UE, a second message for a second communication device as an enhancement layer of the MUST transmission;
   transmitting, by the UE, the MUST transmission to the first communication device and the second communication device; and
   monitoring, by the UE, for feedback messages from the first communication device and the second communication device during a monitoring window.

53. The method of claim 52, wherein the first communication device comprises a sidelink UE and the second communication device comprises a base station, and
   wherein the first message comprises a sidelink message and the second message comprises an uplink message.

54. The method of claim 53, wherein the sidelink message includes sidelink control information (SCI) and sidelink data, and wherein the uplink message comprises at least one of uplink control information (UCI) and uplink data, and wherein the SCI is superposition encoded with the UCI in the MUST transmission.

55. The method of claim 53, further comprising:
   receiving a relay confirmation message from the first communication device indicating that the second communication device is serving as a relay for sidelink messages of MUST transmissions generated by the UE; and
   refraining from transmitting a retransmission of the sidelink message to the first communication device based at least in part on the relay confirmation message.

56. The method of claim 53, further comprising receiving a sidelink feedback message from the first communication device indicating whether the first communication device obtained the sidelink message from the base layer of the MUST transmission.

57. The method of claim 56, further comprising transmitting a retransmission of the sidelink message to the first communication device based on the sidelink feedback message.

58. The method of claim 53, wherein the UE receives a second communication device feedback message from the second communication device indicating whether the second communication device decoded at least one of the base layer or the enhancement layer.

59. The method of claim 58, wherein the second communication device feedback message includes a first indicator corresponding to decoding of the sidelink message and a second indicator corresponding to decoding of the uplink message.

60. The method of claim 52, wherein the first communication device comprises a base station and the second communication device comprises a sidelink UE, and
   wherein the first message comprises an uplink message and the second message comprises a sidelink message.

61. The method of claim 60, further comprising:
   receiving downlink feedback from the second communication device indicating that the second communication device did not successfully receive the base layer of the MUST transmission; and
   transmitting a retransmission of the uplink message to the second communication device in response to the downlink feedback.

62. The method of claim 61, wherein the UE transmits the retransmission of the uplink message to the second communication device at a slot (n+m) based on a slot n used to transmit the MUST transmission and an offset m,
   wherein the UE receives the offset m via a UE MUST relay confirmation from the second communication device or the downlink feedback.

63. The method of claim 60, further comprising:
   transmitting a MUST relay request to the first communication device requesting that the first communication device serve as a relay for uplink messages of MUST transmissions from the UE;
   receiving, from the first communication device, a MUST relay confirmation message signaling a confirmation of the first communication device to serve as the relay for the uplink messages of the MUST transmissions from the UE; and
   transmitting, to the second communication device, a UE MUST relay request signaling that the first communication device is configured to serve as the relay for the uplink messages of the MUST transmissions from the UE.

64. The method of claim 63, wherein the UE receives, from the second communication device, a UE MUST relay confirmation acknowledging that the first communication device is configured to serve as the relay for the uplink messages of the MUST transmissions from the UE.

65. The method of claim 60, wherein the UE decodes downlink control channels received from the second communication device to detect an occurrence of a negative acknowledgement message signaling that the second communication device did not successfully receive the base layer of the MUST transmission.

66. The method of claim 60, wherein the UE receives a sidelink feedback message from the first communication device indicating whether the first communication device obtained at least one of the uplink message and the sidelink message.

67. The method of claim 66, wherein the sidelink feedback message includes a first indicator corresponding to decoding of the base layer and a second indicator corresponding to decoding of the enhancement layer.

68. The method of claim 52, further comprising:
adjusting at least one transmission parameter associated with a subsequent MUST transmission based on at least one feedback message received during the monitoring window.

69. The method of claim 68, wherein the at least one feedback message received during the monitoring window includes a threshold quantity of one or more negative acknowledgement messages indicating unsuccessful receipt of the base layer, and wherein adjusting of the at least one transmission parameter associated with the subsequent MUST transmission includes one or more of:
decreasing a base layer code rate or modulation associated with the subsequent MUST transmission,
increasing a base layer power allocation associated with the subsequent MUST transmission,
increasing an enhancement layer code rate or modulation associated with the subsequent MUST transmission, or
decreasing an enhancement layer power allocation associated with the subsequent MUST transmission.

70. The method of claim 68, wherein the at least one feedback message received during the monitoring window includes a first threshold quantity of one or more base layer acknowledgement messages indicating successful receipt of the base layer and a second threshold quantity of one or more enhancement layer negative acknowledgement messages indicating unsuccessful receipt of the enhancement layer, and
wherein adjusting of the at least one transmission parameter associated with the subsequent MUST transmission includes one or more of:
increasing a base layer code rate or modulation associated with the subsequent MUST transmission,
decreasing a base layer power allocation associated with the subsequent MUST transmission,
decreasing an enhancement layer code rate or modulation associated with the subsequent MUST transmission, or
increasing an enhancement layer power allocation associated with the subsequent MUST transmission.

71. The method of claim 68, wherein the at least one feedback message received during the monitoring window includes a first threshold quantity of one or more base layer acknowledgement (ACK) messages indicating successful receipt of the base layer and a second threshold quantity of one or more enhancement layer ACK messages indicating successful receipt of the enhancement layer, and
wherein adjusting of the at least one transmission parameter associated with the subsequent MUST transmission includes one or more of:
increasing a base layer code rate or modulation associated with the subsequent MUST transmission,
decreasing a base layer power allocation associated with the subsequent MUST transmission,
increasing an enhancement layer code rate or modulation associated with the subsequent MUST transmission, or
decreasing an enhancement layer power allocation associated with the subsequent MUST transmission.

72. An apparatus for wireless communication at a first communication device, comprising:
a memory; and
at least one processor coupled to the memory and configured to:
receive, from a user equipment (UE), a multi-user simultaneous transmission (MUST) transmission including a base layer and an enhancement layer, the base layer comprising a first message for a second communication device and the enhancement layer comprising a second message for the first communication device;
decode the base layer of the MUST transmission to obtain the first message;
receive a feedback message from the second communication device indicating that the second communication device did not successfully receive the first message; and
retransmit the first message to the second communication device in response to the feedback message from the second communication device.

* * * * *